United States Patent [19]

Sobotka et al.

[11] Patent Number: 5,197,004
[45] Date of Patent: Mar. 23, 1993

[54] METHOD AND APPARATUS FOR AUTOMATIC CATEGORIZATION OF APPLICANTS FROM RESUMES

[75] Inventors: David Sobotka, Sunnyvale; Ka L. Leung, San Jose; Yul J. Inn, Mountain View; Lance Tokuda, Milpitas, all of Calif.

[73] Assignee: Resumix, Inc., Santa Clara, Calif.

[21] Appl. No.: 349,028

[22] Filed: May 8, 1989

[51] Int. Cl.[5] .................. G06F 15/38; G06G 7/60
[52] U.S. Cl. .................................................. 364/419
[58] Field of Search ........................... 364/419; 382/61

[56] References Cited

U.S. PATENT DOCUMENTS

| | | | |
|---|---|---|---|
| 4,095,799 | 6/1978 | Stringer | 273/241 |
| 4,706,212 | 11/1987 | Toma | 364/900 |
| 4,744,050 | 5/1988 | Hirosawa et al. | 364/419 |
| 4,750,122 | 6/1988 | Kaji et al. | 364/419 |
| 4,847,766 | 7/1989 | McRae et al. | 364/419 |

OTHER PUBLICATIONS

Hubbard, C. "Firm combines AI, scanning to sort resumes (Office Data System's Ltd's The Intelligent Resume Input System)", *Computing Canada*, vol. 16, No. 25, Dec. 6, 1990, 14.

*Primary Examiner*—Roy N. Envall, Jr.
*Assistant Examiner*—Laura Brutman
*Attorney, Agent, or Firm*—Townsend & Townsend

[57] ABSTRACT

A method and apparatus for automatically selecting the job category or categories within which an applicant should be placed using only the applicant's resume is disclosed. The invention accepts as input a computer-readable version of the applicant's resume. An extractor, using a predetermined list of word patterns, the word patterns having been selected as indicative of skill in different job categories and assigned a weight commensurate with its value as an indicator of skill in a particular job catagory or categories, locates those words and word groups found in the resume that match the patterns. The weights of these words or word groups are then summed for each particular job category and the job category or categories having the highest point totals are selected as the most appropriate areas within the applicant should be placed.

15 Claims, 7 Drawing Sheets

| | | | | |
|---|---|---|---|---|
| 0001 | Administrative | | | |
| 0002 | • | Clerical | | |
| 0003 | • | • | Designator | |
| 0004 | • | • | • | Administrative |
| 0005 | • | • | • | Clerical |
| 0006 | • | • | Job Title | |
| 0007 | • | • | • | Office Manager |
| 0008 | • | • | • | Receptionist |
| 0009 | • | • | • | Secretary |
| 0010 | • | • | Education | |
| 0011 | • | • | Admin Terms | |
| 0012 | • | • | • | Admin Assistance |
| 0013 | • | • | • | Appointments |
| 0014 | • | • | • | Clerical |
| 0015 | • | • | • | Correspondence |
| 0016 | • | • | • | Data Entry |
| 0017 | • | • | • | Data Verification |
| 0018 | • | • | • | Desktop Publishing |
| 0019 | • | • | • | Executive Secretary |
| 0020 | • | • | • | FAX |
| 0021 | • | • | • | Filing |
| 0022 | • | • | • | IBM PC |
| 0023 | • | • | • | Macintosh |
| 0024 | • | • | • | Office Management |
| 0025 | • | • | • | Personal Computer |
| 0026 | • | • | • | Phones |
| 0027 | • | • | • | Print Operation |
| 0028 | • | • | • | Receptionist |
| 0029 | • | • | • | Reports |
| 0030 | • | • | • | Screen Calls |
| 0031 | • | • | • | Secretary |
| 0032 | • | • | • | Telex |
| 0033 | • | • | • | Travel Arrangements |
| 0034 | • | • | • | Typing |
| 0035 | • | • | • | Word Processing |
| 0036 | • | • | Desktop Publishers | |
| 0037 | • | • | • | Adobe Illustrator |
| 0038 | • | • | • | Aldus Pagemaker |
| 0039 | • | • | • | Desktop Publisher |
| 0040 | • | • | • | Framemaker |
| 0041 | • | • | • | Harvard Graphics |
| 0042 | • | • | • | Interleaf |
| 0043 | • | • | • | MacWrite |
| 0044 | • | • | • | PFS |
| 0045 | • | • | • | Ventura |
| 0046 | • | • | • | Wysiwgy |
| 0047 | • | • | Management | |
| 0048 | • | • | • | Executive |
| 0049 | • | • | • | Manager |
| 0050 | • | • | Reprographics | |
| 0051 | • | • | • | Blueprint |
| 0052 | • | • | • | Change Control |
| 0053 | • | • | • | Copy |
| 0054 | • | • | • | Document Control |
| 0055 | • | • | • | Document Distrib |
| 0056 | • | • | • | Microfilm |
| 0057 | • | • | • | Reprographics |
| 0058 | • | • | SW Applications | |
| 0059 | • | • | • | Automenu |
| 0060 | • | • | • | DDA |
| 0061 | • | • | • | DODGE |
| 0062 | • | • | • | Excel |
| 0063 | • | • | • | Fast Back |
| 0064 | • | • | • | Fastpak Mail |

Fig. 3

```
0001        Administrative
0002                Clerical
0003                Facilities
0004                Finance
0005                Human Resources
0006                Information Systems
0007                Legal
0008                Purchasing
0009                Safety
0010
0011        Marketing/Sales
0012                Advertising/Comm
0013                Marketing
0014                Sales
0015
0016        Manufacturing
0017                Assembly
0018                Indust. Engineering
0019                Packaging
0020                Process
0021                Product Engineering
0022                Quality Assurance
0023                Test Engineering
0024
0025        Technical
0026                Hardware Engineer'g
0027                Software Engineer'g
0028
```

Fig. 4A

```
0065    •    •    •          First Choice
0066    •    •    •          Framework
0067    •    •    •          Hypercard
0068    •    •    •          Hypertext
0069    •    •    •          Lotus 123
0070    •    •    •          Macdraw
0071    •    •    •          Macpaint
0072    •    •    •          Macproject
0073    •    •    •          Microsoft Works
0074    •    •    •          Norton Utilities
0075    •    •    •          Procomm
0076    •    •    •          Q&A
0077    •    •    •          Quattro
0078    •    •    •          Sidekick
0079    •    •    •          Smartcom
0080    •    •    •          Spreadsheet
0081    •    •    •          Supercalc
0082    •    •    •          Symphony
0083    •    •    Word Processors
0084    •    •    •          Adobe Illustrator
0085    •    •    •          Displaywriter
0086    •    •    •          Easywriter
0087    •    •    •          Full Write
0088    •    •    •          Macwrite
0089    •    •    •          Microsoft Word
0090    •    •    •          Multimate
0091    •    •    •          PFS Write
0092    •    •    •          Q&A Write
0093    •    •    •          Samna
0094    •    •    •          Sprint
0095    •    •    •          Unix Editor
0096    •    •    •          Unix Text Formatter
0097    •    •    •          Volkswriter
0098    •    •    •          Vydec
0099    •    •    •          Wang
0100    •    •    •          Word Perfect
0101    •    •    •          Word Processor
0102    •    •    •          Wordstar
0103    •    •    •          X-Edit
0104    •    •    •          Xerox
0105    •    •    •          [IBM] Displaywriter
0106    •    •    •          troff
```

Fig. 4B

METHOD AND APPARATUS FOR AUTOMATIC CATEGORIZATION OF APPLICANTS FROM RESUMES

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates to the field of computer analysis of text documents. More specifically it relates to the field of artificially intelligent systems capable of analyzing resumes and extracting information relating to job categorization.

BACKGROUND OF THE INVENTION

Job categorization is a necessary step in the process of hiring new employees. In the employment office of most corporations, as resumes are received they are sorted and the applicant is assigned a job skill code indicating the types of jobs which the applicant may be able to perform. At present, this process requires someone who can read the resume and categorize the applicant.

The categorization process now used requires a skilled professional recruiter to read the resume. The recruiter uses his experience and knowledge to classify the applicant into one or several job categories. The knowledge required to perform the classification includes knowing which skills are required to perform various jobs, understanding the corporate job structure, and identifying an applicant's strengths and weaknesses.

The knowledge of which skills are required for a particular job category is acquired by professional recruiters over a number of years. Typically, a recruiter starts by working in a particular job area and reviews resumes which have already been sorted by a more experienced recruiter. This process allows the recruiter to gain experience. After a period of time the recruiter becomes familiar with the contents of applicants' resumes in this particular job category and can distinguish resumes falling within this job category from those more applicable to other categories.

In addition to knowing the necessary job skills, the recruiter must understand the job structure or organizational chart of both his own and other companies. In categorizing applicants an experienced recruiter makes frequent use of the job titles held by the applicant which can indicate the applicant's previous positions.

A recruiter should also be able to identify the strengths and weaknesses of an applicant. Although the resume may indicate a very wide range of skills, the applicant may be proficient in only a small subset of these skills. A skilled recruiter is able to identify which skills are accurate descriptions of the applicant's talent and which are just "fluff" to inflate the applicant's resume.

Computer programs which attempt to simulate human knowledge and understanding are called knowledge-based systems. In particular, those which simulate an expert's knowledge in a particular domain are called expert systems. An expert system capable of performing job categorization would simulate the categorization skills of an experienced recruiter. General techniques used in creating expert systems include using rules which embody the expert's procedural knowledge (rule-based systems), using data structures containing the data known by the expert (frame-based systems), and using probabilistic methods to simulate expert judgement (evidential reasoning systems).

Rule-based systems are very effective if the expert's knowledge can be expressed in terms of logical relations of "IF-THEN" rules. An example of an IF-THEN rule is given below:

EXAMPLE 1

IF the applicant has a degree in Electrical Engineering
AND the applicant has circuit design experience
THEN the applicant is a hardware engineer.

This simple example demonstrates, however, that rules alone are not sufficient to do job classification. Consider an applicant who graduated with a degree in electrical engineering 10 years ago, worked as a circuit designer for a couple of years, returned to school, received an MBA, and is now working as a financial executive. It would be wrong to classify this person as presently an electrical engineer. Although the rule above could be augmented to include further conditions necessary to generate the classification of a hardware engineer only when appropriate, it is easy to see how complex such a rule would become.

Frame-based systems use frame data structures having slots, values and possibly rules to represent the knowledge of experts. The slots are named for the type of data required to fill the slot. In the example below, one of the slots is called "Name". To fill this slot, a particular value is required. For "Name", the applicant's name would be the proper value. Each slot may further be associated with particular rules. The rules resemble the type of rules used in a rule-based system, the difference being that in frame-based systems changes to the slot values trigger the operation of the rules. In rule-based systems, there is no such close coupling between the rules and the data.

EXAMPLE 2

```
Name:
Degree:
    (if-added
        IF degree is MBA
            THEN disregard engineering degree)
Experience:
    .
    .
    .
```

Each "slot" (e.g. Name, Degree, Experience, etc.) has a value representing the relevant data based on the applicant's resume. Notice the rule indicating that if an MBA is added to an applicant's frame, the engineering degree is effectively cancelled. This rule could be used to preclude the incorrect classification noted in the previous example. A given frame can have many slots, each slot capable of having one or more values and each slot possibly having associated rules.

Consider now an applicant who has an engineering degree and an MBA but who continues to work as an engineer. In this case, using the rule in the frame shown in the example would cause the applicant to be incorrectly classified once again. Although this problem can be circumvented through modification of the rules, as the rules become increasingly complex, so does the interaction between the rules and the data structures. Eventually, the complexity may become so great that it becomes impossible to determine which rules would be applied or take effect in any given circumstance.

The complexity of these rule-based and frame-based systems can be reduced by using probabilistic methods in which the conclusions generated are not certain but very likely to be true. Using these methods with examples 1 and 2 might result in rules which read as follows:

IF the applicant degree is in Electrical Engineering
AND the applicant also has an MBA
THEN
 Prob(the applicant is a hardware engineer)=10%
 Prob(the applicant is an engineering manager)=70%
 Prob(the applicant category is unknown)=20%

The combination of either type of expert system with these probabilistic techniques is particularly effective when a relatively large amount of data is available for analysis prior to assigning the probabilities. In this case the probabilistic conclusions tend toward the actual case. Both rule-based and frame-based knowledge can be adapted to support the probabilistic methods.

Although the use of probabilistic methods in relation with rule-based and frame-based systems is known, these techniques have not been applied to the analysis of resumes, particularly the determination of which positions an applicant could suitably fill. The particular nature of resumes, with their various blocks of ungrammatical text and non-standard formats have previously prevented their computer analysis.

SUMMARY OF THE INVENTION

The present invention fulfills the need for an automated computerized system for resume analysis. By using a combination of frame-based and rule-based techniques, and further by incorporating probabilistic methods, the system is able to classify an applicant according to his employment potential with a high degree of accuracy.

The present invention uses a method and apparatus which converts resumes into a series of correctly ordered blocks comprised of computer understandable character strings which strings contain the contents of the resume. These blocks are processed by an extractor which uses a predefined pattern language called a "Grammar" to locate and extract words and word groups containing information believed to be relevant to the analysis of an applicant's capabilities. These words and word groups comprise the values which are used to fill the slot in the frame data structure. Finally, the contents of the frame data structure are operated upon using rule-based techniques interacting with probabilistic methods to categorize the job applicant with a high degree of accuracy using only his resume.

BRIEF DESCRIPTION OF THE DRAWINGS

FIG. 3 is a sample of category groups;

FIGS. 4A and 4B are lists of the various terms which are related to the Clerical job category;

DETAILED DESCRIPTION

Figure 1:
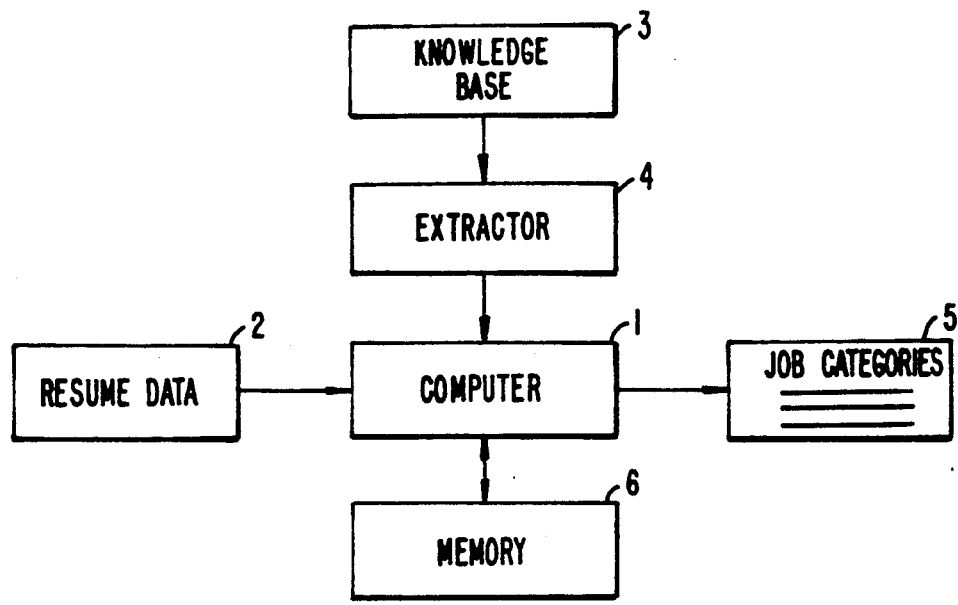
FIG. 1 is a block diagram of a system for practicing the present invention.

FIG. 1 illustrates an apparatus implementing the preferred embodiment of the present invention. A digital computer system 1, using the method and apparatus described herein, operates upon data 2, derived from a printed resume. A Sun 3/50 computer from Sun Microsystems, Mountain View, Calif. has been successfully used as the computer in this embodiment.

It should also be noted that the computer software which realizes this invention is frequently referenced in this description. This software has been appended as Appendix 1.

Data 2 is derived from the printed resume by using the method and apparatus described in the commonly owned U.S. patent application entitled "A Method and Apparatus for computer Understanding and Manipulation of Minimally Formatted Text Documents" Ser. No. 07/345,930 which was filed on May 1, 1989, the entire specification of which is hereby incorporated by reference. The method and apparatus described therein accepts a printed resume as input and converts it into a series of properly ordered blocks of computer understandable character strings.

The character strings, called data 2, are delivered to computer 1. Computer 1 then passes data 2 through extractor program 4 which extracts words and word groups considered relevant to the categorization process. A knowledge base 3 contains a set of word patterns, also known as the grammar, which specify which words and word groups will be extracted by extraction program 4 working upon data 2. The words and word groups are placed in frame data structures. The words and word groups returned in the frame data structures can be encoded in electronic form and stored on any type of computer data storage device or it may be in a hard-copy printed format. The present invention's preferred embodiment operates upon frame data structures stored electronically in memory 6. In the preferred embodiment, the frames will contain such information as applicant's name, job titles, degrees, etc.

Computer 1 also uses memory 6 for storing all or part of knowledge base 3 and extractor program 4, the operation of which will be subsequently described. The job categories which are found to be appropriate are generated as output 5. The output can be in either an electronic format or a printed one.

Figure 2:
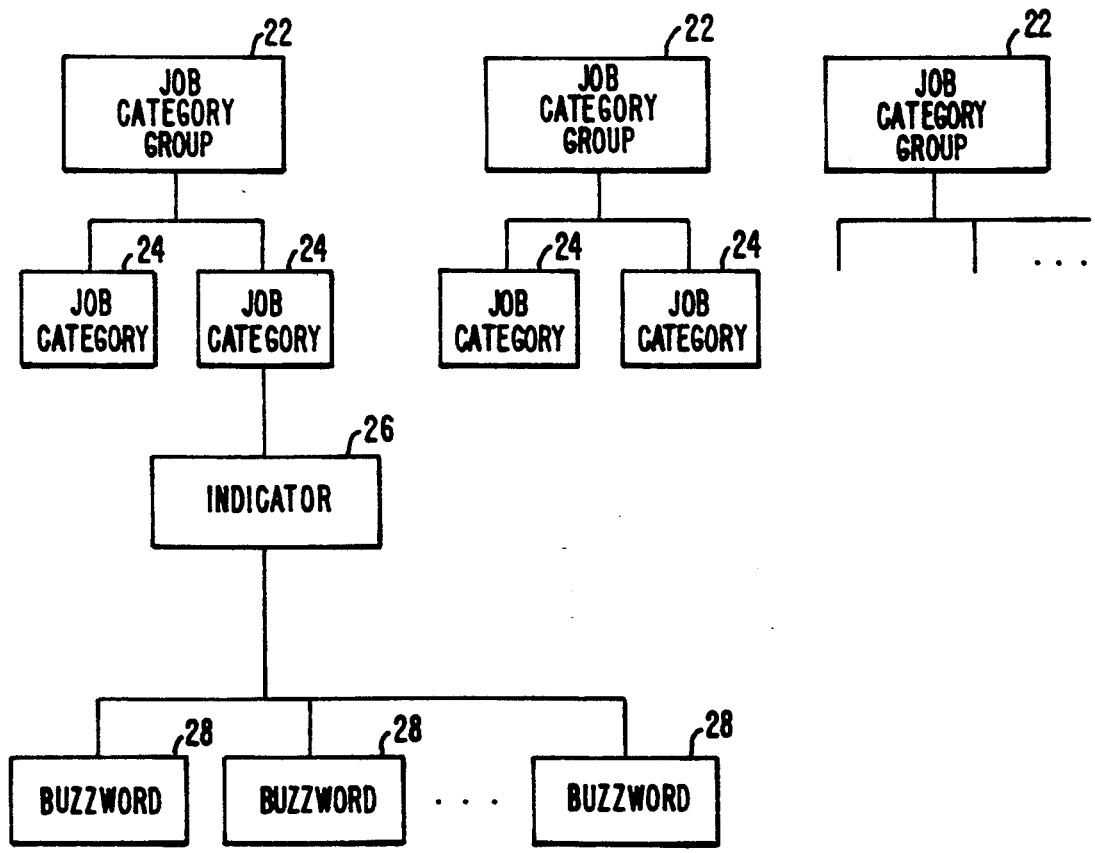
FIG. 2 is a chart of the hierarchical organization of the knowledge base.

FIG. 2 is a logical diagram of the hierarchical structure of knowledge base 3 in a general form. One particular group of word patterns (grammar) used to implement this logical hierarchy is shown in Appendix 2. At the top of the hierarchy are job category groups 22 ("Groups"). Each group is comprised of a number of job categories 24 ("Job Categories"). Under each job category 24 there are various indicators 26. Finally, under each indicator 26 there may or may not be various "buzzwords" 28. This hierarchy is only an example and other such hierarchical structures are possible. The meaning and import of each of these various classifications is discussed below.

FIG. 3 is a list of several exemplary groups (22, FIG. 2) and their attendant job categories (24, FIG. 2). The groups are 0001 Administrative, 0011 Marketing/Sales, 0016 manufacturing, and 0025 Technical. Under the Marketing/Sales group there are three job categories: 0012 Advertising/Comm, 0013 Marketing, and 0014 Sales. The groups and job categories shown in FIG. 3 are merely examples. Many different groups and job categories can be readily created to meet the needs of particular employers.

FIGS. 4A and 4B are a list of exemplary indicators and buzzwords (26 and 28, FIG. 2) Each job category has related indicators and each indicator may have an attendant list of buzzwords. The presence of these buzzwords in a particular resume increases the probability that the applicant should be classified in the job categories with which these buzzwords are associated. Typical indicators, which can be considered as logical groupings of buzzwords, are 0036 Desktop Publishers and 0047 Management. Indicator 0047 Management has buzzwords 0048 Executive and 0049 Manager. It should be noted that all the indicators and buzzwords in FIGS. 4A and 4B are related to job category Clerical. In FIG. 4A, the job title indicator at line 0006 has buzzwords associated with it which comprise various different job titles which might be used by someone holding a position in the particular job category, here Clerical. Education indicators may have buzzwords which comprise the various degrees which would normally be held by persons in the job category. Skill indicators contain lists of buzzwords which someone might use to describe their aptitude in the area of relevance. For example, someone who claims experience in "MacWrite" would have desktop publishing skills and would, therefore, increase the likelihood that he or she would be categorized in the Clerical job category.

Any given indicator may occur under several different job categories. For example, an indicator such as 0047 "Management" (FIG. 4A) might occur under a large number of job categories. Furthermore, indicators might occur in two job categories under two entirely different groups. For example, "Management" could also occur under the engineering job categories in "Technical" (see FIG. 3). Similarly, the same buzzword might occur under several different indicators. In FIGS. 4A and 4B, the buzzwords at 0043 in the "Desktop Publishers" indicator and at 0088 in the "Word Processors" indicator are both "Macwrite".

Using knowledge base 3 constructed according to the foregoing description, extractor program 4 (see FIG. 1) scans data 2 and extracts words and word groups which match the word patterns (the groups, job categories, indicators and buzzwords) in knowledge base 3. The words and word groups are stored in memory 6 in a frame data structures. After this process is complete, the present invention selects which job category or categories are most appropriate. The way this is carried out is described below.

A principle behind the entire job categorization process is to use the indicators which appear in a resume as evidence that the applicant should be classified in the job category or categories which contain these indicators. Additionally, this invention provides a method to resolve the ambiguous cases wherein either a skill occurs in more than one job category or a buzzword occurs in more than one skill, or both.

Figure 6:
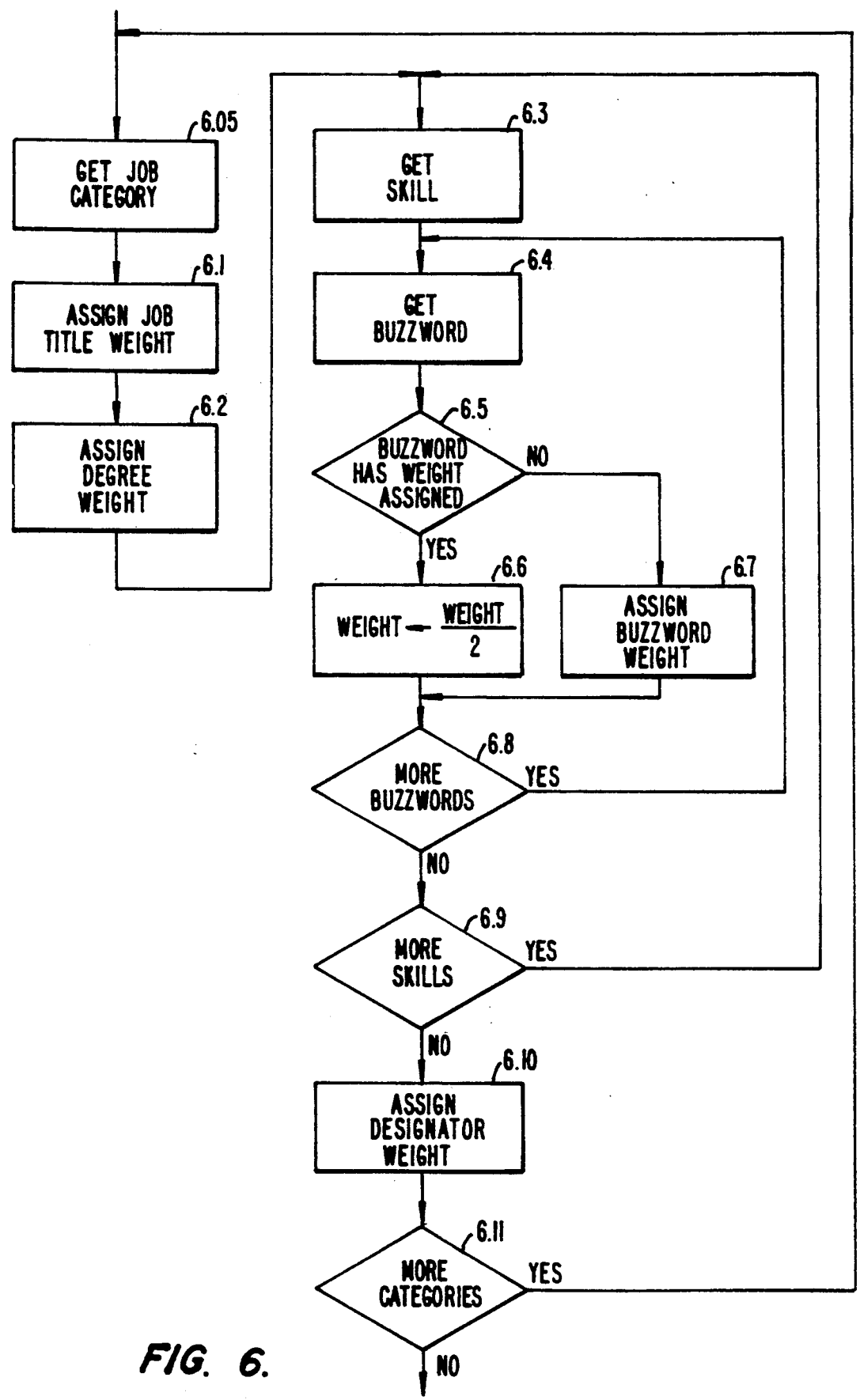
FIG. 6 is a flowchart of the process whereby the weights of various terms are assigned.

For each job category, a weight determination algorithm assigns to each job title, degree, buzzword, and designator under the job category an integer value which is directly proportional to its strength as an indicator. Any other word not assigned a value by this process is assigned a value 0 with respect to the process of job categorization. The weight assignment process is shown in FIG. 6 (see Appendix 1, listing "EXTRACT-/devaluate.c").

It should be noted that the proper evaluation of the job categories requires certain predefined constants. These constants are derived from an empirical study of a large number of resumes. A list of these constants is given below in Table 1.

TABLE 1

MAX_THRESHOLD 12
MIN_THRESHOLD 12
STRONG_THRESHOLD 20
DEGREE_PTS 2
BUZZWORD_PTS 2
CATEGORY_PTS 2
SKILL_PTS 2
SKILL_THRESHOLD 4
DOMINATE_FACTOR 3
OBJ_FACTOR 1

Figure 5:
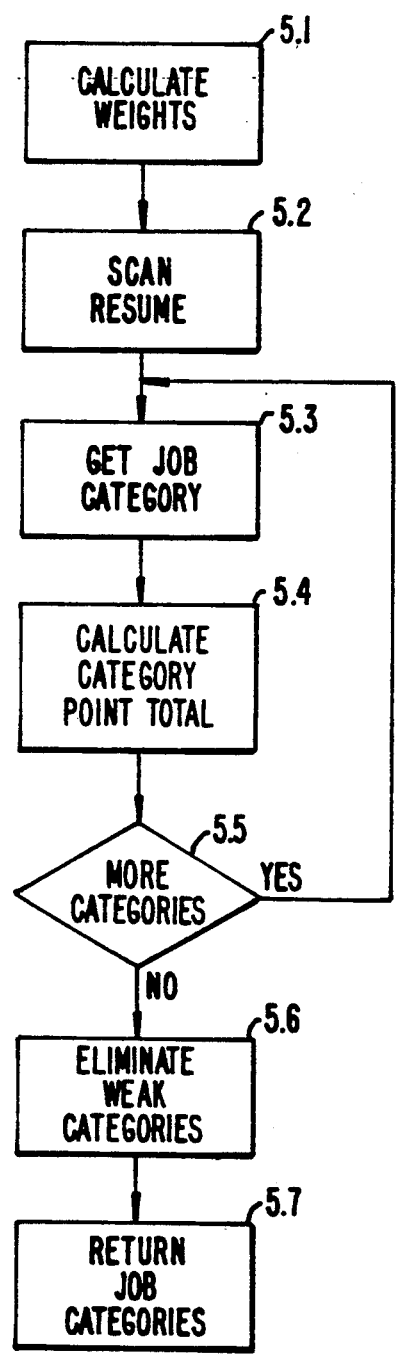
FIG. 5 is a flowchart of the process by which relevant job categories are determined.

FIG. 5 is a flow chart that illustrates the overall job categorization process. In step 5.1, the weights are calculated and all category point totals are initialized to zero (see description below and FIG. 6). Step 5.2 indicates both the process by which the resume is converted into computer understandable strings of characters and the process by which words and word groups are extracted using extractor program 4 in conjunction with knowledge base 3 (FIG. 1). The former process is fully described in the co-pending application. The latter process has already been described in this specification. The output from the latter process is a frame data structure containing the educational degrees, job titles if they appear in the "Objective" section of the resume, and all other indicators occurring elsewhere on the resume.

A first job category is retrieved from memory 6 (FIG. 1) in step 5.3. The job category point total is calculated in step 5.4. This step determines the likelihood that the applicant should be classified in this job category (see description below and FIG. 7). This calculation is repeated for all the job categories by looping the process from step 5.5 to step 5.3 until all job categories are analyzed. Weak categories are eliminated in step 5.6 (see description below and FIG. 8). The proper job categories of the applicant, as determined by this process, are made available as output at step 5.7.

FIG. 6 is a flowchart of the weight calculations. At step 6.05 the first job category is retrieved from memory 6 (FIG. 1). Job title buzzwords are assigned the value MAX_THRESHOLD in step 6.1. Each education degree is assigned a value equal to the variable DEGREE_PTS in step 6.2. In step 6.3, the first skill indicator in the job category is retrieved from the memory. In step 6.4, the first buzzword from the first skill indicator's list of "buzzwords" is likewise retrieved from the memory. If the buzzword has not previously been assigned a weight (see step 6.5, and code function "install", Appendix 1, page 01067), then it is assigned a value of BUZZWORD_PTS at step 6.6. If the buzzword has previously been assigned a weight, then its weight is reduced by ¼ in step 6.7. Buzzwords are retrieved from memory 6 (FIG. 1) until all buzzwords for a skill indicator have been assigned a weight (see step 6.8 and loop to step 6.4). This process is likewise performed on all skill indicators for a given job category by looping the process back to step 6.3 if the test for more skill indicators at step 6.9 is true. When all skill indicators for a given job category have been processed, each designator indicator is assigned a value called CATEGORY_PTS in step 6.10. At step 6.11 the process loop back to step 6.05 until all job categories have been processed.

Figure 7:
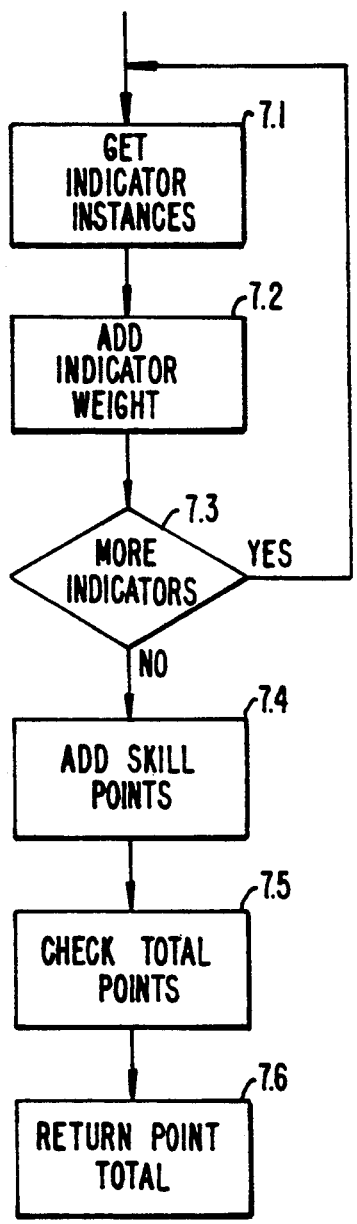
FIG. 7 is a flowchart of showing how category points are assigned.

FIG. 7 is a flow chart that illustrates the process for calculating category point totals for each job category (see Appendix 1, listing "EXTRACT/action.c". At step 7.1, the matched pattern instances from the particular resume are examined for occurrences of indicators and buzzwords of the particular job category. In the case of buzzwords, the weight for the particular buzzwords found is also added to the job category point total at step 7.2. Code function "TotalSkillBuzz" (Appendix 1) calculates the total for buzzword indicators. If a buzzword occurs within more than one job category, it is unlikely that buzzword has any great significance. On the other hand, if a buzzword occurs in only one job category, it is likely to be quite significant. Thus, if a buzzword occurs multiple times in the resume and that buzzword is associated with many different job categories, its weight is added only once, when it first occurs. On the other hand, if the buzzword occurs multiple times in the resume but is associated with only one job category, its weight is added for each occurrence.

Code function "SumMAX" (Appendix 1) updates the job category point total for job title indicators. Code functions "PointSum" (Appendix 1) and "Sum" (Appendix 1) update the job category point total for other indicators. In the case of an education indicator, the indicator must be found in the resume's education section to be counted. At step 7.3, a check is made to see if there are more indicators for the particular job category. If there are, the process returns to step 7.1 and gets the next indicator.

If there are no more indicators for the particular job category, SKILL_PTS are added to the job category point total for each skill indicator whose related buzzwords have contributed at least SKILL_THRESHOLD points at step 7.4. In step 7.5 (code function "Threshold", Appendix 1), the job category point total is compared with the MIN_THRESHOLD. If the job category point total is less than the MIN_THRESHOLD, the category point total is reset to zero. The job category point total is returned to the previously described categorization process (see steps 5.4, FIG. 5) at step 7.6.

Figure 8:
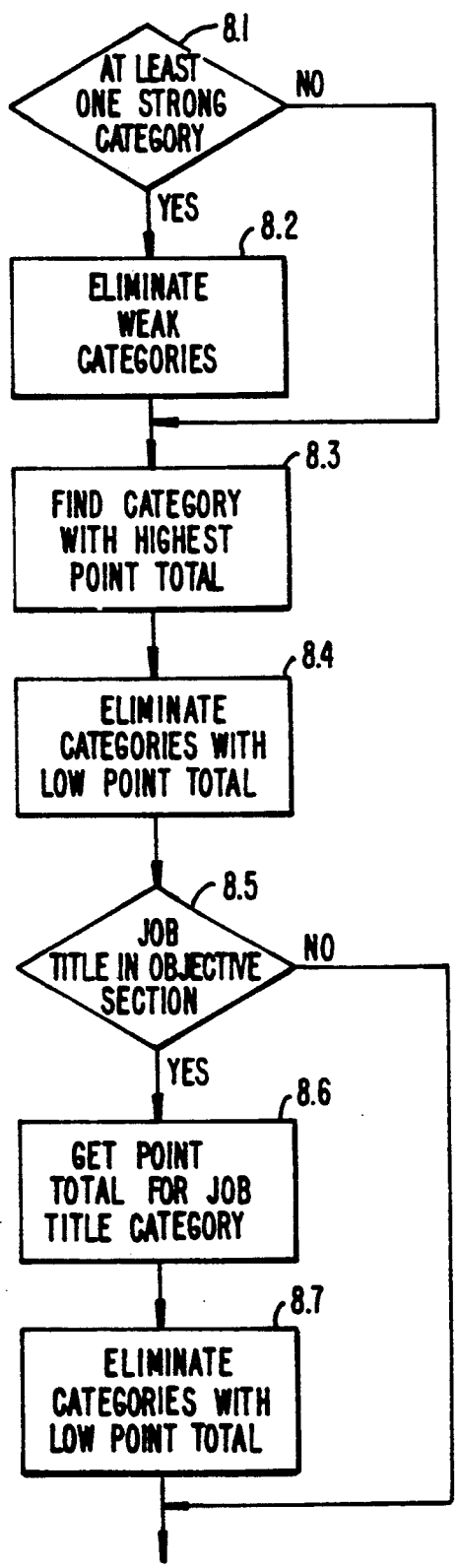
FIG. 8 is a flowchart showing how weak categories are eliminated.

FIG. 8 illustrates the process used to eliminate weakly suggested job categories (see Appendix 1, listing "EXTRACT/category.c", functions "CheckCategory" and "CheckSubcat"). At step 8.1 a check is made to see if there is at least one job category with more than STRONG_THRESHOLD points. If there is at least one such job category, then, in step 8.2 all job categories with less than STRONG_THRESHOLD points are reset to a point total of zero. HIGH_POINTS, the highest point total of all job categories is determined in step 8.3. In step 8.4, job categories C_low, whose point total satisfies the following inequality have their point total reset to zero:

$$\text{points}(C\_low) \times \text{DOMINATE\_FACTOR} <= -\text{HIGH\_POINTS}.$$

At step 8.5 a check is made to see if there is a job title in the objective section of the resume. If there is a job title, then OBJ_POINTS is set to the point total of the job category which includes (as a job title indicator) the job title which was found in the objective section. At step 8.7, the point total of job categories C_notobj which satisfy the following inequality have their point total reset to zero:

$$\text{points}(C\_notobj) \times \text{OBJ\_FACTOR} <= \text{OBJ\_POINTS}.$$

At this point, whatever job categories which still have a positive value are returned to the categorization process at step 5.7 in FIG. 5. If there were no job titles in the objective section, then the process returns to step 5.7 of FIG. 5 from step 8.5, skipping steps 8.6 and 8.7.

The previous description has shown how the present invention combines both frame- and rule-based systems and applies probabilistic methods to the combination. A knowledge base called a grammar is created containing word patterns which indicate skill in a particular job category. These word patterns are weighted to reflect their relative strength as skill indicators. A string of computer understandable character strings is accepted as input. An extractor module locates words and word groups in the input which match the word patterns in the knowledge base and places these words and word groups in frame data structures. The weighting and summing operations are then performed on these frame data structures, the final results comprising the job category or categories most applicable to the applicant whose resume is being analyzed.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, this categorization process is not limited to resumes. Additionally, the constants in Table 1 could be changed for optimum performance with different document types (e.g. job application forms in place of resumes). The grammar (knowledge base) used by the extractor could also be modified to retrieve more or different types of information. Many such changes or modifications are readily envisioned. The specification and drawings are, accordingly, to be regarded in an illustrative rather than in a restrictive sense.

APPENDIX 1

Code Listing for the Categorization Process

```c
/*----------------------------------------------------------------
 * utils.h
 *---------------------------------------------------------------*/ include <stdio.h> define MESSAGE_COLLECT 0
define REINIT_COLLECT 1 extern char *Memory;

extern int HashString();
extern char *StrSave();
extern char *StrNSave();
extern BOOLEAN StrEqu();
extern BOOLEAN StrEquiv();
extern int ConvertString();
extern GarbageCollect();

typedef struct _converter
{
    char *string;
    int value;
}CONVERTER;

/*----------------------------------------------------------------
 * Copyright 1988, Resumix, Inc.
 *
 * utils.c
 *---------------------------------------------------------------*/ include <stdio.h>
include <ctype.h>
include "includes.h"

char *Memory;
static int MemoryPointer;
static int MessageStart = 0;

/*----------------------------------------------------------------
 * HashString hashes 'string' and returns its hashed value
 * bug - the algorith is extremely simpleminded
 *---------------------------------------------------------------*/
int
HashString(string)
char *string;
{
    register int hash;

hash = 0;
    while(*string != '\0')
        hash = (hash + 1) * UpperMap[*string++];
    return(hash & 0x3ff);
}

/*----------------------------------------------------------------
 * StrSave saves 'string' in the dynamic character memory and returns a pointer
 * to the saved string
 *---------------------------------------------------------------*/
char *
StrSave(string)
char *string;
{
    char *str;

if (string == NULL) return(NULL);
    str = &Memory[MemoryPointer];
    MemoryPointer += strlen(string) + 1;
```

```c
    if (MemoryPointer>=MAX_MEMORY)
    {
        fprintf(stderr,"ERROR in StrSave: out of space\n");
        return("");
    }
    strcpy(str, string);
    return(str);
}

/*---------------------------------------------------------------------
 * StrNSave saves up to 'nchar' characters from 'string' in the dynamic
 * character memory and returns a pointer to the saved string
 *--------------------------------------------------------------------*/
char *
StrNSave(string, nchar)
char *string;
int nchar;
{
    char *str;

if (string == NULL) return(NULL);
    str = &Memory[MemoryPointer];
    MemoryPointer += nchar + 1;
    if (MemoryPointer>=MAX_MEMORY)
    {
        return("");
    }
    strncpy(str, string, nchar);
    str[nchar] = '\0';
    return(str);
}

BOOLEAN
StrStarEqu(string1, string2)
char string1[], string2[];
{
    int len;
    char save;
    BOOLEAN answer;

len = strlen(string1);
/*
    printf("STAREQU %s %s %d\n", string1, string2, len);
*/
    if (len <= strlen(string2))
    {
        save = string2[len];
        string2[len]= '\0';
        answer = StrEquiv(string1, string2);
        string2[len] = save;
/*
        if (answer) printf("gotit\n");
*/
        return(answer);
    }
    else
        return(FALSE);
}

BOOLEAN
CharEquiv(char1, char2)
char char1, char2;
{
  if (char1 == UpperMap[char1])
      return(char1==char2);
  else
      return(UpperMap[char1] == UpperMap[char2]);
}
static
BOOLEAN
StrSpellCheck(correct, unknown, count)
```

```
char *correct, *unknown;
int count;
{
   int len1, len2, errors;

/* get the lengths of the 2 strings */
   len1= strlen(correct);
   len2= strlen(unknown);
/* initialize errors to the extra characters in the correct string */
   errors = MAX(len1 - len2, 0);
/* until the error count exceeds the maximum */
   while(errors <= count)
   {
/*    if the ends of the strings have been reached, return success */
      if (*correct == '\0' && *unknown == '\0')
         return(TRUE);
/*    if the next characters of each string are different */
      if (UpperMap[*correct] != UpperMap[*unknown])
      {
         if (len1 > len2)
         {
            correct++; len1--;
         }
         else
         {
            errors++;
            unknown++; len2--;
         }
      }
      else
      {
         correct++; len1--;
         unknown++; len2--;
      }
   }
   return(FALSE);
}

BOOLEAN
StrSpellEqu(string1, string2, count)
char *string1, *string2;
int count;
{
   if (StrSpellCheck(string1, string2, count))
      return(TRUE);
   return(StrSpellCheck(string2, string1, count));
}

/*-----------------------------------------------------------------
 * GarbageCollect resets the dynamic string save memory pointer to
 *    - start of character memory when 'mode' = REINIT
 *    - start of message specific memory when 'mode' = MESSAGE
 *-----------------------------------------------------------------*/

GarbageCollect(mode)
int mode;
{
   switch(mode)
   {
      case REINIT_COLLECT:
         MemoryPointer = 0;
         MessageStart = 0;
         NumPhrase = 0;
         NumPair = 0;
         break;
      case MESSAGE_COLLECT:
         if (MessageStart == 0)
            MessageStart = MemoryPointer;
         MemoryPointer = MessageStart;
         break;
   }
}
```

```
PrintUtilStats()
{
    printf("ClassSave = %d, ResumeSave = %d\n", MessageStart,
           MemoryPointer-MessageStart);
}

/*---------------------------------------------------------------------
 * Copyright 1988, Resumix, Inc.
 *
 * template.c
 *--------------------------------------------------------------------*/ include <stdio.h> include "includes.h"

DATA_FIELD *Person;
int NumPerson;

WriteTemplates(text_file, bitmap_file)
char *text_file, *bitmap_file;
{
    register int i, j, k, n, ln;
    int uniq, child, grandchild;

for(i = 0, ln=0; i < NumTemplate; i++)
    {
        for(j = 0; j < Template[i].num_instances; j++)
        {
            for(n=0, uniq=1; n<j && uniq; n++)
            {
                for(k=0, uniq=0; k < Template[i].num_slots && !uniq; k++)
                {
                    uniq=strcmp(Entity[Template[i].instance[j].entity[k]].value,
                        Entity[Template[i].instance[n].entity[k]].value);
                }
            }
            if (uniq)
                for(k = 0; k < Template[i].num_slots; k++)
                {
                    child = Template[i].instance[j].entity[k];
                    if (Entity[child].value[0]!='\0')
                    {
                        if (ln==MAX_DATA_FIELDS-1) break;
                        strcpy(Person[ln].title, Template[i].slot[k].name);
                        strcpy(Person[ln].value, Entity[child].value);
                        Person[ln].warning= Entity[child].warning;
                        ln++;
                    }
                }
        }
        Template[i].num_instances = 0;
    }
    strcpy(Person[ln].title, "End");
    NumPerson = ln;
} int
EntityMatch(slot, child, parent_found)
SLOT *slot;
int child;
BOOLEAN parent_found;

{
    int ret_val;

for(ret_val= NO_ENTITY; EntityChild[child] != NO_ENTITY; child++)
    {
        if (parent_found)
        {
            if (Entity[EntityChild[child]].entity_type == slot->entity_type)
            {
```

```
                ret_val= EntityChild[child];
                break;
            }
            else
            {
                ret_val = EntityMatch(slot, Entity[EntityChild[child]].children,
                        TRUE);
            }
        }
        else
        {
            if (Entity[EntityChild[child]].entity_type == slot->parent_type)
            {
                ret_val = EntityMatch(slot, Entity[EntityChild[child]].children,
                        TRUE);
            }
            else
            {
                ret_val = EntityMatch(slot, Entity[EntityChild[child]].children,
                        FALSE);
            }
        }
        if (ret_val!=NO_ENTITY) break;
    }
    return(ret_val);
}

FillTemplates()
{
    register int j;
    int i, entity;
    int instance, child;

for(i = 0; i < NumTemplate; i++)
    {
        instance = 0;
        for(entity = EntityPtr[Template[i].entity_type];
            entity != NO_ENTITY;
            entity = Entity[entity].next)
        {
            if (entity==NULL_ENTITY) break;
            if (instance==MAX_INSTANCES-1) break;
            for(j = 0; j < Template[i].num_slots; j++)
            {
                Template[i].instance[instance].entity[j] =
                    EntityMatch(&Template[i].slot[j], Entity[entity].children,
                        Template[i].slot[j].parent_type==Template[i].entity_type);
            }
            instance++;
        }
        Template[i].num_instances = instance;
        Template[i].current_instance = 0;
    }
}

InitTemplates()
{
    register int i, j;

Person = (DATA_FIELD *)malloc(MAX_DATA_FIELDS * sizeof(DATA_FIELD));
    for(i = 0; i < NumTemplate; i++)
    {
        Template[i].num_instances = 0;
        Template[i].current_instance = 0;
        for(j = 0; j < Template[i].num_slots; j++)
        {
            Template[i].instance[0].entity[j] = NO_ENTITY;
        }
    }
}
```

```c
/*-----------------------------------------------------------------------
 * Copyright 1988, Resumix, Inc.
 *
 * prescan.c
 *-----------------------------------------------------------------------*/ include <stdio.h>
include <ctype.h>
include "includes.h"

ENTITY *Entity;
int NumEntity;
ENTITY_TYPE *EntityPtr;
LOCATION *WordLoc;
int NumWord;
unsigned short *EntityChild;
int NumEntityChild;

static unsigned char Word[500];
static int Start, End;
static BOOLEAN Warning;

static BOOLEAN FirstNumWordError;
static BOOLEAN FirstNumEntityError;

static
BOOLEAN
GetWord(pointer)
unsigned char **pointer;
{
    register unsigned char *ptr, *word;
    int i, len, is_alpha, error_code;

/* while skipping over blank space */
    for(ptr = *pointer; DocumentMap[*ptr] == 0; ptr++)
    {
        Warning = FALSE;
/*      if a bad character is encountered */
        Warning = *ptr >= 0x80;
/*      if white space character is non blank */
        if (InsideMap[*ptr] > ' ')
        {
/*          save the character as a word */
            AddEntity(InsideMap[*ptr], NO_PHRASE, Ascii[*ptr], NumWord, NumWord,
                    NO_ENTITY, Warning);
            AddWordLoc( ptr - Message, ptr - Message);
        }
/*      else if white space character is a new line */
        else if (*ptr == '\n')
        {
/*          add new line as a word */
            AddEntity(LINE_END, NO_PHRASE, "", NumWord, NumWord,
                    NO_ENTITY, Warning);
/*          remember where the word came from in the resume */
            AddWordLoc( ptr - Message, ptr - Message);
        }
    }
/* if the end of the document has been reached, kick out */
    if ((*ptr == '\0') || (*ptr == 0x80)) return(FALSE);
/* prepare to parse the word */
    word = Word;
    Start = ptr - Message;
/* remember whether the word starts with an alpha character */
    is_alpha = AlphaMap[*ptr];
/* for each character in the current word */
    while(DocumentMap[*ptr] > 1)
    {
        Warning |= *ptr > 0x80;
/*      if type has changed between alpha and numeric, break the word */
        if (is_alpha && NumMap[*ptr])
            break;
        else if (!is_alpha && AlphaMap[*ptr])
            break;
```

```
/* put current character into word being built */
      *word++ = InsideMap[*ptr++];
   }
/* remember where word ended */
   End = (ptr - 1) - Message;
   *word = '\0';
   *pointer= ptr;
   return(TRUE);
}

AddEntity(type, phrase, value, start, end, children, warning)
int type;
unsigned short phrase;
char *value;
unsigned short start, end;
int children;
BOOLEAN warning;
{
   register int i;
   register unsigned short *before;

for(i = EntityPtr[type]; i != NO_ENTITY; i = Entity[i].next)
   {
       if (start==Entity[i].start && end==Entity[i].end &&
               strcmp(value, Entity[i].value)==0)
          return;
   } ifdef DEBUG
   if (type >= FIRST_CLASS)
   {
       if (ClassList[type-FIRST_CLASS].class_syn == TYPE_CLASS)
          printf("Class %-15s %4d %4d %s\n", ClassList[type-FIRST_CLASS].name,
              start, end, value);
       else
          printf("Syn   %-15s %4d %4d\n", ClassList[type-FIRST_CLASS].name,
              start, end);
   }
#endif
   if (NumEntity == MAX_ENTITY)
   {
       if (FirstNumEntityError)
       {
          ExtractWarning("Exceeded maximum number of entities");
          FirstNumEntityError = FALSE;
       }
       return;
   }
/* sort entity based on start position */
   before = &EntityPtr[type];
   for(i = EntityPtr[type]; Entity[i].start < start; i = Entity[i].next)
   {
       before = &Entity[i].next;
   }
   Entity[NumEntity].next = *before;
   *before = NumEntity;

Entity[NumEntity].phrase = phrase;
   Entity[NumEntity].value = value;
   Entity[NumEntity].start = start;
   Entity[NumEntity].end = end;
   Entity[NumEntity].children = children;
   Entity[NumEntity].entity_type = type;
   Entity[NumEntity].warning = warning;
   NumEntity++;
}

AddWordLoc(start, end)
int start, end;
{
   if (NumWord == MAX_RES_WORDS)
   {
```

```
        if (FirstNumWordError)
        {
            ExtractWarning("Exceeded maximum number of words in resume");
            FirstNumWordError = FALSE;
        }
        return;
    }
    WordLoc[NumWord].start = start;
    WordLoc[NumWord].end = end;
    NumWord++;
} static
GetString()
{
    register int hash, i;

hash = HashString(Word);
    for(i = WordHashTable[hash]; i != NO_WORD; i = WordIndex[i].next_word)
    {
        if (StrEquiv(&WordList[WordIndex[i].word], Word))
            AddEntity(WordIndex[i].entity_type, NO_PHRASE,
                    &WordList[WordIndex[i].word],
                    NumWord, NumWord, NO_ENTITY, Warning);
    } for(i = 0; i < NumStarWords; i++)
    {
        if (StrStarEqu(&WordList[WordIndex[StarWord[i]].word], Word))
            AddEntity(WordIndex[StarWord[i]].entity_type, NO_PHRASE,
                    &WordList[WordIndex[StarWord[i]].word],
                    NumWord, NumWord, NO_ENTITY, TRUE);
    } for(i = 0; i < NumSpellWords; i++)
    {
        if (StrSpellEqu(&WordList[WordIndex[SpellWord[i]].word], Word,
                    WordIndex[SpellWord[i]].error_count))
            AddEntity(WordIndex[SpellWord[i]].entity_type, NO_PHRASE,
                    &WordList[WordIndex[SpellWord[i]].word],
                    NumWord, NumWord, NO_ENTITY, TRUE);
    }
} static
GetNumber()
{
    register int value;
    register unsigned char *num, *str;

value = 0;
    for(str = Word; isdigit(*str); str++)
        value = value * 10 + (*str - '0');
    if (*str == '\0')
    {
        str = (unsigned char *)StrSave(Word);
        switch(strlen(Word))
        {
        case 1:
            AddEntity(NUMBER1_ENTITY, NO_PHRASE, str, NumWord, NumWord,
                    NO_ENTITY, Warning);
            break;
        case 2:
            AddEntity(NUMBER2_ENTITY, NO_PHRASE, str, NumWord, NumWord,
                    NO_ENTITY, Warning);
            break;
        case 3:
            AddEntity(NUMBER3_ENTITY, NO_PHRASE, str, NumWord, NumWord,
                    NO_ENTITY, Warning);
            break;
```

```
            case 4:
                AddEntity(NUMBER4_ENTITY, NO_PHRASE, str, NumWord, NumWord,
                         NO_ENTITY, Warning);
                break;
            case 5:
                AddEntity(NUMBER5_ENTITY, NO_PHRASE, str, NumWord, NumWord,
                         NO_ENTITY, Warning);
                break;
        }
        AddEntity(NUMBER_ENTITY, NO_PHRASE, str, NumWord, NumWord,
                 NO_ENTITY, Warning);
    }
}

PreScanMessage()
{
    unsigned char *pointer;
    register int i;
/***
    FILE *blk;

blk = fopen("Block.out", "w");
    fprintf(blk, "%s", message);
    fclose(blk);
***/
    pointer = Message;
    NumEntity = 1;
    NumEntityChild = 1;
    EntityChild[NO_ENTITY] = NO_ENTITY;
    Entity[NO_ENTITY].start = SHORT_INFINITY;
    Entity[NO_ENTITY].value = "";
    NumWord = 0;
    for(i = 0; i < MAX_ENTITY_TYPE; i++)
        EntityPtr[i] = NO_ENTITY;
    AddEntity(DOCUMENT_BEGIN, NO_PHRASE, "", 0, 0, NO_ENTITY, FALSE);
    AddWordLoc(0, 0);
    while(GetWord(&pointer))
    {
        GetString();
        GetNumber();
        AddWordLoc(Start, End);
    }
    AddEntity(DOCUMENT_END, NO_PHRASE, "", NumWord, NumWord, NO_ENTITY, FALSE);
    AddWordLoc(SHORT_INFINITY, SHORT_INFINITY);
    for(i = 0; i < NumClass; i++)
    {
        ScanForClasses(i);
        if (ClassList[i].action!=NULL)
        {
            (ClassList[i].action)(&ClassList[i]);
        }
    }
/***
    PrintPrescanStats();
    PrintUtilStats();
***/
}

InitPrescan()
{
    Entity = (ENTITY *)malloc(MAX_ENTITY * sizeof(ENTITY));
    EntityPtr = (ENTITY_TYPE *)malloc(MAX_ENTITY_TYPE * sizeof(ENTITY_TYPE));
    WordLoc = (LOCATION *)malloc(MAX_RES_WORDS * sizeof(LOCATION));
    EntityChild = (unsigned short *)malloc(MAX_ENTITY_CHILD * sizeof(unsigned short)
    FirstNumWordError = TRUE;
    FirstNumEntityError = TRUE;
    InitAction();
}

PrintPrescanStats()
{
    printf("NumEntity = %d\n", NumEntity);
```

```
    printf("NumEntityChild = %d\n", NumEntityChild);
    printf("NumWordInResume = %d\n", NumWord);
}

/*------------------------------------------------------------------
 * Copyright 1988, 1989, Resumix, Inc.
 *
 * readdefs.c
 *------------------------------------------------------------------*/
#include "../EXTRACT/includes.h"

extern char *ClassMemory;
extern long NumMemory;

define NUM_HASH 1024 long Errors = 0;

static long FirstLocalSymbol;
static long SymTabSize, LocalSymTabSize;
Symbol GlobalSymbolTable[SYMTAB_SIZE];
long LocalSymbolTable[LOCAL_SYMTAB_SIZE];
char FileName[50];

static
FatalError(format, arg1, arg2, arg3, arg4, arg5)
char *format;
int arg1, arg2, arg3, arg4, arg5;
{
    fprintf(stderr, format, arg1, arg2, arg3, arg4, arg5);
    exit(1);
}

CheckErrors(format, arg1, arg2, arg3, arg4, arg5)
char *format;
int arg1, arg2, arg3, arg4, arg5;
{
    fprintf(stderr, format, arg1, arg2, arg3, arg4, arg5);
    Errors++;
    if (Errors > 20)
    {
        fprintf(stderr, "Exceeded 20 errors. Good bye.\n");
        exit(1);
    }
} char *
ClassStrSave(string)
char *string;
{
    char *str;

if (string == NULL) return(ClassMemory);
    str = &ClassMemory[NumMemory];
    NumMemory += strlen(string) + 1;
    if (NumMemory >= MAX_CLASS_MEMORY)
    {
        FatalError("Exceeded maximum class memory");
    }
    strcpy(str, string);
    return(str);
}

/* look for keywords in first column of .def files */
static int
CheckType(type)
char *type;
{
    if (StrEquiv("class", type)) return(DEF_CLASS);
    if (StrEquiv("syn", type)) return(DEF_SYNONYM);
    if (StrEquiv("action", type)) return(DEF_ACTION);
    if (StrEquiv("template", type)) return(DEF_TEMPLATE);
```

```c
    if (StrEquiv("slot", type)) return(TEMPLATE_LINE);
    if (StrEquiv(";", type)) return(COMMENT);
    if (StrEquiv("#uses", type)) return(USES_LINE);
    return(UNKNOWN);
}

/* special classes define with hard code */
static CONVERTER SpecialClassList[] =
{
    "EOD", DOCUMENT_END,
    "BOD", DOCUMENT_BEGIN,
    "EOL", LINE_END,
    "NUMBER", NUMBER_ENTITY,
    "NUMBER1", NUMBER1_ENTITY,
    "NUMBER2", NUMBER2_ENTITY,
    "NUMBER3", NUMBER3_ENTITY,
    "NUMBER4", NUMBER4_ENTITY,
    "NUMBER5", NUMBER5_ENTITY,
    NULL, 0
};

/* find the entity type for 'name' */
ENTITY_TYPE
FindClass(name, class_type)
char *name;
char class_type;
{
    long first_symbol, j;
    register CLASS *class, *end;
    register char type;

type = class_type;
    if ((type == TYPE_CLASS) &&
        (j = ConvertString(name, SpecialClassList)) > 0)
        return(j);

end = &ClassList[NumClass];
    for(class = &ClassList[FirstLocalSymbol]; class < end; class++)
    {
        if ((class->class_syn == type) &&
            (strcmp(class->name, name) == 0))
            return(class->entity_type);
    }
    for(j = 0; j < LocalSymTabSize; j++)
    {
        first_symbol = GlobalSymbolTable[LocalSymbolTable[j]].first_symbol;
        end = &ClassList[GlobalSymbolTable[LocalSymbolTable[j]].num_symbols + first_s
        for(class = &ClassList[first_symbol]; class < end; class++)
        {
            if ((class->class_syn == type) &&
                (strcmp(class->name, name) == 0))
                return(class->entity_type);
        }
    }
    return(NO_CLASS);
}

CLASS *
StartClass(class_name, class_type)
char *class_name;
char class_type;
{
    if (NumClass==MAX_CLASS)
        FatalError("Exceeded maximum number of classes");
    switch(class_type)
    {
    case DEF_CLASS:
        ClassList[NumClass].class_syn = TYPE_CLASS;
        if (FindClass(class_name, TYPE_CLASS)!=NO_CLASS)
            CheckErrors("%s:\tRedefining class    : %s\n", FileName, class_name);
        break;
```

```
    case DEF_SYNONYM:
        ClassList[NumClass].class_syn = TYPE_SYNONYM;
        if (FindClass(class_name, TYPE_SYNONYM)!=NO_CLASS)
            CheckErrors("%s:\tRedefining synonym  : %s\n", FileName, class_name);
        break;
    }
    ClassList[NumClass].name = ClassStrSave(class_name);
    ClassList[NumClass].num_phrases = 0;
    ClassList[NumClass].first_phrase = NumPhrase;
    ClassList[NumClass].entity_type = NumClass + FIRST_CLASS;
    ClassList[NumClass].action = NULL;
    ClassList[NumClass].action_name = NULL;
    return(&ClassList[NumClass++]);
} static CONVERTER OperatorPairs[] =
{
    "N", NOT_OPERATOR,
    "I", IGNORE_OPERATOR,
    "O", OPTIONAL_OPERATOR,
    "*", REMEMBER_OPERATOR,
    "B", BEFORE_OPERATOR,
    "F", FIRST_OPERATOR,
    "W", WITHIN_OPERATOR,
    "C", CONTAINS_OPERATOR,
    "S", STOP_OPERATOR,
    "M", MERGE_OPERATOR,
    NULL, NO_OPERATOR
};

int
ConvertOperator(string)
char *string;
{
    register char *ptr;
    long result, n;
    char operator[32];

result = NO_OPERATOR;
    while(*string != '\0')
    {
        while(*string == ' ')
            string++;
        if (*string == '\0') break;
        if ((*string >= '0') && (*string <= '9'))
        {
            for(n=0; *string > ' '; string++)
                n= 10*n+ (*string-'0');
            result = (n & NUMBER_MASK) | (result & ~NUMBER_MASK);
        }
        else
        {
            ptr = operator;
            while(*string > ' ')
                *ptr++ = *string++;
            *ptr = '\0';
            result |= ConvertString(operator, OperatorPairs);
        }
    }
    return(result);
}

ENTITY_TYPE
AddWord(word)
char *word;
{
    register long ind, hash;
    long i, len;
    BOOLEAN star;
    char error_count;

star = FALSE;
```

```
   error_count = 0;
   len = strlen(word);
   for(i = 1; i < len; i++)
   {
      if (word[i] == ERROR_CHAR)
      {
         word[i++] = '\0';
         error_count = word[i] - '0';
      }
      if (word[i] == STAR_CHAR)
      {
         word[i] = '\0';
         star = TRUE;
      }
   } hash = HashString(word);
   for(ind = WordHashTable[hash]; ind != NO_WORD; ind = WordIndex[ind].next_word)
   {
      if ((WordIndex[ind].star == star) &&
          (WordIndex[ind].error_count == error_count) &&
          (StrEqu(word, &WordList[WordIndex[ind].word])))
      {
         return(WordIndex[ind].entity_type);
      }
   }
   ind = NumWords++;
   if (ind==MAX_WORDS)
      FatalError("Exceeded maximum dictionary words");
   WordIndex[ind].next_word = WordHashTable[hash];
   WordHashTable[hash] = ind;
   WordIndex[ind].entity_type = ind + FIRST_WORD;
   WordIndex[ind].word = NumWordChars;
   WordIndex[ind].star = star;
   WordIndex[ind].error_count = error_count;
   while(*word != '\0')
      WordList[NumWordChars++] = *word++;
   if (NumWordChars >= (MAX_WORD_CHARS - 50))
      FatalError("Exceeded maximum dictionary chars");
   WordList[NumWordChars++] = '\0';
   if (star)
   {
      StarWord[NumStarWords++] = ind;
      if (NumStarWords >= MAX_STAR_WORDS)
         FatalError("Exceeded maximum number of star words");
   }
   if (error_count > 0)
   {
      SpellWord[NumSpellWords++] = ind;
      if (NumSpellWords >= MAX_SPELL_WORDS)
         FatalError("Exceeded maximum number of spell words");
   }
   return(WordIndex[ind].entity_type);
}

PutInDictionary(text, phrase)
char *text;
PHRASE *phrase;
{
   register long i;
   register char *ptr;
   char string[128], error_msg[80];
   long temp, class, special;
   unsigned char type;
   BOOLEAN is_alpha;
   char *str, *start, save;

ptr = text;
   PhrasePair[NumPair].operator = NO_OPERATOR;
   while(*ptr != '\0')
   {
      for(special=0; !special && DocumentMap[*ptr] == 0; )
```

```c
{
   switch ( *ptr)
   {
   case SYNONYM_CHAR:
   case CLASS_CHAR:
   case OPERATOR_CHAR:
      special= 1;
      break;
   default:
      if (*ptr > ' ')
      {
         if (*ptr==ESCAPE_CHAR && *(ptr+1)!='\0') ptr++;
         phrase->num_pairs++;
         PhrasePair[NumPair++].entity_type = *ptr;
         if (NumPair==MAX_PHRASE_PAIR)
            FatalError("Exceeded maximum number of phrase pairs");
         PhrasePair[NumPair].operator = NO_OPERATOR;
      }
      ptr++;
      break;
   }
}
if (*ptr == 0) break;
if ((*ptr == CLASS_CHAR) || (*ptr == SYNONYM_CHAR))
{
   type = *ptr++;
   if (*ptr == '(')
   {
      ptr++;
      for(i = 0; *ptr != ')'; i++, ptr++)
         string[i] = *ptr;
      ptr++;
   }
   else
   {
      for(i = 0; (*ptr != ' ') && (*ptr != '\0'); i++, ptr++)
         string[i] = *ptr;
   }
}
else if (*ptr == OPERATOR_CHAR)
{
   type = *ptr++;
   for(i = 0; *ptr != ']'; ptr++)
      string[i++] = *ptr;
   ptr++;
}
else
{
   type = 0;
   for(i = 0; PhraseMap[*ptr] > 1; i++, ptr++)
   {
      string[i] = PhraseMap[*ptr];
   }
}
string[i] = '\0';

switch(type)
{
   case SYNONYM_CHAR:
   case CLASS_CHAR:
      phrase->num_pairs++;
      class = FindClass(string,
                  (type==CLASS_CHAR) ? TYPE_CLASS : TYPE_SYNONYM);
      if (class==NO_CLASS)
      {
         if (type == CLASS_CHAR)
            CheckErrors("%s:\tUndefined class    : %s\n", FileName, string);
         else
            CheckErrors("%s:\tUndefined synonym  : %s\n", FileName, string);
      }
      PhrasePair[NumPair++].entity_type = class;
```

```
        if (NumPair==MAX_PHRASE_PAIR)
            FatalError("Exceeded maximum number of phrase pairs");
        PhrasePair[NumPair].operator = NO_OPERATOR;
        break;
    case OPERATOR_CHAR:
        PhrasePair[NumPair].operator = ConvertOperator(string);
        break;
    default:
        start = string;
        is_alpha = AlphaMap[*start];
        for(str = string; *str != '\0'; str++)
        {
            if (is_alpha && NumMap[*str])
            {
                if (*(str-1) == ERROR_CHAR) continue;
                save = *str;
                *str = '\0';
                phrase->num_pairs++;
                PhrasePair[NumPair++].entity_type = AddWord(start);
                if (NumPair==MAX_PHRASE_PAIR)
                    FatalError("Exceeded maximum number of phrase pairs");
                PhrasePair[NumPair].operator = NO_OPERATOR;
                start = str;
                *str = save;
                is_alpha = AlphaMap[*start];
            }
            if (!is_alpha && AlphaMap[*str])
            {
                save = *str;
                *str = '\0';
                phrase->num_pairs++;
                PhrasePair[NumPair++].entity_type = AddWord(start);
                if (NumPair==MAX_PHRASE_PAIR)
                    FatalError("Exceeded maximum number of phrase pairs");
                PhrasePair[NumPair].operator = NO_OPERATOR;
                start = str;
                *str = save;
                    is_alpha = AlphaMap[*start];
                }
            }
            phrase->num_pairs++;
            PhrasePair[NumPair++].entity_type = AddWord(start);
            if (NumPair==MAX_PHRASE_PAIR)
                FatalError("Exceeded maximum number of phrase pairs");
            PhrasePair[NumPair].operator = NO_OPERATOR;
            break;
    }
    }
    i = phrase->first_pair;
    if (PhrasePair[i].operator & NOT_OPERATOR)
    {
        temp = PhrasePair[i + 1].entity_type;
        PhrasePair[i + 1].entity_type = PhrasePair[i].entity_type;
        PhrasePair[i].entity_type = temp;
        PhrasePair[i + 1].operator |= NOT_OPERATOR;
        PhrasePair[i].operator = NO_OPERATOR;
        PhrasePair[i + 1].operator ^= NUMBER_MASK;   /* negate repeat count */
    }
}

AddPhrase(text, class)
char *text;
CLASS *class;
{
    register char *ptr;

class->num_phrases++;
    if (NumPhrase==MAX_PHRASE)
        FatalError("Exceeded maximum number of phrases");
    Phrase[NumPhrase].num_pairs = 0;
    Phrase[NumPhrase].first_pair = NumPair;
```

```
        while(*text <= ' ')
           text++;
        for(ptr = text; *ptr >= ' '; ptr++);
        *ptr = '\0';

PutInDictionary(text, &Phrase[NumPhrase]);
        NumPhrase++;
    }

BOOLEAN
    LineIsWhite(line)
    char *line;
    {
        while((*line > '\0') && (*line <= ' '))
           line++;
        return(*line == '\0');
    }

ReadClasses(def_path, fid)
    char def_path[];
    FILE *fid;
{
    char line[512], type[32], args[256], class_type;
    CLASS *class;

while(fgets(line, 256, fid) != NULL)
    {
        if (LineIsWhite(line)) continue;
        while(line[strlen(line)-2] == '$')
           fgets(&line[strlen(line)-2], 256, fid);
        line[strlen(line) - 1] = '\0'; /* remove \n */
        args[0] = '\0';
        sscanf(line, "%s %[^\n]", type, args);
        class_type= ((line[0] == ' ') || (line[0] == '\t')) ? PHRASE_LINE : CheckType
        switch(class_type)
        {
           case DEF_CLASS:
           case DEF_SYNONYM:
              if (strlen(args) > 19)
                 CheckErrors("%s:\tName exceeds 19 char: %s\n", FileName, line);
              class = StartClass(args, class_type);
              break;
           case DEF_ACTION:
              AddAction(FileName, class, args);
              break;
           case DEF_TEMPLATE:
              StartTemplate(args);
              break;
           case TEMPLATE_LINE:
              AddTemplateLine(args);
              break;
           case PHRASE_LINE:
              AddPhrase(line, class, fid);
              break;
           case USES_LINE:
              AddLocal(args);
              break;
           case COMMENT:
              break;
           case UNKNOWN:
              CheckErrors("%s:\tSyntax error         : %s\n", FileName, line);
              break;
        }
    }
}

InitDictionary()
{
    register int i;

WordList = (char *)malloc(MAX_WORD_CHARS);
```

```
    for(i = 0; i < NUM_HASH; i++)
        WordHashTable[i] = NO_WORD;
    NumWords = 0;
    NumWordChars = 0;
    NumStarWords = 0;
    NumSpellWords = 0;
    WordIndex = (WORD_INDEX *)malloc(MAX_WORDS * sizeof(WORD_INDEX));
    StarWord = (unsigned short *)malloc(MAX_STAR_WORDS * sizeof(unsigned short));
}

ReadClassDefs(def_path, class_file)
char def_path[], class_file[];
{
    char path[80];
    FILE *fid, *class_fd;

ClassMemory = (char *)malloc(MAX_CLASS_MEMORY * sizeof(char));
    ClassMemory[0] = '\0';
    NumMemory = 1;
    ClassList = (CLASS *)malloc(MAX_CLASS * sizeof(CLASS));
    Template = (TEMPLATE *)malloc(MAX_TEMPLATE * sizeof(TEMPLATE));
    Phrase = (PHRASE *)malloc(MAX_PHRASE * sizeof(PHRASE));
    PhrasePair = (PHRASE_PAIR *)malloc(MAX_PHRASE_PAIR * sizeof(PHRASE_PAIR));
    InitDictionary();
    NumClass = 0;
    NumTemplate = 0;
    SymTabSize= 0;
    strcpy(path, def_path);
    strcat(path, class_file);
    fid= fopen(path, "r");
    if (fid == NULL)
        FatalError("Can't open %s\n", class_file);
    while(fscanf(fid, "%s", FileName) == 1)
    {
        strcpy(path, def_path);
        strcat(path, FileName);
        class_fd = fopen(path, "r");
        if (class_fd == NULL)
            FatalError("%s:\tCan't open file    : %s\n", class_file, FileName);
        LocalSymTabSize = 1;
        FirstLocalSymbol= NumClass;
        ReadClasses(def_path, class_fd);
        fclose(class_fd);
        AddGlobal(GetFileName(FileName));
    }
    fclose(fid);
    if (Errors > 0)
    {
      exit(1);
    }
    InitTemplates();
    return(0);
}

AddGlobal(class_name)
char class_name[];
{
    strcpy(GlobalSymbolTable[SymTabSize].def_file_name, class_name);
    GlobalSymbolTable[SymTabSize].first_symbol= FirstLocalSymbol;
    GlobalSymbolTable[SymTabSize].num_symbols=
        NumClass-GlobalSymbolTable[SymTabSize].first_symbol;
    SymTabSize++;
}

AddLocal(def_name)
char def_name[];
{
    char def_file[80], error_msg[80];
    long i;

sscanf( def_name, "%s", def_file);
    for(i=0; i<SymTabSize; i++)
```

```c
    {
        if (StrEqu(GlobalSymbolTable[i].def_file_name, def_file))
        {
            LocalSymbolTable[LocalSymTabSize++]= i;
            return;
        }
    }
    FatalError("%s\tUndefined file      : %s\n", FileName, def_name);
}

StartTemplate(rest_of_line)
char rest_of_line[];
{
    char name[32];

if (NumTemplate==MAX_TEMPLATE)
        FatalError("Exceeded maximum number of templates");
    sscanf(rest_of_line, "%s", name);
    Template[NumTemplate].num_instances = 0;
    Template[NumTemplate].current_slot = 0;
    Template[NumTemplate].name = ClassStrSave(name);
    Template[NumTemplate].entity_type = FindClass(name, TYPE_CLASS);
    Template[NumTemplate].num_slots = 0;
    NumTemplate++;
}

AddTemplateLine(line)
char line[];
{
    long slot, temp;
    char name[32], class1[32], class2[32];

temp= NumTemplate-1;
    slot= Template[temp].num_slots;

if (slot==MAX_SLOTS)
        FatalError("Exceeded maximum number of slots");
    sscanf(line, "%s %s", name, class1);
    Template[temp].slot[slot].name = ClassStrSave(name);
    Template[temp].slot[slot].entity_type = FindClass(class1, TYPE_CLASS);
    if ( Template[temp].slot[slot].entity_type == NO_CLASS)
         CheckErrors("%s:\tUndefined Template Slot : %s \n", name, class1);
    Template[temp].slot[slot].parent_type = Template[temp].entity_type;
    Template[temp].num_slots++;
}
PrintClassStats()
{
    printf("NumMemory = %d\n", NumMemory);
    printf("NumClass = %d\nNumPhrase = %d\nNumPairs = %d\n",
            NumClass, NumPhrase, NumPair);
    printf("NumWords = %d\nNumWordChars = %d\n", NumWords, NumWordChars);
    printf("NumTemplate = %d\n", NumTemplate);
}

/*------------------------------------------------------------------------
 * Copyright 1988, Resumix, Inc.
 *
 * post.c
 *-----------------------------------------------------------------------*/
include <stdio.h>
include <ctype.h> include "includes.h"
include "../DB/dbase.h"
#include "../DB/dbresume.h"

static char NameMap[] =
{
    '?','?','?','?','?','?','?','?','?','?','?','?','?','?','?','?',
    '?','?','?','?','?','?','?','?','?','?','?','?','?','?','?','?',
    ' ','?','"','?','?','?','?','\'','?','?','?','?',',','-','.','?',
```

```
    '0','1','2','3','4','5','6','7','8','9','?','?','?','?','?','?',
    '?','A','B','C','D','E','F','G','H','I','J','K','L','M','N','O',
    'P','Q','R','S','T','U','V','W','X','Y','Z','?','?','?','?','?',
    '?','a','b','c','d','e','f','g','h','i','j','k','l','m','n','o',
    'p','q','r','s','t','u','v','w','x','y','z','?','?','?','?','?'
};

static char *BadNames[]=
{
   "OF",
   "FOR",
   "RESUME",
   "R E S U M E",
   "NAME"
};

static
char *
NextWord(ptr)
char *ptr;
{
   for(ptr++; (*ptr != ' ') && (*ptr != '\0'); ptr++);
   return(++ptr);
} static
char *
PreviousWord(ptr)
char *ptr;
{
   for(ptr--; (*ptr != ' ') && (*ptr != '\0'); ptr--);
   return(++ptr);
} char *RemoveLeadingAndTrailingSpace( name)
char *name;
{
   char *end;
   while (isspace(*name)) name++;
   end=name+strlen(name);
   do {
       end--;
       if (end<name) break;
   } while (isspace(*end));
   *(end+1)= '\0';
   return( name);
} static ParseName( line, res)
char *line;
RESUME_STRUCT *res;
{
   int i, j, ind, spaces;
   char name[100], *ret_name;
   char *first, *middle, *last, *title, *trailer;
   BOOLEAN warning;
   static char *titles[] = {"DR.", "MR.", "MS.", "MRS.", "MISS"};
   static char *trailers[] = {"JR", "SR", "II", "III", "IV", "V", "VI"};
#define NUM_TITLES 5
#define NUM_TRAILERS 7
   char *ptr;

warning = FALSE;
   name[0] = '\0';
   name[1] = '\0';

if (SpacedName(line))
        ImplodeName(line);
   FixCaseToUpper(line);
   for(i=0; i<sizeof(BadNames)/sizeof(char *); i++)
   {
```

```c
      if (strncmp(line, BadNames[i], strlen(BadNames[i]))==0
          && !isalpha(line[strlen(BadNames[i])]))
      {
         break;
      }
   }
   if (i == sizeof(BadNames)/sizeof(char *))
   {
      ret_name = line;
      strcpy(&name[1], line);
      for(j = 1; name[j] != '\0'; j++)
      {
         if (NameMap[name[j]] == '?')
         {
            warning = TRUE;
            break;
         }
      }
      spaces = 0;
      for(j = 1; name[j] != '\0'; j++)
         if (name[j] == ' ') spaces++;
      if (spaces > 5)
         warning = TRUE;
   } if (name[1] == '\0') return(0);

title = name;
   first = &name[1];
   middle = NextWord(first);
   last = PreviousWord(&name[strlen(first)]);
   trailer = &name[strlen(first) + 2];
   *trailer = '\0';
   for(i = 0; i < NUM_TITLES; i++)
   {
      if (strncmp(first, titles[i], strlen(titles[i])) == 0)
      {
         title = first;
         first = NextWord(first);
         middle = NextWord(first);
         break;
      }
   }
   for(ptr = middle; *ptr != '\0'; ptr++)
   {
      if (*ptr == ',')
      {
         *ptr = '\0';
         trailer = NextWord(ptr);
         last = PreviousWord(ptr);
         break;
      }
   }
   for(i = 0; i < NUM_TRAILERS; i++)
   {
      if (StrEqu(trailers[i], last))
      {
         trailer = last;
         last = PreviousWord(trailer-1);
         break;
      }
   }
   *(first-1) = '\0';
   *(middle-1) = '\0';
   if (middle >= last)
      middle = "";
   else
      *(middle-1) = '\0';
   *(last-1) = '\0';
   *(trailer-1) = '\0';
   first= RemoveLeadingAndTrailingSpace(first);
   last= RemoveLeadingAndTrailingSpace(last);
```

```c
    strncpy(res->first_name, first, NAME_LENGTH);
    strncpy(res->middle_name, middle, NAME_LENGTH);
    strncpy(res->last_name, last, NAME_LENGTH);
    strncpy(res->prefix_name, title, sizeof(res->prefix_name));
    strncpy(res->postfix_name, trailer, sizeof(res->postfix_name));
    res->first_name[NAME_LENGTH-1] = '\0';
    res->middle_name[NAME_LENGTH-1] = '\0';
    res->last_name[NAME_LENGTH-1] = '\0';
    res->prefix_name[sizeof(res->prefix_name)-1] = '\0';
    res->postfix_name[sizeof(res->postfix_name)-1] = '\0';
    return(1);
} char *
PostProcessName(res, ln)
RESUME_STRUCT *res;
int *ln;
{
    char *ret_name;

while(StrEqu(Person[*ln].title, "Applicant"))
    {
        if (ParseName( Person[*ln].value, res)) {
            ret_name = Person[*ln].value;
            while(StrEqu(Person[*ln].title, "Applicant"))
                (*ln)++;
            return( ret_name);
        } else {
            (*ln)++;
        }
    }
    return(NULL);
} static char *AddressTitle[]=
{
    "Address_type",
    "Address",
    "City",
    "State",
    "Zip",
};
#define NUM_ADDR_TITLE 5

PostProcessAddress(res, ln)
RESUME_STRUCT *res;
int *ln;
{
    int i, j;
    int type[NUM_ADDR_TITLE][20];
    int ntype[NUM_ADDR_TITLE];

res->num_address = 0;
    for(i = 0; i < NUM_ADDR_TITLE; i++)
        ntype[i]= 0;
/* while working on an address set */
    while(TRUE)
    {
        for(i = 0; i < NUM_ADDR_TITLE; i++)
        {
            if (StrEqu(Person[*ln].title, AddressTitle[i]))
            {
                if ((res->num_address == NUM_ADDRESS) && (i == 1))
                {
                    while(TRUE)
                    {
                        for(i = 0; i < NUM_ADDR_TITLE; i++)
                        {
                            if (StrEqu(Person[*ln].title, AddressTitle[i]))
                                break;
                        }
                        if (i == NUM_ADDR_TITLE) return;
```

```
                    (*ln)++;
                }
            }
            printf("%s: %s\n", Person[*ln].title, Person[*ln].value);
            type[i][ntype[i]++] = *ln;
            switch(i)
            {
            case 0: /* Address_type */
                break;
            case 1: /* Address */
                res->num_address++;
                Address[res->num_address-1].type = NONE;
                if (ntype[0] >= ntype[1])
                {
                    Address[res->num_address-1].type = Person[type[0][ntype[1]-1]].va
                }
                FixCaseToMixed(Person[*ln].value);
                strncpy(Address[res->num_address-1].street, Person[*ln].value,sizeof
                Address[res->num_address-1].street[sizeof(Address[0].street)-1] = '\
                break;
            case 2: /* City */
                FixCaseToMixed(Person[*ln].value);
                strncpy(Address[res->num_address-1].city_state_zip, Person[*ln].valu
                Address[res->num_address-1].city_state_zip[16] = '\0';
                break;
            case 3: /* State */
                strcat(Address[res->num_address-1].city_state_zip, ", ");
                strcat(Address[res->num_address-1].city_state_zip, Person[*ln].value
                break;
            case 4: /* Zip */
                strcat(Address[res->num_address-1].city_state_zip, " ");
                strcat(Address[res->num_address-1].city_state_zip, Person[*ln].value
                break;
            }
            break;
        }
    }
    if (i == NUM_ADDR_TITLE) break;
    (*ln)++;
    }
}

IsAddrTitle(s)
char s[];
{
    register char *ptr;
    for(ptr = AddressTitle[0]; *ptr != NULL; ptr++)
    {
        if (strncmp(s, *ptr, strlen(*ptr))==0)
            return(TRUE);
    }
    return(FALSE);
} static char *PhoneTitles[] =
{
    "Home_Phone",
    "Work_Phone",
    "Message_Phone"
};
#define NUM_PHONE_TITLES 3

ParsePhone(line, phone)
char *line;
PHONE_STRUCT *phone;
{
    char arg[4][10];
    long narg;

narg = sscanf(line, "%s %s %s ext %s", arg[0], arg[1], arg[2], arg[3]);
    if (narg == 4)
    {
```

```
         strcpy(phone->area_code, arg[0]);
         strcpy(phone->number, arg[1]);
         strcat(phone->number, "-");
         strcat(phone->number, arg[2]);
         strcpy(phone->ext, arg[3]);
      }
      else if (narg == 3)
      {
         if (strlen(arg[1]) == 3)
         {
            strcpy(phone->area_code, arg[0]);
            strcpy(phone->number, arg[1]);
            strcat(phone->number, "-");
            strcat(phone->number, arg[2]);
         }
         else
         {
            strcpy(phone->number, arg[0]);
            strcat(phone->number, "-");
            strcat(phone->number, arg[1]);
            strcpy(phone->ext, arg[2]);
         }
      }
      else
      {
         strcpy(phone->number, arg[0]);
         strcat(phone->number, "-");
         strcat(phone->number, arg[1]);
      }
}

PostProcessPhone(res, ln)
RESUME_STRUCT *res;
int *ln;
{
   int i;

res->num_phone = 0;
   while(TRUE)
   {
      for(i = 0; i < NUM_PHONE_TITLES; i++)
         if (StrEqu(Person[*ln].title, PhoneTitles[i])) break;
      if (i == NUM_PHONE_TITLES) break;
      if (res->num_phone < NUM_PHONE)
      {
         ParsePhone(Person[*ln].value, &Phone[res->num_phone]);
         Phone[res->num_phone].type = Person[*ln].title[0];
         res->num_phone++;
      }
      (*ln)++;
   }
}

ParseDegree(line, degree)
char *line;
DEGREE_STRUCT *degree;
{
   register int i, j;
   char level[16], field[21], school[21], due[8], year[8], gpa[16];

due[0] = '\0';
   year[0] = '\0';
   sscanf(line, "%[^,],%[^,],%[^,],%[^,],%[^,], %[1234567890.]",
          level, field, school, due, year, gpa);
   if (gpa[0]>'5' || gpa[0]<'2' || gpa[1]!='.')
      gpa[0]= '\0';
   gpa[5] = '\0';

strcpy(degree->level, level);
   strcpy(degree->field, &field[1]);
   strcpy(degree->school, &school[1]);
```

```
/*
   if (due[1]!='\0')
      degree->due = TRUE;
   else
      degree->due = FALSE;
*/
   if (year[1] != '\0')
      sscanf(year, "%hd", °ree->year);
   else
      degree->year = NO_YEAR;
   strcpy(degree->gpa, gpa);
}

PostProcessDegree(res, ln)
RESUME_STRUCT *res;
int *ln;
{
   int i;

res->num_degree = 0;
   for (i=0; StrEqu(Person[*ln].title, "Degree"); i++)
   {
      if (i < NUM_DEGREE)
         ParseDegree(Person[*ln].value, &Degree[res->num_degree++]);
      (*ln)++;
   }
}

PostProcessCategory(res, ln, title)
RESUME_STRUCT *res;
int *ln;
char *title;
{
   int i, j;

res->num_category = 0;
   for(i = *ln; StrEqu(Person[i].title, title); i++)
   {
/*    check for a duplicate */
      for(j = 0; j < res->num_category; j++)
         if (strcmp(Category[j].string, Person[i].value)== 0)
            break;
/*    put the unique ones into the data base */
      if ((j == res->num_category) && (j < NUM_CATEGORY))
      {
         strcpy(Category[res->num_category].string, Person[i].value);
         res->num_category++;
      }
   }
   *ln = i;
}

ParseDates(line, job)
char *line;
JOB_STRUCT *job;
{
   char dates[40], title[60], company[60];

title[0]= '\0';
   company[0]= '\0';
   sscanf(line, "%[^,],%[^,],%[^,]", dates, title, company);
   ConvertDateRange(dates, &job->mstart, &job->ystart, &job->mend, &job->yend);
   strncpy(job->title, &title[1], sizeof(job->title)-1);
   job->title[sizeof(job->title)-1]= '\0';
   strncpy(job->company, &company[1], sizeof(job->company)-1);
   job->company[sizeof(job->company)-1]= '\0';
}

GetFirstYear( res, job)
RESUME_STRUCT *res;
JOB_STRUCT *job;
{
```

```
/* if it was not a summer job */
   if (job->mstart < 12)
/*    find start year for the first job */
      res->first_year = MIN(res->first_year, job->ystart);
}

PostProcessJobs(res, ln)
RESUME_STRUCT *res;
int *ln;
{
   int i;

res->num_job = 0;
   for(i=0; StrEqu(Person[*ln].title, "Dates"); i++)
   {
      if (i < NUM_JOB)
      {
         ParseDates(Person[*ln].value, &Job[i]);
         GetFirstYear(res, &Job[i]);
         res->num_job++;
      }
      (*ln)++;
   }
}

PostProcessBuzzwords(res, ln)
RESUME_STRUCT *res;
int *ln;
{
   int i, j;

res->num_buzzword = 0;
/* for each buzzword in the resume */
   for(i = *ln; StrEqu(Person[i].title, "Experience"); i++)
   {
/*    check for a duplicate */
      for(j = 0; j < res->num_buzzword; j++)
         if (strcmp(Buzzword[j].string, Person[i].value) == 0)
            break;
/*    put the unique ones into the data base */
      if ((j == res->num_buzzword) && (j < NUM_BUZZWORD))
      {
         strcpy(Buzzword[res->num_buzzword].string, Person[i].value);
         res->num_buzzword++;
      }
   }
   *ln = i;
}

/*-----------------------------------------------------
 * Copyright 1988, 1989, Resumix, Inc.
 *
 * name.c
 *-----------------------------------------------------*/ include <stdio.h>
include "../EXTRACT/includes.h"
#include <ctype.h>

ValidName(name)
char *name;
{
   int len, pos, word, chars, inword, junk, vowel;
   len = strlen(name);
   word = 0;
   chars = 0;
   inword = 0;
   vowel = 0;
   junk = 0;
   for (pos = 0; pos < len; pos ++)
   {
```

```
    if (isalpha(name[pos]))
    {
      chars++;
      if (!inword)
        inword = 1;
    }
    else if ((name[pos] == ' ') && inword)
    {
      if (chars >= 2)
        word++;
      inword = chars = 0;
    }
    else if (name[pos] != '.') junk++;
  }
  if (inword && (chars >= 2))
    word++;
  if (junk * 2 >= len)
  {
    return(0);
  }
  if ((word >= 2) && (word <= 5))
  {
    return(1);
  }
  return(0);
} int SpacedName(name)
char *name;
{
  int ok, bad, i,len, other;

ok = 0;
  bad = 0;
  other = 0;
  i = 0;
  len = strlen(name);

for (i=0;i<len;i++)
  {
    if (isalpha(name[i]))
    {
      if (isalpha(name[i+1]))
        ok++;
      else if (name[i+1]==' ')
        bad++;
    }
    else if (!isalpha(name[i]) &&
      (name[i] != ' '))
      other++;
  }
  return((bad > (ok * 4)) && (other < ok));
} int CountWhite(name,i)
char *name;
int *i;
{
  int white;

white = 0;

while(name[*i] == ' ')
  {
    white++;
    (*i)++;
  }
  return(white);
} int AverageSpacing(name,len)
char *name;
```

```
int len;
{
  int i, space[5], spaces, max;

for (i=0;i<5;i++)
    space[i] = 0;

for (i=0;i<len;i++)
    if (name[i] == ' ')
    {
      spaces = CountWhite(name,&i);
      if (spaces > 4) spaces = 4;
      space[spaces]++;
    }
  for(spaces=0,max=space[0],i=1;i < 5;i++)
    if (space[i] > max)
    {
      spaces = i;
      max = space[i];
    }
  return(spaces);
} int Initial(name,i)
char *name;
int i;
{
  i++;
  CountWhite(name,&i);
  return(name[i] == '.');
} void PassInitial(name,i)
char *name;
int *i;
{
  while(name[(*i)++] != '.');
  CountWhite(name,i);
} void ImplodeName(name)
char *name;
{
  int i,j,len,word,spacer;

word = FALSE;
  len = strlen(name);
  spacer = AverageSpacing(name,len);
  i=0;j=0;
  while(i<len)
  {
    if (CountWhite(name,&i) > spacer)
    {
      word = FALSE;
      name[j++] = ' ';
    }
    else if (!word && isalpha(name[i]))
    {
      name[j++] = name[i++];
      word = TRUE;
    }
    else if (isalpha(name[i]))
    {
      if (!Initial(name,i))
      {
        name[j++] = name[i++];
      }
      else
      {
        name[j++] = ' ';
        name[j++] = name[i];
        name[j++] = '.';
```

```c
        name[j++] = ' ';
        PassInitial(name,&i);
        word = FALSE;
      }
    }
    else
    {
      i++;
    }
  }
  name[j] = 0;
}

PrintNames(class)
CLASS *class;
{
  int entity;
  for (entity = EntityPtr[class->entity_type];
       entity != NO_ENTITY;
       entity = Entity[entity].next)
  {
    fprintf(stderr," Name is %s\n", Entity[entity].value);
  }
  fprintf(stderr,"Done\n\n");
}

PruneName(class)
CLASS *class;
{
  int entity, lastent=NO_ENTITY;
  for (entity = EntityPtr[class->entity_type];
       entity != NO_ENTITY;
       entity = Entity[entity].next)
  {
    if (SpacedName(Entity[entity].value))
      ImplodeName(Entity[entity].value);
    if (!ValidName(Entity[entity].value))
    {
      if (lastent == NO_ENTITY)
        EntityPtr[class->entity_type] = Entity[entity].next;
      else
        Entity[lastent].next = Entity[entity].next;
    }
    else lastent = entity;
  }
}

/*-------------------------------------------------------------------------
 * Copyright 1988, Resumix, Inc.
 *
 * maps.c
 *-----------------------------------------------------------------------*/
#include "includes.h"

unsigned char PhraseMap[] =
{
    1,  0,  0,  0,  0,  0,  0,  0,  0,  0,  0,  0,  0,  0,  0,  0,
    0,  0,  0,  0,  0,  0,  0,  0,  0,  0,  0,  0,  0,  0,  0,  0,
    0, ERROR_CHAR, 0, 0, 0, 0, 0, 0, 0, 0, 0, 0, 0, 0, 0, 0,
   '0','1','2','3','4','5','6','7','8','9', 0,  0,  0,  0,  0,  0,
    0,'A','B','C','D','E','F','G','H','I','J','K','L','M','N','O',
   'P','Q','R','S','T','U','V','W','X','Y','Z', 0,  0,  0,  0,  0,
    0,'a','b','c','d','e','f','g','h','i','j','k','l','m','n','o',
   'p','q','r','s','t','u','v','w','x','y','z', 0,  0,  0,STAR_CHAR,0
};

unsigned char DocumentMap[] =
{
    1,  0,  0,  0,  0,  0,  0,  0,  0,  0,  0,  0,  0,  0,  0,  0,
    0,  0,  0,  0,  0,  0,  0,  0,  0,  0,  0,  0,  0,  0,  0,  0,
    0,  0,  0,  0,  0,  0,  0,  0,  0,  0,  0,  0,  0,  0,  0,  0,
```

```c
    '0','1','2','3','4','5','6','7','8','9',  0,  0,  0,  0,  0,  0,
      0,'A','B','C','D','E','F','G','H','I','J','K','L','M','N','O',
    'P','Q','R','S','T','U','V','W','X','Y','Z',  0,  0,  0,  0,  0,
      0,'a','b','c','d','e','f','g','h','i','j','k','l','m','n','o',
    'p','q','r','s','t','u','v','w','x','y','z',  0,  0,  0,  0,  0,
      1,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
    '0','1','2','3','4','5','6','7','8','9',  0,  0,  0,  0,  0,  0,
      0,'A','B','C','D','E','F','G','H','I','J','K','L','M','N','O',
    'P','Q','R','S','T','U','V','W','X','Y','Z',  0,  0,  0,  0,  0,
      0,'a','b','c','d','e','f','g','h','i','j','k','l','m','n','o',
    'p','q','r','s','t','u','v','w','x','y','z',  0,  0,  0,  0,  0
};

unsigned char NumMap[] =
{
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
    '0','1','2','3','4','5','6','7','8','9',  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
    '0','1','2','3','4','5','6','7','8','9',  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0
};

unsigned char AlphaMap[] =
{
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,'A','B','C','D','E','F','G','H','I','J','K','L','M','N','O',
    'P','Q','R','S','T','U','V','W','X','Y','Z',  0,  0,  0,  0,  0,
      0,'a','b','c','d','e','f','g','h','i','j','k','l','m','n','o',
    'p','q','r','s','t','u','v','w','x','y','z',  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,  0,  0,  0,  0,  0,  0,  0,  0,  0,  0,  0,  0,  0,  0,  0,
      0,'A','B','C','D','E','F','G','H','I','J','K','L','M','N','O',
    'P','Q','R','S','T','U','V','W','X','Y','Z',  0,  0,  0,  0,  0,
      0,'a','b','c','d','e','f','g','h','i','j','k','l','m','n','o',
    'p','q','r','s','t','u','v','w','x','y','z',  0,  0,  0,  0,  0
};

char *Ascii[] =
{
    " "," "," "," "," "," "," "," "," "," "," "," "," "," "," "," ",
    " "," "," "," "," "," "," "," "," "," "," "," "," "," "," "," ",
    " ","!","\"","#","$","%","&","'","(",")","*","+",",","-",".","/",
    "0","1","2","3","4","5","6","7","8","9",":",";","<","=",">","?",
    "@","A","B","C","D","E","F","G","H","I","J","K","L","M","N","O",
    "P","Q","R","S","T","U","V","W","X","Y","Z","[","\\","]","^","_",
    "`","a","b","c","d","e","f","g","h","i","j","k","l","m","n","o",
    "p","q","r","s","t","u","v","w","x","y","z","{","|","}","~"," ",
    " "," "," "," "," "," "," "," "," "," "," "," "," "," "," "," ",
    " "," "," "," "," "," "," "," "," "," "," "," "," "," "," "," ",
    " ","!","\"","#","$","%","&","'","(",")","*","+",",","-",".","/",
    "0","1","2","3","4","5","6","7","8","9",":",";","<","=",">","?",
    "@","A","B","C","D","E","F","G","H","I","J","K","L","M","N","O",
    "P","Q","R","S","T","U","V","W","X","Y","Z","[","\\","]","^","_",
    "`","a","b","c","d","e","f","g","h","i","j","k","l","m","n","o",
    "p","q","r","s","t","u","v","w","x","y","z","{","|","}","~"," "
```

```c
};

unsigned char UpperMap[] = {
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '\'','A','B','C','D','E','F','G','H','I','J','K','L','M','N','O',
    'P','Q','R','S','T','U','V','W','X','Y','Z','{','|','}','~',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '\'','A','B','C','D','E','F','G','H','I','J','K','L','M','N','O',
    'P','Q','R','S','T','U','V','W','X','Y','Z','{','|','}','~',' '
};

unsigned char LowerMap[] = {
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ','!','"','#','$','%','&','\'','(',')','*','+',',','-','.','/',
    '0','1','2','3','4','5','6','7','8','9',':',';','<','=','>','?',
    '@','a','b','c','d','e','f','g','h','i','j','k','l','m','n','o',
    'p','q','r','s','t','u','v','w','x','y','z','[','\\',']','^','_',
    '\'','a','b','c','d','e','f','g','h','i','j','k','l','m','n','o',
    'p','q','r','s','t','u','v','w','x','y','z','{','|','}','~',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ','!','"','#','$','%','&','\'','(',')','*','+',',','-','.','/',
    '0','1','2','3','4','5','6','7','8','9',':',';','<','=','>','?',
    '@','a','b','c','d','e','f','g','h','i','j','k','l','m','n','o',
    'p','q','r','s','t','u','v','w','x','y','z','[','\\',']','^','_',
    '\'','a','b','c','d','e','f','g','h','i','j','k','l','m','n','o',
    'p','q','r','s','t','u','v','w','x','y','z','{','|','}','~',' '
};

unsigned char OutsideMap[] =
{
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    '0','1','2','3','4','5','6','7','8','9',' ',' ',' ',' ',' ',' ',
    ' ','A','B','C','D','E','F','G','H','I','J','K','L','M','N','O',
    'P','Q','R','S','T','U','V','W','X','Y','Z',' ',' ',' ',' ',' ',
    ' ','a','b','c','d','e','f','g','h','i','j','k','l','m','n','o',
    'p','q','r','s','t','u','v','w','x','y','z',' ',' ',' ',' ',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    '0','1','2','3','4','5','6','7','8','9',' ',' ',' ',' ',' ',' ',
    ' ','A','B','C','D','E','F','G','H','I','J','K','L','M','N','O',
    'P','Q','R','S','T','U','V','W','X','Y','Z',' ',' ',' ',' ',' ',
    ' ','a','b','c','d','e','f','g','h','i','j','k','l','m','n','o',
    'p','q','r','s','t','u','v','w','x','y','z',' ',' ',' ',' ',' '
};

unsigned char InsideMap[] =
{
    ' ',' ',' ',' ',' ',' ',' ',' ',' ',' ',' ',' ',' ',' ',' ',' ',
    ' ',' ',' ',' ',' ',' ',' ',' ',' ',' ',' ',' ',' ',' ',' ',' ',
    ' ',' ','!','"','#','$','%','&','\'','(',')','*','+',',','-','.','/',
    '0','1','2','3','4','5','6','7','8','9',':',';','<','=','>','?',
    '@','A','B','C','D','E','F','G','H','I','J','K','L','M','N','O',
    'P','Q','R','S','T','U','V','W','X','Y','Z','[','\\',']','^','_',
    '\'','a','b','c','d','e','f','g','h','i','j','k','l','m','n','o',
    'p','q','r','s','t','u','v','w','x','y','z','{','|','}','~',' ',
    ' ',' ',' ',' ',' ',' ',' ',' ',' ',' ',' ',' ',' ',' ',' ',' ',
```

```
  ' ',' ',' ',' ',' ',' ',' ',' ',' ',' ',' ',' ',' ',' ',' ',' ',
  ' ',' ','!','"','#','$','%','&','\'','(',')','*','+',',','-','.','/',
  '0','1','2','3','4','5','6','7','8','9',':',';','<','=','>','?',
  '@','A','B','C','D','E','F','G','H','I','J','K','L','M','N','O',
  'P','Q','R','S','T','U','V','W','X','Y','Z','[','\\',']','^','_',
  '`','a','b','c','d','e','f','g','h','i','j','k','l','m','n','o',
  'p','q','r','s','t','u','v','w','x','y','z','{','|','}','~',' '
};
#include <stdio.h>
include <sys/types.h>
#include <sys/timeb.h>
#include <time.h>
#include <malloc.h>
#include "devaluate.h"
include <ctype.h> include "../EXTRACT/includes.h"

struct _jobstruc {
  int date, datetype, title, titletype, company, companytype;
  int eol, blank, block, processed, next;
} JOBSTRUC;

#define MAX_POSS_JOBS 60
#define LONE_DATE 1
define DATERANGE 2 static struct _jobstruc Job[MAX_POSS_JOBS];
static int current;

extern int FirstNumChildErr;

ClearJob(i)
int i;
{
  Job[i].datetype = 0;
  Job[i].date = 0;
  Job[i].title = 0;
  Job[i].company = 0;
  Job[i].eol = 0;
  Job[i].blank = 0;
  Job[i].block = 0;
  Job[i].processed = 0;
  Job[i].next = i+1;
}

InitJobs()
{
  int i;
  for (i=0;i<MAX_POSS_JOBS;i++)
    ClearJob(i);
}

GetFirstDate(str)
char *str;
{
  int pos=0;
  while (str[pos] && !isdigit(str[pos]))
    pos++;
  if (!str[pos]) return(99);
  return(atoi(&str[pos]));
}

GetNextDate(entity, daterange)
int entity, daterange;
{
  int firstdate, pos;
  char *str;
  entity = Entity[entity].next;
  while (entity != NO_ENTITY &&
          (PhrasePair[Entity[entity].phrase
            ].entity_type != daterange))
```

```
      entity = Entity[entity].next;
   if (entity == NO_ENTITY) return (0);
   pos=0;
   str = Entity[entity].value;
   while (str[pos] && !isdigit(str[pos]))
     pos++;
   if (!str[pos]) firstdate = 99;
   firstdate = atoi(&str[pos]);
   pos += 2;
   if (str[pos] == 0) return(firstdate);
   while (str[pos] && !isdigit(str[pos]))
     pos++;
   if (!str[pos]) return(firstdate);
   return(atoi(&str[pos]));
}

RemoveBadDates(entity, date, daterange, eol)
int entity, date, daterange, eol;
{
   int type, lastdate=99, currdate;
   while (entity != NO_ENTITY)
   {
      type = PhrasePair[Entity[entity].phrase].entity_type;
      if (type == daterange)
      {
         lastdate = GetFirstDate(Entity[entity].value);
/* fprintf(stderr,"Date %s, currdate %d lastdate %d\n",
   Entity[entity].value, currdate, lastdate); */
      }
      else if (type == date)
      {
         currdate = GetFirstDate(Entity[entity].value);
/* fprintf(stderr,"Date %s, currdate %d lastdate %d nextdate %d\n",
   Entity[entity].value, currdate, lastdate,
   GetNextDate(entity,daterange)); */
         if (currdate > lastdate ||
             currdate < GetNextDate(entity, daterange))
           PhrasePair[Entity[entity].phrase].entity_type = eol;
      }
      entity = Entity[entity].next;
   }
} void ExtractJob (class)
CLASS *class;
{
   int date, title, company, eol, daterange;
   int blank, block, blocks;
   int entities, entity, entity_type, blanks, eols, jobnum, i;
   current = 0;
   InitJobs();
   date = PhrasePair[Phrase[class->first_phrase].first_pair].entity_type;
   daterange = PhrasePair[Phrase[class->first_phrase+1].first_pair].entity_type;
   company = PhrasePair[Phrase[class->first_phrase+2].first_pair].entity_type;
   title = PhrasePair[Phrase[class->first_phrase+3].first_pair].entity_type;
   eol = PhrasePair[Phrase[class->first_phrase+4].first_pair].entity_type;
   blank = PhrasePair[Phrase[class->first_phrase+5].first_pair].entity_type;
   block = PhrasePair[Phrase[class->first_phrase+6].first_pair].entity_type;

entities = EntityPtr[class->entity_type];
   EntityPtr[class->entity_type] = NO_ENTITY;
   entity = entities;
   RemoveBadDates(entities, date, daterange, eol);
   while (entity != NO_ENTITY && PhrasePair[Entity[entity
         ].phrase].entity_type == eol)
     entity = Entity[entity].next;
   while (entity != NO_ENTITY)
   {
      while((entity_type = PhrasePair[Entity[entity].phrase].entity_type)
         != eol && entity_type != blank && entity_type != block)
      {
         if (entity_type == date)
```

```
      {
        if (!Job[current].date)
        {
          Job[current].date = entity;
          Job[current].datetype = LONE_DATE;
        }
      }
      else if (entity_type == daterange)
      {
        if (!Job[current].date)
        {
          Job[current].date = entity;
          Job[current].datetype = DATERANGE;
        }
      }
      else if (entity_type == company)
      {
        Job[current].company = entity;
      }
      else if (entity_type == title)
      {
        if (!Job[current].title)
          Job[current].title = entity;
      }
      else fprintf(stderr,"ERROR: Invalid type in ExtractJob\n");
      entity = Entity[entity].next;
      if (entity == NO_ENTITY) break;
    }
    while (entity != NO_ENTITY && ((entity_type =
      PhrasePair[Entity[entity].phrase].entity_type) == eol ||
      entity_type == blank || entity_type == block))
    {
      if (entity_type == blank)
        Job[current].blank++;
      else if (entity_type == eol)
        Job[current].eol++;
      else if (entity_type == block)
        Job[current].block++;
      entity = Entity[entity].next;
    }
    if ((entity == NO_ENTITY) || (current+1 == MAX_POSS_JOBS)) break;
    current++;
  }
  blanks = 0;
  blocks = 0;
  eols = 0;
  jobnum = -1;
  PrintJobs();
  while (FindClose(&blocks, &blanks, &eols, &jobnum))
    if (JobAgree(jobnum))
      CombineJob(jobnum);
  PrintJobs();
  for(jobnum = 0; jobnum != MAX_POSS_JOBS; jobnum = Job[jobnum].next)
    if (GoodJob(jobnum))
      AddJob(class, jobnum);
  PrintJobs();
} extern char Value[];

AddJob(class, jobnum)
int jobnum;
CLASS *class;
{
  unsigned short first, last;
  int first_child;
  first_child = NumEntityChild;
  first = 100000;
  last = -100000;
  Value[0] = 0;
  if (Job[jobnum].date)
  {
```

```c
        strcat(Value, Entity[Job[jobnum].date].value);
        first = MIN(first,Entity[Job[jobnum].date].start);
        last = MAX(last,Entity[Job[jobnum].date].end);
        if (NumEntityChild >= MAX_ENTITY_CHILD-2)
        {
          if (FirstNumChildErr)
          {
            FirstNumChildErr = FALSE;
            ExtractWarning("Exceeded maximum number of entity children");
          }
          goto ERROR;
        }
        EntityChild[NumEntityChild++] = Entity[Job[jobnum].date].entity_type;
    }
    strcat(Value, ", ");
    if (Job[jobnum].title)
    {
        strcat(Value, Entity[Job[jobnum].title].value);
        first = MIN(first,Entity[Job[jobnum].title].start);
        last = MAX(last,Entity[Job[jobnum].title].end);
        if (NumEntityChild >= MAX_ENTITY_CHILD-2)
        {
          if (FirstNumChildErr)
          {
            FirstNumChildErr = FALSE;
            ExtractWarning("Exceeded maximum number of entity children");
          }
          goto ERROR;
        }
        EntityChild[NumEntityChild++] = Entity[Job[jobnum].title].entity_type;
    }
    strcat(Value, ", ");
    if (Job[jobnum].company)
    {
        strcat(Value, Entity[Job[jobnum].company].value);
        first = MIN(first,Entity[Job[jobnum].company].start);
        last = MAX(last,Entity[Job[jobnum].company].end);
        if (NumEntityChild >= MAX_ENTITY_CHILD-2)
        {
          if (FirstNumChildErr)
          {
            FirstNumChildErr = FALSE;
            ExtractWarning("Exceeded maximum number of entity children");
          }
          goto ERROR;
        }
        EntityChild[NumEntityChild++] = Entity[Job[jobnum].company].entity_type;
    }
    if (NumEntityChild >= MAX_ENTITY_CHILD-2)
      if (FirstNumChildErr)
      {
        FirstNumChildErr = FALSE;
        ExtractWarning("Exceeded maximum number of entity children");
      }
ERROR:
    EntityChild[NumEntityChild++] = NO_ENTITY;
    if (NumEntityChild>=MAX_ENTITY_CHILD - 1)
    {
      if (FirstNumChildErr)
      {
        ExtractWarning("Exceeded maximum number of entity children");
        FirstNumChildErr = FALSE;
        EntityChild[NumEntityChild] = NO_ENTITY;
        AddEntity(class->entity_type, NO_PHRASE, StrSave(Value),
          first,last,first_child,FALSE);
      }
      return;
    }
    EntityChild[NumEntityChild++] = NO_ENTITY;
    AddEntity(class->entity_type, NO_PHRASE, StrSave(Value),
      first,last,first_child,FALSE);
}
```

```c
PrintJobs()
{
  int job;
/* for (job = 0; job <= current; job++)
    {
      fprintf(stderr, "Job %d\n", job);
      fprintf(stderr, "  Date is %s type is %d\n", Entity[Job[job].date].value,
        Job[job].datetype);
      fprintf(stderr, "  Company is %s\n", Entity[Job[job].company].value);
      fprintf(stderr, "  Title is %s\n\n", Entity[Job[job].title].value);
      fprintf(stderr, "  Eols = %d Blanks = %d Blocks = %d\n", Job[job].eol,
        Job[job].blank, Job[job].block);
    } */
}

GoodJob(jobnum)
int jobnum;
{
  return ((Job[jobnum].date &&
      (Job[jobnum].datetype == DATERANGE ||
        Job[jobnum].company || Job[jobnum].title)));
/* ||
    (Job[jobnum].company && Job[jobnum].title)); */
}

JobAgree(jobnum)
int jobnum;
{
/* fprintf(stderr, "Testing for agreement between job %d and job %d\n", jobnum, Job return(((!Job[jobnum].date || !Job[Job[jobnum].next].date) &&
      (!Job[jobnum].company || !Job[Job[jobnum].next].company) &&
      (!Job[jobnum].title || !Job[Job[jobnum].next].title)) &&
      (!Job[jobnum].blank || Job[jobnum].eol < 5) &&
      Job[jobnum].block <= 1);
}

CombineJob(jobnum)
int jobnum;
{
  if (!Job[jobnum].date)
    {
      Job[jobnum].date = Job[Job[jobnum].next].date;
      Job[jobnum].datetype = Job[Job[jobnum].next].datetype;
    }
  if (!Job[jobnum].company)
    Job[jobnum].company = Job[Job[jobnum].next].company;
  if (!Job[jobnum].title)
    Job[jobnum].title = Job[Job[jobnum].next].title;
  Job[jobnum].eol = Job[Job[jobnum].next].eol;
  Job[jobnum].blank = Job[Job[jobnum].next].blank;
  Job[jobnum].block = Job[Job[jobnum].next].block;
  Job[jobnum].processed = Job[Job[jobnum].next].processed;
  Job[jobnum].next = Job[Job[jobnum].next].next;
}

JobGreaterEq(job, blocks, blanks, eols, jobnum)
int job, blanks, eols, jobnum;
{
  return (Job[job].block >= blocks ||
      (Job[job].block == blocks &&
        Job[job].blank >= blanks) ||
      (Job[job].block == blocks &&
        Job[job].blank == blanks && Job[job].eol >= eols) ||
      (Job[job].block == blocks &&
        Job[job].blank == blanks && Job[job].eol == eols &&
        job >= jobnum));
}

JobLess(job, blocks, blanks, eols, jobnum)
int job, blocks, blanks, eols, jobnum;
{
```

```c
  return((Job[job].block < blocks) ||
     (Job[job].block == blocks && Job[job].blank < blanks) ||
     (Job[job].block == blocks && Job[job].blank == blanks &&
        Job[job].eol < eols) ||
     (Job[job].block == blocks && Job[job].blank == blanks &&
        Job[job].eol == eols && job < jobnum));
}

FindClose(blocks, blanks, eols, jobnum)
int *blocks, *blanks, *eols, *jobnum;
{
  int minblank = 10000, mineol = 10000, minjob = MAX_POSS_JOBS, i, minblock = 10000;
  for(i=0; i<current; i = Job[i].next)
  {
    if (!Job[i].processed &&
       JobGreaterEq(i, *blocks, *blanks, *eols, *jobnum) &&
       JobLess(i, minblock, minblank, mineol, minjob))
    {
        minblock = Job[i].block;
        minblank = Job[i].blank;
        mineol = Job[i].eol;
        minjob = i;
    }
  }
  if (minjob == MAX_POSS_JOBS) return(0);
  *blocks = minblock;
  *blanks = minblank;
  *eols = mineol;
  *jobnum = minjob;
  Job[*jobnum].processed = 1;
  return(1);
}

/*----------------------------------------------------------------
 * Copyright 1988, Resumix, Inc.
 *
 * extract.c
 *----------------------------------------------------------------*/ include <stdio.h>
include <malloc.h>
#include <ctype.h>
include "includes.h"

include <palantir/cdp.h> unsigned char *Message;
jmp_buf ExtractRecover;

InitExtract( def_path, class_file)
char *def_path, *class_file;
{
    jmp_buf Recover;

if (setjmp(Recover) != -1)
    {
       if (!InitMemory())
          Error(Recover, "Cannot allocate memory");
       GarbageCollect(REINIT_COLLECT);
       InitSegment();
       InitPrescan();
       ReadClassDefs(def_path, class_file);
       InitTemplates();
       return(TRUE);
    }
    else
       return(FALSE);
}

InitMemory()
{
    Message = (unsigned char *)malloc(MAX_MESSAGE);
```

```
   WordList= malloc(MAX_WORD_CHARS);
   Memory= malloc(MAX_MEMORY);
   if (WordList==NULL || Memory==NULL || Message == NULL)
   {
      return(FALSE);
   }
   return(TRUE);
}

FreeMemory()
{
   free(Message);
   free(WordList);
   free(Memory);
} do_extract( res, bitmap)
char res[], bitmap[];
{
   FILE *res_file;
   long len;

if (setjmp(ExtractRecover) != -1)
   {
      GarbageCollect(MESSAGE_COLLECT);
      res_file= fopen( res, "r");
      len = fread(Message, 1, MAX_MESSAGE-1, res_file);
      Message[len]= '\0';
      fclose( res_file);
      FormatMessage();
      PreScanMessage();
/*       PrintPrescanStats(); */
      FillTemplates();
      WriteTemplates(res, bitmap);
/*       PrintUtilStats(); */
      return(0);
   }
   return(1);
}

FormatMessage()
{
   unsigned char *dest_ptr, *source_ptr, *line_ptr;
   int      last_blank, line_has_alpha, line_length;
   BOOLEAN warning;
   int error_code;
   FILE *out;
define MAX_HEADER_LENGTH 40 warning = FALSE;
/* get rid of CSI strings and flag bad characters */
   for(source_ptr = dest_ptr = Message; *source_ptr != '\0'; source_ptr++)
   {
      while((*source_ptr == (unsigned char)CSI) || (*source_ptr == 27))
      {
/*       get the reason for doubt and skip over the CSI string */
         source_ptr =
               (unsigned char *)c_csiparse(source_ptr, NULL, &error_code);
         warning = error_code == CSI_CMARK;
      }
      if (warning)
      {
/* kludge when Palantir ends a file with an error indicator */
         if (*source_ptr == '\0') break;

*dest_ptr++ = *source_ptr | 0x80;
         warning = FALSE;
      }
      else
         *dest_ptr++ = *source_ptr;
   }
   *dest_ptr = '\0';
```

```c
    line_length= 0;
    for(source_ptr= dest_ptr= line_ptr= Message; *source_ptr!='\0';
        source_ptr++)
    {
        line_has_alpha= FALSE;
        last_blank= TRUE;
        for( ; (*source_ptr != '\n') && (*source_ptr != '\0'); source_ptr++)
        {
            if (isalnum(*source_ptr)) line_has_alpha= TRUE;
/*            if (!last_blank || *source_ptr != ' ')
            { */
                last_blank= *source_ptr==' ';
                *dest_ptr= *source_ptr;
                dest_ptr++;
                line_length++;
/*            } */
        }
        if (line_has_alpha)
        {
            if (*line_ptr=='\\' && line_length>MAX_HEADER_LENGTH)
                *line_ptr= '|';
            *dest_ptr= *source_ptr;
            dest_ptr++;
            line_ptr= dest_ptr;
            line_length= 0;
        }
        else
        {
            if (line_length>0 && (*line_ptr=='\\' || *line_ptr=='|'))
            {
                line_length= 1;
                dest_ptr=line_ptr+1;
            }
            else
            {
                line_length= 0;
                dest_ptr=line_ptr;
            }
        }
    }
    *dest_ptr= *source_ptr;

/*
    out = fopen("RESUME", "w");
    fwrite(Message, dest_ptr-Message, 1, out);
    fclose(out);
*/
}

/*---------------------------------------------------------------
 * Copyright 1988, Resumix, Inc.
 *
 * ext.c
 *---------------------------------------------------------------*/
include <stdio.h>
#include <fcntl.h>
#include <malloc.h>
#include <setjmp.h>
#include <search.h>
#include "../defines.h"
#include "defines.h"
#include "utils.h"
#include "extract.h"
#include "template.h"
#include "../DB/dbase.h"
#include "../DB/dbresume.h"

static RESUME_STRUCT *CurrentResume;

ExtractWarning(string)
char *string;
```

```
{
    CurrentResume->status |= EXTRACT_ERRORS;
}

DoExtract( res)
RESUME_STRUCT *res;
{
    int text;
    char file_name[120], errmsg[180];
    extern char *DBReadText();

CurrentResume = res;
    if (setjmp(ExtractRecover)!= -1)
    {
        strcpy( file_name, "'no directory'");
        if (!GetTextFileName( res->date_received, res->file_id, file_name, 0) ||
            (text= open( file_name, O_RDONLY))== -1)
        {
            sprintf( errmsg, "Cannot read text %s for unverif resume %d", file_name, r
            Error( ExtractRecover, errmsg);
        }
        GarbageCollect(MESSAGE_COLLECT);
        read( text, Message, MAX_MESSAGE);
        Message[MAX_MESSAGE-1]= '\0';
        close( text);
        FormatMessage();
        PreScanMessage();
/*         PrintPrescanStats(); */
        FillTemplates();
        WriteTemplates();
/*         PrintUtilStats(); */
        SaveExtract( res);
        return(0);
    }
    return(1);
}

SaveExtract( res)
RESUME_STRUCT *res;
{
    int i;
    char *PostProcessName();
    ADDRESS_STRUCT *addr;
    PHONE_STRUCT *phon;

res->first_name[0] = 0;
    res->last_name[0] = 0;
    res->middle_name[0] = 0;
    res->postfix_name[0] = 0;
    res->prefix_name[0] = 0;
    res->num_address = 0;
    res->num_phone = 0;
    res->num_job = 0;
    res->num_category = 0;
    res->num_buzzword = 0;
    res->num_degree = 0;
    res->num_comment = 0;
    res->first_year = PRESENT_YEAR;
    i = 0;
    while(i < NumPerson)
    {
        if (StrEqu(Person[i].title, "Applicant"))
        {
            PostProcessName(res, &i);
        }
        else if (StrEqu(Person[i].title, "Address") ||
                 StrEqu(Person[i].title, "Address_type"))
        {
            PostProcessAddress(res, &i);
        }
        else if (StrEqu(Person[i].title, "Degree"))
```

```c
    {
        PostProcessDegree(res, &i);
    }
    else if (StrEqu(Person[i].title, "Home_Phone") ||
            StrEqu(Person[i].title, "Work_Phone") ||
            StrEqu(Person[i].title, "Message_Phone"))
    {
        PostProcessPhone(res, &i);
    }
    else if (StrEqu(Person[i].title, "Dates"))
    {
        PostProcessJobs(res, &i);
    }
    else if (StrEqu(Person[i].title, "Experience"))
    {
        PostProcessBuzzwords(res, &i);
    }
    else if (StrEqu(Person[i].title, "Obj_Category") ||
            StrEqu(Person[i].title, "Exp_Category"))
    {
        PostProcessCategory(res, &i, Person[i].title);
    }
    else
    {
        i++;
    }
    }
    if (res->num_category == 0)
    {
        res->num_category = 1;
        strcpy(Category[0].string, "None");
    }
    AddNewResume(res);
}

/*-----------------------------------------------------------------
 * Copyright 1988, Resumix, Inc.
 *
 * dict.c
 *-----------------------------------------------------------------*/ include <stdio.h>
include "includes.h"

char Value[1024];
static char InBetween[256];
extern int FirstNumChildErr;

static
Words(operator, nwords, ind, entity, ent, phrase, class)
int operator, nwords, ind, entity[], ent[];
CLASS *class;
PHRASE *phrase;
{
    register long ent0, ent1;
    long i;
    BOOLEAN found;

found = FALSE;
    for(i=ind; ent[i]==NULL_ENTITY; i--) ;
    ent0 = ent[i];
    if (nwords < 0)
    {
        nwords = -nwords;
        for(ent1 = entity[ind + 1]; ent1 != NO_ENTITY; ent1 = Entity[ent1].next)
        {
            if ((Entity[ent0].start > Entity[ent1].end) &&
                (Entity[ent0].start <= Entity[ent1].end + nwords))
            {
                if (operator & NOT_OPERATOR)
                    return;
```

```
            else
            {
                ent[ind + 1] = ent1;
                NextOperator(ind + 1, entity, ent, phrase, class);
                found = TRUE;
            }
         }
      }
   }
   else
   {
      nwords++;
      for(ent1 = entity[ind + 1]; ent1 != NO_ENTITY; ent1 = Entity[ent1].next)
      {
         if ((Entity[ent1].start > Entity[ent0].end) &&
             (Entity[ent1].start <= Entity[ent0].end + nwords))
         {
            if (operator & NOT_OPERATOR)
               return;
            else
            {
                ent[ind + 1] = ent1;
                NextOperator(ind + 1, entity, ent, phrase, class);
                found = TRUE;
                if (operator & FIRST_OPERATOR) break;
            }
         }
      }
   }
   if (!found)
   {
      if ((operator & NOT_OPERATOR) || (operator & OPTIONAL_OPERATOR))
      {
         ent[ind + 1] = NULL_ENTITY;
         NextOperator(ind + 1, entity, ent, phrase, class);
      }
   }
} static
Within(operator, ind, entity, ent, phrase, class)
int operator, ind, entity[], ent[];
CLASS *class;
PHRASE *phrase;
{
   register long i, ent1;
   long start, end;
   BOOLEAN found;

found = FALSE;
   start= SHORT_INFINITY;
   end= 0;
   for(i=0; i<=ind; i++)
   {
      if ( ent[i]!=NULL_ENTITY &&
           !((PhrasePair[phrase->first_pair+i].operator &
                 (WITHIN_OPERATOR | CONTAINS_OPERATOR)) &&
             (PhrasePair[phrase->first_pair+i].operator & IGNORE_OPERATOR)) )
      {
         start= MIN( Entity[ent[i]].start, start);
         end= MAX( Entity[ent[i]].end, end);
         found= TRUE;
      }
   }
   if (!found)
   {
      start= 0;
      end= SHORT_INFINITY;
   } else
      found= FALSE;
   for( ent1 = entity[ind + 1]; ent1 != NO_ENTITY; ent1 = Entity[ent1].next)
   {
```

```c
      if (Entity[ent1].start <= start && Entity[ent1].end >= end)
      {
         if (operator & NOT_OPERATOR)
            return;
      } else if (!(operator & NOT_OPERATOR)
               || (operator & IGNORE_OPERATOR))
         continue;
      ent[ind + 1] = ent1;
      NextOperator(ind + 1, entity, ent, phrase, class);
      found= TRUE;
   }
   if (!found)
   {
      if ((operator & (IGNORE_OPERATOR | NOT_OPERATOR))==
            (IGNORE_OPERATOR | NOT_OPERATOR))
      {
         ent[ind + 1] = NULL_ENTITY;
         NextOperator(ind + 1, entity, ent, phrase, class);
      }
   }
} static
Contains(operator, ind, entity, ent, phrase, class)
int operator, ind, entity[], ent[];
CLASS *class;
PHRASE *phrase;
{
   register long i, ent1;
   long start, end;
   BOOLEAN found;

found = FALSE;
   start= SHORT_INFINITY;
   end= 0;
   for(i=0; i<=ind; i++)
   {
      if ( ent[i]!=NULL_ENTITY &&
           !((PhrasePair[phrase->first_pair+i].operator &
                (WITHIN_OPERATOR | CONTAINS_OPERATOR)) &&
             (PhrasePair[phrase->first_pair+i].operator & IGNORE_OPERATOR)) )
      {
         start= MIN( Entity[ent[i]].start, start);
         end= MAX( Entity[ent[i]].end, end);
      }
   }
   for( ent1 = entity[ind + 1]; ent1 != NO_ENTITY; ent1 = Entity[ent1].next)
   {
      if (Entity[ent1].start >= start && Entity[ent1].end <= end)
      {
         if (operator & NOT_OPERATOR)
            return;
      } else if (!(operator & NOT_OPERATOR)
               || (operator & IGNORE_OPERATOR))
         continue;
      ent[ind + 1] = ent1;
      NextOperator(ind + 1, entity, ent, phrase, class);
      found= TRUE;
   }
   if (!found)
   {
      if ((operator & (IGNORE_OPERATOR | NOT_OPERATOR))==
            (IGNORE_OPERATOR | NOT_OPERATOR))
      {
         ent[ind + 1] = NULL_ENTITY;
         NextOperator(ind + 1, entity, ent, phrase, class);
      }
   }
} static
Before(operator, ind, entity, ent, phrase, class)
```

```
int operator, ind, entity[], ent[];
CLASS *class;
PHRASE *phrase;
{
   register long ent0, ent1;
   long i;
   BOOLEAN found;

found = FALSE;
   for(i=ind; ent[i]==NULL_ENTITY; i--) ;
   ent0 = ent[i];
   for(ent1 = entity[ind + 1]; ent1 != NO_ENTITY; ent1 = Entity[ent1].next)
   {
      if (Entity[ent1].start > Entity[ent0].end)
      {
         if (operator & NOT_OPERATOR)
            return;
         else
         {
            ent[ind + 1] = ent1;
            NextOperator(ind + 1, entity, ent, phrase, class);
            found = TRUE;
            if (operator & FIRST_OPERATOR) break;
         }
      }
   }
   if (!found)
   {
      if ((operator & NOT_OPERATOR) || (operator & OPTIONAL_OPERATOR))
      {
         ent[ind + 1] = NULL_ENTITY;
         NextOperator(ind + 1, entity, ent, phrase, class);
      }
   }
} static
BOOLEAN
GetInBetween(first, second)
int first, second;
{
   register unsigned char *ptr, *end;
   long i, in_white;
   long error_code;
   BOOLEAN warning;

InBetween[0] = '\0';
   warning = FALSE;
   ptr = &Message[WordLoc[first].end + 1];
   end = &Message[WordLoc[second].start];
/* skip over leading white space */
   while((ptr < end) && (OutsideMap[*ptr] == ' ')) ptr++;
   if (ptr == end) return(warning);
/* get useful info deleting excess white space */
   for(i=0, in_white=FALSE; ptr < end; ptr++)
   {
      warning |= *ptr >= 0x80;
/*       if (InsideMap[*ptr] != ' ')
       { */
         if (in_white)
         {
            if (i>=sizeof(InBetween)-2)
               break;
            InBetween[i++]= ' ';
         }
         else
         {
            if (i>=sizeof(InBetween)-1)
               break;
         }
         InBetween[i++] = InsideMap[*ptr];
         in_white= FALSE;
```

```
/*         }
        else
            in_white= TRUE; */
    }
    while (i>0 && OutsideMap[InBetween[i-1]] == ' ') i--;
    InBetween[i] = '\0';
    return(warning);
}

AddValue(string)
char *string;
{
    if (*string == '\0') return;
    if (strlen(Value)+strlen(string)>=sizeof(Value))
        return;
    strcat(Value, string);
} static
NextOperator(ind, entity, ent, phrase, class)
int ind, entity[], ent[];
CLASS *class;
PHRASE *phrase;
{
    register long i;
    long first_child;
    long j, ent0, ent1, operator, within_num, first, last;
    char *separator;
    BOOLEAN warning;

if ((ind + 1) == phrase->num_pairs)
    {
        warning = FALSE;
        Value[0] = '\0';
        separator= "";
        first_child = -1;
        for(i = 0; i <= ind; i++)
        {
            ent1= ent[i];
            operator= PhrasePair[phrase->first_pair + i].operator;
            separator = (operator & MERGE_OPERATOR) ? "" : " ";
            separator = (Value[0] == '\0') ? "" : separator;
            if (operator & REMEMBER_OPERATOR)
            {
                for(j= i-1; j>=0 && ent[j]==NULL_ENTITY; j--) ;
                if (j>=0)
                {
                    ent0= ent[j];
                    if (class->class_syn & TYPE_CLASS)
                    {
                        AddValue(separator);
                        warning |= GetInBetween(Entity[ent0].end, Entity[ent1].start);
                        if (InBetween[0] == '\0') return;
                        AddValue(InBetween);
                    }
                    if (first_child == -1)
                    {
                        first = Entity[ent0].end + 1;
                        last = Entity[ent1].start - 1;
                        if (first<=last) first_child = NumEntityChild;
                    }
                    else
                    {
                        first = MIN(first, Entity[ent0].end + 1);
                        last = MAX(last, Entity[ent1].start - 1);
                    }
                    if (NumEntityChild>=MAX_ENTITY_CHILD - 1)
                    {
                      if (FirstNumChildErr)
                      {
                        FirstNumChildErr = FALSE;
                        ExtractWarning("Exceeded maximum number of entity children");
```

```
                }
                EntityChild[NumEntityChild] = NO_ENTITY;
                return;
            }
            EntityChild[NumEntityChild++] = NO_ENTITY;
        }
    }
    if (!(operator & IGNORE_OPERATOR))
    {
        if(ent[i] != NULL_ENTITY)
        {
            if (class->class_syn & TYPE_CLASS)
            {
                AddValue(separator);
                warning |= Entity[ent1].warning;
                AddValue(Entity[ent1].value);
            }
            if (first_child == -1)
            {
                first_child = NumEntityChild;
                first = Entity[ent1].start;
                last = Entity[ent1].end;
            }
            else
            {
                first = MIN(first, Entity[ent1].start);
                last = MAX(last, Entity[ent1].end);
            }
            if (NumEntityChild>=MAX_ENTITY_CHILD - 1)
            {
                if (FirstNumChildErr)
                {
                    FirstNumChildErr = FALSE;
                    ExtractWarning("Exceeded maximum number of entity children");
                }
                EntityChild[NumEntityChild] = NO_ENTITY;
                return;
            }
            EntityChild[NumEntityChild++] = ent[i];
        }
    }
}
if (first_child == -1)
    return;
if (NumEntityChild>=MAX_ENTITY_CHILD-1)
{
    if (FirstNumChildErr)
    {
        FirstNumChildErr = FALSE;
        ExtractWarning("Exceeded maximum number of entity children");
    }
    EntityChild[NumEntityChild] = NO_ENTITY;
    return;
}
EntityChild[NumEntityChild++] = NO_ENTITY;
switch (class->class_syn)
{
case TYPE_SYNONYM:
    AddEntity(class->entity_type, phrase->first_pair, class->name,
            first, last, first_child, FALSE);
    break;
case TYPE_CLASS:
    AddEntity(class->entity_type, phrase->first_pair, StrSave(Value),
            first, last, first_child, warning);
    break;
}
return;
}
    operator = PhrasePair[phrase->first_pair + ind + 1].operator;
/* sign extend number */
    within_num = operator & NUMBER_MASK;
    if (within_num & SIGN_BIT)
```

```c
        within_num -= NUMBER_MASK + 1;
    if (operator & BEFORE_OPERATOR)
        Before(operator, ind, entity, ent, phrase, class);
    else if (operator & WITHIN_OPERATOR)
        Within(operator, ind, entity, ent, phrase, class);
    else if (operator & CONTAINS_OPERATOR)
        Contains(operator, ind, entity, ent, phrase, class);
    else
        Words(operator, within_num, ind, entity, ent, phrase, class);
} static
ScanForPhrase(phrase, class)
PHRASE *phrase;
CLASS *class;
{
    register long i;
#define ENTITY_HOLDER_SIZE 32
    long entity[ENTITY_HOLDER_SIZE], ent[ENTITY_HOLDER_SIZE];

for(i = 0; i < phrase->num_pairs; i++)
    {
        entity[i] = EntityPtr[PhrasePair[phrase->first_pair + i].entity_type];
        if (entity[i] == NO_ENTITY)
            if (!(PhrasePair[phrase->first_pair + i].operator &
                  (NOT_OPERATOR | OPTIONAL_OPERATOR)))
                return;
    } for(i = 0; i < phrase->num_pairs; i++)
    {
        ent[i]= entity[i];
        while (ent[i] == NO_ENTITY)
        {
            ent[i]= NULL_ENTITY;
            if (++i==phrase->num_pairs) break;
            ent[i]= entity[i];
        }
        if (i==phrase->num_pairs) break;
        do
        {
            NextOperator(i, entity, ent, phrase, class);
            ent[i] = Entity[ent[i]].next;
        } while (ent[i] != NO_ENTITY);
        if ( !(PhrasePair[phrase->first_pair + i].operator &
               (NOT_OPERATOR | OPTIONAL_OPERATOR)) )
        {
          break;
        }
        ent[i]= NULL_ENTITY;
    }
}

ScanForClasses(class)
int class;
{
    register long phrase, i;

for(i = 0, phrase = ClassList[class].first_phrase;
                i < ClassList[class].num_phrases; i++, phrase++)
    {
        ScanForPhrase(&Phrase[phrase], &ClassList[class]);
    }
}
/* Devaluates synonyms if they occur across multiple categories */ include <stdio.h>
include "includes.h"
#include "devaluate.h"

#define FALSE 0
#define TRUE 1
```

```
static int HASHSIZE = MAX_CLASS * 4 / 5;
struct wlist *hashtab[MAX_CLASS * 4 / 5];

int ExperienceEntity, EducationEntity, JobEntity;

int Whash(s)
int s;
{
  /* fprintf(stderr,"HASHVAL is %d\n", s % HASHSIZE); */
  return (s % HASHSIZE);
} int newcategory(np,category)
WLIST *np;
int category;
{
  int i;
  for (i=0; i< np->number; i++)
    if (np->categories[i] == category) return(FALSE);
  return(TRUE);
}

WLIST *Wlookup(s)
int s;
{
  WLIST *np;
  /* fprintf(stderr," Wlookup s is %d",s); */
  for (np=hashtab[Whash(s)]; np != NULL; np = np->next)
    if (s == np->entity_type) return(np);
  return(NULL);
} void PrintHashTable()
{
  int i;
  for (i=0; i<HASHSIZE; i++)
  {
    if (hashtab[i])
/* && hashtab[i]->number > 0) */
      fprintf(stderr,"Class is %s, number is %d value is %d\n",
        ClassList[hashtab[i]->entity_type-FIRST_CLASS].name,
          hashtab[i]->number,hashtab[i]->Value);
  }
} void InitHash ()
{ int i;
  for(i=0;i<HASHSIZE;i++)
    hashtab[i] = NULL;
}

WLIST *install(entity,category)
int entity,category;
{
  WLIST *np,*Wlookup();
  char *malloc();
  int hashval;
/*
  fprintf(stderr,"Inst type %d entity %s, category %s\n",
   entity,
   ClassList[entity-FIRST_CLASS].name,
   ClassList[category-FIRST_CLASS].name);
*/
  if ((np=Wlookup(entity)) == NULL)
  {
    np = (WLIST *) malloc (sizeof (*np));
    if (np == NULL)
```

```c
    {
      fprintf(stderr,"Error in devaluate::install - No Memory");
      return(NULL);
    }
    hashval = Whash(entity);
    np->next = hashtab[hashval];
    np->entity_type = entity;
    np->number = 1;
    np->Value = 2;
    np->categories[0] = category;
    hashtab[hashval] = np;
  }
  else if (newcategory(np,category))
  {
    np->categories[np->number] = category;
    if (np->number < MAX_CATEGORIES) np->number++;
    if (np->Value) np->Value /= 2;
  }
  return(np);
} void InitSpecialEntities()
{
  int i;

PointsEntity=0;
  CategoryEntity=0;
  ObjectiveEntity=0;
  ExperienceEntity=0;
  EducationEntity=0;
  JobEntity = 0;

for (i=0;i<MAX_CLASS;i++)
  {
    if (!PointsEntity && !strcmp(ClassList[i].name,"Points") &&
        ClassList[i].class_syn == TYPE_CLASS)
      PointsEntity = i+FIRST_CLASS;
    else if (!ObjectiveEntity &&
        !strcmp(ClassList[i].name,"Objective") &&
        ClassList[i].class_syn == TYPE_CLASS)
      ObjectiveEntity = i+FIRST_CLASS;
    else if (!CategoryEntity &&
        !strcmp(ClassList[i].name,"Category") &&
        ClassList[i].class_syn == TYPE_CLASS)
      CategoryEntity = i+FIRST_CLASS;
    else if (!ExperienceEntity &&
        !strcmp(ClassList[i].name,"Experience") &&
        ClassList[i].class_syn == TYPE_CLASS)
      ExperienceEntity = i+FIRST_CLASS;
    else if (!JobEntity &&
        !strcmp(ClassList[i].name,"POS_TITLE") &&
        ClassList[i].class_syn == TYPE_CLASS)
      JobEntity = i+FIRST_CLASS;
    else if (!EducationEntity &&
        !strcmp(ClassList[i].name,"DEGREE_YEAR") &&
        ClassList[i].class_syn == TYPE_CLASS)
      EducationEntity = i+FIRST_CLASS;
    else if (CategoryEntity && ObjectiveEntity && PointsEntity
      && EducationEntity && ExperienceEntity && JobEntity)
      break;
  }
}

GetClass(token)
char *token;
{
  int i;
```

```c
    for (i=0; i< MAX_CLASS; i++)
      if (ClassList[i].name &&
         !strcmp(ClassList[i].name, token) &&
          ClassList[i].class_syn == TYPE_SYNONYM)
         return(FIRST_CLASS + i);
   return(0);
}

RemoveUseless()
{
   static char token[24];
   FILE *fp;
   WLIST *np,*Wlookup();
   int entity, len;
   extern FILE *POpen();

if ((fp = POpen("knowledge", "useless.words", "r"))
      != NULL)
      while (fgets(token, 24, fp) != NULL)
      {
        len = strlen(token);
        if (token[len-1] == '\n') token[len-1] = 0;
        if (!(entity = GetClass(token)))

fprintf(stderr, "ERROR: useless token %s not found.\n", token);
        else if ((np = Wlookup(GetClass(token))) != NULL)
           np->Value = 0;
        else
           fprintf(stderr, "ERROR2: useless token %s not found.\n", token);
      }
   else fprintf(stderr,"WARNING: could not find $DBPATH/knowledge/useless.words\n");
} void LoadBuzzWords ()
{
  int i,j,k,l,m,experience;
  int catfp,cat,subcat,subcatfp,skillsfp,skills,skillfp,skill,wordfp;

InitHash();
  InitSpecialEntities();
  experience = CategoryEntity-FIRST_CLASS;
  if (experience == MAX_CLASS)
     fprintf(stderr,"Category CLASS NOT FOUND");
 /* for each category */
  for (i=0,catfp=ClassList[experience].first_phrase;
        i<ClassList[experience].num_phrases;i++,catfp++)
     {
 /* for each subcategory */
     for (j=0,cat=PhrasePair[Phrase[catfp].first_pair].entity_type,
              subcatfp=ClassList[cat-FIRST_CLASS].first_phrase;
              j<ClassList[cat-FIRST_CLASS].num_phrases;j++,subcatfp++)
     {
 /* for each group of skills */
        for (k=0,subcat=PhrasePair[Phrase[subcatfp].first_pair].entity_type,
              skillsfp=ClassList[subcat-FIRST_CLASS].first_phrase;
              k<ClassList[subcat-FIRST_CLASS].num_phrases;k++,skillsfp++)
        {
 /* for each skill */
           for (l=0,skills=PhrasePair[Phrase[skillsfp].first_pair].entity_type,
                 skillfp=ClassList[skills-FIRST_CLASS].first_phrase;
                 l<ClassList[skills-FIRST_CLASS].num_phrases;l++,skillfp++)
 /* for each synonym */
           {
              if (!strncmp("Skill",ClassList[skills-FIRST_CLASS].name,5))
              {
                 for (m=0,skill=
PhrasePair[Phrase[ClassList[PhrasePair[Phrase[skillfp].first_pair
].entity_type-FIRST_CLASS].first_phrase].first_pair].entity_type,
                    wordfp=ClassList[skill-FIRST_CLASS].first_phrase;
                    m<ClassList[skill-FIRST_CLASS].num_phrases;m++,wordfp++)
```

```c
            {
              install(PhrasePair[Phrase[wordfp].first_pair].entity_type,cat);
            }
          }
        }
      }
    }
  }
  RemoveUseless();
}

/*----------------------------------------------------------------------
 * Copyright 1988, Resumix, Inc.
 *
 * action.c
 *---------------------------------------------------------------------*/ include <stdio.h>
include <sys/types.h>
#include <sys/timeb.h>
#include <time.h>
#include <malloc.h>
#include "devaluate.h"
include <ctype.h> include "../EXTRACT/includes.h"

static int SubcatObjective[MAX_SUBCAT];
static int Subcats[MAX_SUBCAT];
static int SubcatPoints[MAX_SUBCAT];
static int DeletedSubcats[MAX_SUBCAT];

static int CategoryObj[MAX_CATEGORIES];
static int CategorySub[MAX_CATEGORIES];
static int Category[MAX_CATEGORIES];
static int CategoryPts[MAX_CATEGORIES];
static int DeletedCats[MAX_CATEGORIES];

/* finds position of phrase in parent (0 is first phrase) */
int FindPhrase (parent,entity)
int parent,entity;
{
  int phrase,number;

for(number=0,
        phrase=ClassList[parent-FIRST_CLASS].first_phrase;
      number<ClassList[parent-FIRST_CLASS].num_phrases,
        PhrasePair[Phrase[phrase].first_pair].entity_type != entity;
      number++,phrase++);
  if (number == ClassList[parent-FIRST_CLASS].num_phrases)
  {
    fprintf(stderr,"Error in FindPhrase, %s not found\n",
      ClassList[parent-FIRST_CLASS].name);
    return(0);
  }
  else return(number);
}

/* Gets entity in position number from parent entity */
int GetEntity(parent,number)
int parent,number;
{
  return(PhrasePair[Phrase[ClassList[parent-FIRST_CLASS].first_phrase
    + number].first_pair].entity_type);
} int NotDeleted(entity,DeleteList,num)
```

```
int entity,*DeleteList,num;
{
  int i;

for(i=0;i<num;i++)
    if(DeleteList[i]==entity)
      return(0);
  return(1);
} int NextValid(entity,DeleteList,num)
int entity,num,*DeleteList;
{
  int child;

for(;entity != NO_ENTITY; entity = Entity[entity].next)
    if (NotDeleted(Entity[EntityChild[Entity[entity].children
         ]].entity_type,DeleteList,num))
    {
      return(entity);
    }
  return(NO_ENTITY);
} int Delete(class,DeleteList,num)
CLASS *class;
int num,*DeleteList;
{
  int entity;

EntityPtr[class->entity_type] =
    NextValid(EntityPtr[class->entity_type],DeleteList,num);
  for(entity = EntityPtr[class->entity_type];
      entity != NO_ENTITY;
      entity = Entity[entity].next)
    Entity[entity].next = NextValid(Entity[entity].next,DeleteList,num);
} int MuchMoreCatPoints(p1,p2)
int p1,p2;
{
  return((p1-MIN_THRESH)>(CAT_FACTOR * (p2-MIN_THRESH)));
}
int MuchMorePoints(p1,p2)
int p1,p2;
{
  return((p1-MIN_THRESH)>(SUBCAT_FACTOR * (p2-MIN_THRESH)));
} int FindTitle(subcat)
int subcat;
{
  int i,item;

for (i=0,item=ClassList[subcat-FIRST_CLASS].first_phrase;
       i<ClassList[subcat-FIRST_CLASS].num_phrases;
       i++,item++)
    if (!strncmp("Title",ClassList[
          PhrasePair[Phrase[item].first_pair].entity_type-FIRST_CLASS
            ].name,5))
      return(PhrasePair[Phrase[ClassList[
          PhrasePair[Phrase[item].first_pair].entity_type-FIRST_CLASS
            ].first_phrase].first_pair].entity_type);
  return(NO_ENTITY);
```

```c
} int ObjectiveSubcat(entity,num)
int entity,num;
{
  int i;

for(i=0;i<num;i++)
  {
    if (SubcatObjective[i] == FindTitle(entity))
      return(1);
  }
  return(0);
} int ObjectiveCat(ObjEntity,num)
int ObjEntity,num;
{
  int i;
  for(i=0;i<num;i++)
    if (CategoryObj[i] == ObjEntity)
      return(1);
  return(0);
} int AssignedSubcat(entity,num)
int entity,num;
{
  int i;

for(i=0;i<num;i++)
  {
    if (FindTitle(Subcats[i]) == entity)
    {
      return(SubcatPoints[i]);
    }
  }
  return (0);
} int InstallObjCat(entity,num)
int entity,*num;
{
  int i;

for (i=0;i < *num && i<MAX_CATEGORIES;i++)
    if (CategoryObj[i] == entity) return(0);
  if (i==MAX_CATEGORIES)

{
     fprintf(stderr,
        "Too Many Objective Categories to disambiguate\n");
     *num=0;
  }
  else CategoryObj[(*num)++]=entity;
} int InstallCat(entity,num)
int entity,*num;
{
  int i;

for (i=0;i<*num && i<MAX_CATEGORIES;i++)
    if (Category[i] == entity)
      return(1);
  if (i==MAX_CATEGORIES)
```

```c
    {
      fprintf(stderr,
          "Too Many Assigned Categories to disambiguate\n");
      *num=0;
      return(0);
    }
  else Category[(*num)++]=entity;
  return(1);
}

/* first child is position 1 */
int GetChild(parent,pos)
int parent,pos;
{
  int i,entity;

for(i=1,entity=EntityPtr[PointsEntity];i<pos;
      i++,entity=Entity[entity].next) {}
  return(EntityChild[Entity[entity].children]);
}

/* GetMaxPoint gets the max points of the phrase of /Points */
int GetMaxPoints(category)
{
  int entity,maxpts;

for(maxpts=0,entity=EntityPtr[category];entity!=NO_ENTITY;
      entity=Entity[entity].next)
  {
    if (atoi(Entity[entity].value)>maxpts)
      maxpts = atoi(Entity[entity].value);
  }
  return(maxpts);
} void GetMaxCatPoints(Cats,num)
int *Cats,num;
{
  int i;

for(i=0;i<num;i++)
    CategoryPts[i] = GetMaxPoints(GetEntity(PointsEntity,
      FindPhrase(CategoryEntity,Category[i])));
} int AssignedCatPts(ObjEntity,numcats)
int ObjEntity,numcats;
{
  int CatEnt,cat;

CatEnt = GetEntity(CategoryEntity,
    FindPhrase(ObjectiveEntity,ObjEntity));
  for(cat=0;cat<numcats;cat++)
    if (Category[cat] == CatEnt)
      return(CategoryPts[cat]);
  return(0);
}

/*
if classified in two categories and objective is one of them
and there are much more points in the objective category
then eliminate the other category */
void CheckCategory(class)
CLASS *class;
  {
    int entity,delete,ObjPoints,i,j;
    int cats,obj,pos, maxpts;
```

```
    cats = 0;
    obj = 0;
    pos = 0;
    delete = 0;
    maxpts = 0;

for(entity=EntityPtr[ObjectiveEntity]; entity != NO_ENTITY;
        entity = Entity[entity].next)
      InstallObjCat(Entity[EntityChild[Entity[entity].children]
        ].entity_type,&obj);
    for(entity = EntityPtr[class->entity_type]; entity != NO_ENTITY;
                entity = Entity[entity].next,pos++)
      if (!InstallCat(Entity[EntityChild[Entity[entity].children
        ]].entity_type,&cats))
         break;
    if (cats) GetMaxCatPoints(Category,cats);
    for(i=0;i<cats;i++)
    {
/*     fprintf(stderr,"Category %d %s has %d points\n",
         Category[i], Entity[Category[i]].value, CategoryPts[i]);   */
       if (CategoryPts[i] > maxpts)
          maxpts = CategoryPts[i];
    }
    for(i=0;i<cats;i++)
    {
       if (maxpts > 2*CategoryPts[i])
          DeletedCats[delete++] = Category[i];
    }

}
    if (obj==1)
    {
       if (cats)
       {
          for(i=0;i<obj;i++)
            if (ObjPoints = AssignedCatPts(CategoryObj[i],cats))
            {
               for(j=0;j<cats;j++)
               {
                  if (!ObjectiveCat(GetEntity(ObjectiveEntity,
                         FindPhrase(CategoryEntity,Category[j])),obj) &&
                     DeletedCats[delete++] = Category[j];
               }
            }
       }
    }
    if (delete) Delete(class,DeletedCats,delete);
} void CheckSubcat(class)
CLASS *class;
{
    int PtsEntity,entity,subcats,obj,points,i,j,pos,delete;
    int SubcatPtsEntity,SubcatObjEntity,ObjPoints;
    int maxpts;

subcats = 0;
    obj = 0;
    points = 0;
    delete = 0;
    maxpts = 0;

pos=FindPhrase(CategoryEntity,class->entity_type);
    SubcatPtsEntity = GetEntity(PointsEntity,pos);
    SubcatObjEntity = GetEntity(ObjectiveEntity,pos);

for(entity = EntityPtr[SubcatObjEntity]; entity != NO_ENTITY;
                entity = Entity[entity].next)
```

```
    {
      SubcatObjective[obj++] = Entity[EntityChild[Entity[
        entity].children]].entity_type;
      if (obj==MAX_SUBCAT)
      {
        fprintf(stderr,
          "Too Many Objective SubCategories to disambiguate\n");
        obj=0;
        break;
      }
    }
  for(entity = EntityPtr[class->entity_type],
        PtsEntity = EntityPtr[SubcatPtsEntity];
      entity != NO_ENTITY;
      entity = Entity[entity].next,
        PtsEntity = Entity[PtsEntity].next)

{
      Subcats[subcats++] = Entity[EntityChild[Entity[
        entity].children]].entity_type;
      SubcatPoints[points++] = atoi(Entity[EntityChild[Entity[
        PtsEntity].children]].value);
      if (subcats==MAX_SUBCAT)
      {
        fprintf(stderr,
          "Too Many Assigned SubCategories to disambiguate\n");
        subcats=0;
        break;
      }
    }
    for(i=0;i<subcats;i++)
    {
      if (SubcatPoints[i] > maxpts)
        maxpts = SubcatPoints[i];
    }
    for(i=0;i<subcats;i++)
    {
      if (maxpts > 2*SubcatPoints[i])
        DeletedSubcats[delete++] = Subcats[i];
    }
    if (obj)
    {
      if (subcats)
      {
        for(i=0;i<obj;i++)
          if (ObjPoints = AssignedSubcat(SubcatObjective[i],subcats))
          {
            for(j=0;j<subcats;j++)
            {
              if (!ObjectiveSubcat(Subcats[j],obj) &&
                  MuchMorePoints(ObjPoints,SubcatPoints[j]))
                DeletedSubcats[delete++] = Subcats[j];
            }
          }
      }
    }
    if (delete) Delete(class,DeletedSubcats,delete);
  } void GreaterEq(class)
  CLASS *class;
  {
    if (atoi(Entity[EntityPtr[class->entity_type]].value)
        >= atoi(Entity[EntityChild[Entity[EntityPtr[
          class->entity_type]].children]].value)+2)
      Entity[EntityPtr[class->entity_type]].next = NO_ENTITY;
    else
        EntityPtr[class->entity_type] = NO_ENTITY;
```

```
}

Reformat(buffer)
char *buffer;

{
  int i, pos;
  i=0;
  pos = 0;
  while (!isgraph(buffer[i]) || buffer[i] == ',' || buffer[i] == ' ')
    i++;
  while(buffer[i])
  {
    while(isgraph(buffer[i]) && buffer[i] != ',' && buffer[i] != ' ')
      buffer[pos++] = buffer[i++];
    while(buffer[i] && (!isgraph(buffer[i]) || buffer[i] == ',' || buffer[i] == ' '
    if (buffer[i]) buffer[pos++] = ' ';
  }
  buffer[pos] = 0;
  FixCaseToMixed(buffer);
  return;
} char Buffer[100];

isproper(entity)
int entity;
{
  int first,end,numlower;
  int mark, endmark, i, len, upwords, downwords;
  first = Entity[entity].start;
  end = Entity[entity].end;
  numlower = 0;
  mark = -1;
  endmark = -1;
  upwords = 0;
  downwords = 0;
  if (WordLoc[end].end - WordLoc[first].start > 98) return(0);
  for (i=first; i<=end; i++)
    if (isupper(Message[WordLoc[i].start]))
    {
      upwords++;
      if (mark == -1) mark = i;
      endmark = i;
      numlower = downwords;
    }
    else if ((islower(Message[WordLoc[i].start])) && (mark > -1))
      downwords++;
  if ((mark == endmark) || (upwords+numlower > 4) || (numlower >=
upwords))
  {
    return(0);
  }
  len = WordLoc[endmark].end - WordLoc[mark].start + 1;
  if (len > 98) return(0);
  strncpy(Buffer, &Message[WordLoc[mark].start], len);
  Buffer[len] = 0;
  Entity[entity].start = mark;
  Entity[entity].end = endmark;
  Reformat(Buffer);
  len = strlen(Buffer);

if (len >19)
    Buffer[19] = 0;
  else
    Buffer[len] = 0;
  Entity[entity].value = StrSave(Buffer);
  return(1);
```

```
}
ispropern(entity)
int entity;
{
  int first,end,numlower;
  int mark, endmark, i, len, upwords, downwords;
  first = Entity[entity].start;
  end = Entity[entity].end;
  numlower = 0;
  mark = -1;
  endmark = -1;
  upwords = 0;
  downwords = 0;
  if (WordLoc[end].end - WordLoc[first].start > 99)
    {
/*      fprintf(stderr, "BAD1: length > 99 - %s start %d end %d startpos %d endpos %
      return(0);
    }
  for (i=first; i<=end; i++)
    if (isupper(Message[WordLoc[i].start]))
      {
        upwords++;
        if (mark == -1) mark = i;
        endmark = i;
        numlower = downwords;
      }
    else if ((islower(Message[WordLoc[i].start])) && (mark > -1))
      downwords++;
  if ((mark == -1) || (upwords+numlower > 4) || (numlower >= upwords))
    {
/* fprintf(stderr, "BAD: value %s mark %d endmark %d upowrds %d numlower %d\n", Ent
      return(0);
    }
  len = WordLoc[endmark].end - WordLoc[mark].start + 1;
  if (len > 98)
    {
      fprintf(stderr, "BAD2: length > 98 - %s start %d end %d\n",
        Entity[entity].value, WordLoc[mark].start,
        WordLoc[endmark].end);
      return(0);
    }
  strncpy(Buffer, &Message[WordLoc[mark].start], len);
  Buffer[len] = 0;
    Entity[entity].start = mark;
  Entity[entity].end = endmark;
  Reformat(Buffer);
  len = strlen(Buffer);
  if (len >19)
    Buffer[19] = 0;

else
    Buffer[len] = 0;
  Entity[entity].value = StrSave(Buffer);
/*  fprintf(stderr, "GOOD: %s\n", Entity[entity].value); */
  return(1);
}

GetProperNouns(class)
CLASS *class;
{
  int entity;
  unsigned short *previous;

previous = &EntityPtr[class->entity_type];
  for (entity = EntityPtr[class->entity_type]; entity != NO_ENTITY;
       entity = Entity[entity].next)
    if (!isproper(entity))
```

```c
      *previous = Entity[entity].next;
    else
      previous = &Entity[entity].next;
}

GetProperNoun(class)
CLASS *class;
{
  int entity;
  unsigned short *previous;

previous = &EntityPtr[class->entity_type];
  for (entity = EntityPtr[class->entity_type]; entity != NO_ENTITY;
       entity = Entity[entity].next)
    if (!ispropern(entity))
      *previous = Entity[entity].next;
    else
      previous = &Entity[entity].next;
}

/*----------------------------------------------------------------
 * Copyright 1988, 1989, Resumix, Inc.
 *
 * addaction.c
 *----------------------------------------------------------------*/
#include "../EXTRACT/includes.h"

extern int Educate(), Threshhold2(), GreaterEq(), Zero(), AtLeast4(),
    SumMAX(),Sum(), PointSum(), Threshhold(), ThreshPointSum(),
    AtLeastSTANDARD(), CheckSubcat(), CheckCategory(),
    TotalSkillBuzz(), GetProperNouns(), GetProperNoun(),
    AtLeast2(), ExtractJob(), Years(), FirstOccurrence(),
    AtLeast3Diff(), FirstFit(), Days(), PruneName();

ActionRecord ActionRoutines[]= {
    {"Educate", Educate},
    {"AtLeast2",   AtLeast2},
    {"AtLeastSTANDARD",   AtLeastSTANDARD},
    {"TotalSkillBuzz", TotalSkillBuzz},
    {"Threshhold2",  Threshhold2},
    {"Threshhold",   Threshhold},
    {"AtLeast4",   AtLeast4},
    {"GreaterEq", GreaterEq},
    {"AtLeast3Diff",   AtLeast3Diff},
    {"ExtractJob", ExtractJob},
    {"Sum", Sum},
    {"PruneName", PruneName},
    {"GetProperNouns", GetProperNouns},
    {"GetProperNoun", GetProperNoun},
    {"Zero", Zero},
    {"CheckSubcat", CheckSubcat},
    {"CheckCategory", CheckCategory},
    {"SumMAX", SumMAX},
    {"PointSum", PointSum},
    {"ThreshPointSum", ThreshPointSum},
    {"Years",   Years},
    {"FirstFit",    FirstFit},
    {"FirstOccurrence",   FirstOccurrence},
    {"Days",    Days},
    {NULL, NULL}
};

ConvertAction(class)
CLASS *class;
{
    int i;

for(i = 0; ActionRoutines[i].name != NULL; i++)
       if (strcmp(class->action_name, ActionRoutines[i].name)==0)
          break;
    class->action = ActionRoutines[i].func;
```

```
}

AddAction(file, class, args)
char *file;
CLASS *class;

char args[];
{
   char action[80];
   char error_msg[80];
   int n;

sscanf( args, "%s", action);
   for(n=0; ActionRoutines[n].name != NULL; n++)
      if ( strcmp( action, ActionRoutines[n].name)==0)
      {
         class->action = ActionRoutines[n].func;
         class->action_name = (char *)ClassStrSave(args);
         break;
      }
   if (class->action == NULL)
      CheckErrors("%s\tUndefined action   : %s\n", file, action);
}

/*-----------------------------------------------------------------
 * Copyright 1988, Resumix, Inc.
 *
 * action.c
 *-----------------------------------------------------------------*/ include <stdio.h>
include <sys/types.h>
#include <sys/timeb.h>
#include <time.h>
#include <malloc.h>
#include "devaluate.h"
include <ctype.h> include "../EXTRACT/includes.h"

define MAX_CHOICE 32
define MAX_DEGREES 22 extern void CombineKeyDegree();

int FirstNumChildErr = TRUE;
int FirstNumPairsErr = TRUE;

InitAction ()
{
   FirstNumChildErr = TRUE;
} void Mess(recovery_block, message)
int recovery_block;
char *message;
{
/*   fprintf(stderr, "%s: \n", message);
*/
} static int current;

typedef struct _degree {
    int degree;
    int school;
    int date;
```

```c
    int field;
    int gpa;
    int due;
    int share;
} DEGREE;

static DEGREE Degree[MAX_DEGREES];

void reverse(s)
char s[];
{
   int c,i,j;
   for (i=0,j=strlen(s)-1;i<j;i++,j--) {
      c=s[i];
      s[i] = s[j];
      s[j] = c;
   }
} char *itoa(n)
 int n;
 {
    char *s;
    int i;

s = malloc(10);
    i=0;
    do {
       s[i++] = n%10+'0';
    } while (n/=10);
    s[i]=0;
    reverse(s);
    return(s);
 }

/* Prints the frames */
 void Printout(str)
 char *str;
 {
  int i;
  char message[200];
  for(i=0;i<=current;i++) {
  sprintf(message, "%s curr %d deg %s sch %s date %s fld %s gpa %s shar %d",
     str, i,
     Entity[Degree[i].degree].value,
     Entity[Degree[i].school].value,
     Entity[Degree[i].date].value,
     Entity[Degree[i].field].value,
     Entity[Degree[i].gpa].value ,
     Degree[i].share );
   Mess(ExtractRecover, message);
 }} void InitDegrees()
 {
     int i;
     for(i=0;i<MAX_DEGREES;i++)
     {
       Degree[i].degree = 0;
       Degree[i].school = 0;
       Degree[i].date   = 0;
       Degree[i].field  = 0;
       Degree[i].gpa    = 0;
       Degree[i].due    = 0;
       Degree[i].share  = 0;
    }
 } void InitDegree(i)
```

```
    int i;
    {
        Degree[i].degree = 0;
        Degree[i].school = 0;
        Degree[i].date   = 0;
        Degree[i].field  = 0;
        Degree[i].gpa    = 0;
        Degree[i].due    = 0;
        Degree[i].share  = 0;
    }

/* True if degree, school, date do not intersect */
/*    Used to kick off a new degree.             */
int Agree(i)
int i;
{
   int j;
   j=i-1;
   while (Degree[j].share && Degree[j].share == Degree[i].share)
   {
        j--;
        if (j<0) return(0);
   }
   return((!Degree[i].degree || !Degree[j].degree) &&
        (!Degree[i].school || !Degree[j].school) &&
        (!Degree[i].date || !Degree[j].date) &&
        (!Degree[i].field || !Degree[j].field) &&
        (!Degree[i].gpa || !Degree[j].gpa) &&
        (!Degree[i].due || !Degree[j].due));
} void Copy(i)
int i;
{
   Degree[i].degree = Degree[i-1].degree;
   Degree[i].school = Degree[i-1].school;
   Degree[i].date = Degree[i-1].date;
   Degree[i].field = Degree[i-1].field;
   Degree[i].gpa = Degree[i-1].gpa;
   Degree[i].due = Degree[i-1].due;
}

/* Combine the fields of all shared frames */
void Combine(i)
int i;
{
   int j,k;
   j=i-1;
   while (Degree[j].share && Degree[j].share == Degree[i].share)
   {
        j--;
   }
   if (j==i-1)
   {
        k=i;
        i=j;

j=k;
   }
Printout("BEFORE COMBINE");
   if (!Degree[i].degree) Degree[i].degree = Degree[j].degree;
   if (!Degree[i].school) Degree[i].school = Degree[j].school;
   if (!Degree[i].date) Degree[i].date = Degree[j].date;
   if (!Degree[i].field) Degree[i].field = Degree[j].field;
   if (!Degree[i].gpa) Degree[i].gpa = Degree[j].gpa;
   if (!Degree[i].due) Degree[i].due = Degree[j].due;
   InitDegree(j);
Printout("AFTER COMBINE");
   if (i==j-1) current--;
```

}

```c
/* True if the degrees are different but no other information intersects */
int DoubleMajor(i,j)
int i,j;
{
   return (Degree[i].field && Degree[j].field &&
        (!Degree[i].degree || !Degree[j].degree) &&
        (!Degree[i].school || !Degree[j].school) &&
        (!Degree[i].date || !Degree[j].date) &&
        !Degree[i].gpa &&
        !Degree[i].due);
}

/* True if the degrees are different but no other information intersects */
int DoubleDegree(i,j)
int i,j;
{
   return (Degree[i].degree && Degree[j].degree &&
        strcmp(Entity[Degree[i].field].value,
             Entity[Degree[j].field].value) &&
        (!Degree[i].school || !Degree[j].school) &&
        (!Degree[i].date || !Degree[j].date) &&
        (!Degree[i].gpa || !Degree[j].gpa) &&
        (!Degree[i].due || !Degree[j].due) );
} int sharing(i,j)
int i,j;
{
   return(Degree[i].share && Degree[i].share == Degree[j].share);
}

/* Share all slots of frame execept degree. Used for doubledegree */
void ShareButDegree(i)
int i;
{
   int j,school,date,field,gpa,due,share;

school = 0;
   date = 0;
   field = 0;
   gpa = 0;
   due = 0;

share = Degree[i].share;
   for (j=i;j<i+2;j++)
   {
      if (Degree[j].school) school = Degree[j].school;
      if (Degree[j].date) date = Degree[j].date;
      if (Degree[j].field) field = Degree[j].field;
      if (Degree[j].gpa) gpa = Degree[j].gpa;
      if (Degree[j].due) due = Degree[j].due;
   }
   for (j=i;j<i+2;j++)
   {
      if (!Degree[j].school) Degree[j].school = school;
      if (!Degree[j].date) Degree[j].date = date;
      if (!Degree[j].field) Degree[j].field = field;
      if (!Degree[j].gpa) Degree[j].gpa = gpa;
      if (!Degree[j].due) Degree[j].due = due;
      Degree[j].share = 0;
   }
}

/* Share all slots of frame execept degree. Used for doublemajors */
void ShareButMajor(i)
int i;
{
   int j,school,date,degree,gpa,due,share;
```

```
    school = 0;
    date = 0;
    degree = 0;
    gpa = 0;
    due = 0;
    share = Degree[i].share;
    for (j=i;j<i+2;j++)
    {
       if (Degree[j].school) school = Degree[j].school;
       if (Degree[j].date) date = Degree[j].date;
       if (Degree[j].degree) degree = Degree[j].degree;
       if (Degree[j].gpa) gpa = Degree[j].gpa;
       if (Degree[j].due) due = Degree[j].due;
    }
    for (j=i;j<i+2;j++)
    {
       if (!Degree[j].school) Degree[j].school = school;
       if (!Degree[j].date) Degree[j].date = date;
       if (!Degree[j].degree) Degree[j].degree = degree;
       if (!Degree[j].gpa) Degree[j].gpa = gpa;
       if (!Degree[j].due) Degree[j].due = due;
       Degree[j].share = 0;
    }
}

/* Returns true if the degree is the same and no other fields intersect */
/* Opposite of DoubleDegree */
int SingleDegree(i)
int i;
{
    return (!strcmp(Entity[Degree[i].degree].value,
                    Entity[Degree[i+1].degree].value) &&
            (!Degree[i].gpa || !Degree[i+1].gpa) &&
            (!Degree[i].school || !Degree[i+1].school) &&
            (!Degree[i].date || !Degree[i+1].date) &&
            (!Degree[i].due || !Degree[i+1].due) &&
            (!Degree[i].field || !Degree[i+1].field));
}

/* Share all values between frames */
void Share(i)
int i;
{
    int j,degree,school,date,field,gpa,due,share;

degree = 0;
    school = 0;
    date = 0;
    field = 0;
    gpa = 0;
    due = 0;
    if (SingleDegree(i))
       CombineKeyDegree(i+1);
    else
    {
    share = Degree[i].share;
    for (j=i;share == Degree[j].share;j++)
    {
       if (Degree[j].degree) degree = Degree[j].degree;
       if (Degree[j].school) school = Degree[j].school;
       if (Degree[j].date) date = Degree[j].date;
       if (Degree[j].field) field = Degree[j].field;
       if (Degree[j].gpa) gpa = Degree[j].gpa;
       if (Degree[j].due) due = Degree[j].due;
    }
    for (j=i;share == Degree[j].share;j++)
    {
       if (!Degree[j].degree) Degree[j].degree = degree;
       if (!Degree[j].school) Degree[j].school = school;
```

```c
        if (!Degree[j].date) Degree[j].date = date;
        if (!Degree[j].field) Degree[j].field = field;
        if (!Degree[j].gpa) Degree[j].gpa = gpa;
        if (!Degree[j].due) Degree[j].due = due;
        Degree[j].share = 0;
    }
   }
} static char Value[300];

void AddDegree(class,degree)
CLASS *class;
DEGREE *degree;
{
    unsigned short first, last, *previous, num_parts;
    int first_child;

first_child = NumEntityChild;
    strcpy(Value,Entity[degree->degree].value);
    first = Entity[degree->degree].start;
    last = Entity[degree->degree].end;
    if (NumEntityChild >= MAX_ENTITY_CHILD-3)
    {
      if (FirstNumChildErr)
      {
        FirstNumChildErr = FALSE;
        ExtractWarning("Exceeded maximum number of entity children");
      }
      return;
    }
    EntityChild[NumEntityChild++] = degree->degree;
    strcat(Value, ", ");
    if (degree->field)
    {
       strcat(Value, Entity[degree->field].value);
       first = MIN(first,Entity[degree->field].start);
       last = MAX(last,Entity[degree->field].end);
       if (NumEntityChild >= MAX_ENTITY_CHILD-2)
       {
         if (FirstNumChildErr)
         {
           FirstNumChildErr = FALSE;
           ExtractWarning("Exceeded maximum number of entity children");
         }
         goto ERROR;
       }
       EntityChild[NumEntityChild++] = Entity[degree->degree].entity_type;
    }
    strcat(Value, ", ");
    if (degree->school && strcmp(Entity[degree->school].value,"UNKNOWN_SCHOOL"))
    {
       strcat(Value, Entity[degree->school].value);
       first = MIN(first,Entity[degree->school].start);
       last = MAX(last,Entity[degree->school].end);
       if (NumEntityChild >= MAX_ENTITY_CHILD-2)
       {
         if (FirstNumChildErr)
         {
           FirstNumChildErr = FALSE;
           ExtractWarning("Exceeded maximum number of entity children");
         }
         goto ERROR;
       }
       EntityChild[NumEntityChild++] = Entity[degree->degree].entity_type;
    }
    strcat(Value, ", ");
    if (degree->due)
    {
       strcat(Value, Entity[degree->due].value);
       first = MIN(first,Entity[degree->due].start);
```

```
      last = MAX(last,Entity[degree->due].end);
      if (NumEntityChild >= MAX_ENTITY_CHILD-2)
      { if (FirstNumChildErr)
          {
            FirstNumChildErr = FALSE;
            ExtractWarning("Exceeded maximum number of entity children");
          }
          goto ERROR;
       }
       EntityChild[NumEntityChild++] = Entity[degree->degree].entity_type;
    }
    strcat(Value, ", ");
    if (degree->date)
    {
       strcat(Value, Entity[degree->date].value);
       first = MAX(first,Entity[degree->date].start);
       last = MAX(last,Entity[degree->date].end);
       if (NumEntityChild >= MAX_ENTITY_CHILD-2)
       {
          if (FirstNumChildErr)
          {
            FirstNumChildErr = FALSE;
            ExtractWarning("Exceeded maximum number of entity children");
          }
          goto ERROR;
       }
       EntityChild[NumEntityChild++] = Entity[degree->degree].entity_type;
    }
    strcat(Value, ", ");
    if (degree->gpa)
    {
       strcat(Value, Entity[degree->gpa].value);
       first = MAX(first,Entity[degree->gpa].start);
       last = MAX(last,Entity[degree->gpa].end);
       if (NumEntityChild >= MAX_ENTITY_CHILD-2)
       {
          if (FirstNumChildErr)
          {
            FirstNumChildErr = FALSE;
            ExtractWarning("Exceeded maximum number of entity children");
          }
          goto ERROR;
       }
       EntityChild[NumEntityChild++] = Entity[degree->degree].entity_type;
    }
    if (NumEntityChild >= MAX_ENTITY_CHILD-2)
       if (FirstNumChildErr)
       {
         FirstNumChildErr = FALSE;
         ExtractWarning("Exceeded maximum number of entity children");
       }
ERROR:
    EntityChild[NumEntityChild++] = NO_ENTITY;
    if (NumEntityChild>=MAX_ENTITY_CHILD - 1)
    {
       if (FirstNumChildErr)
       {
          ExtractWarning("Exceeded maximum number of entity children");

int i;
   i = curr-1;
   if (Degree[curr].degree)
   {
       while (i >= 0)
```

```
            if (strcmp(Entity[Degree[curr].degree].value,
               Entity[Degree[i].degree].value))
                  i--;
               else break;
         if ((i >= 0) && (!Degree[i].gpa || !Degree[curr].gpa) &&
            (!Degree[i].due    || !Degree[curr].due) &&
            (!Degree[i].school || !Degree[curr].school) &&
            (!Degree[i].field  || !Degree[curr].field) &&
            (!Degree[i].date   || !Degree[curr].date))
            {
               if (!Degree[curr].field)  Degree[curr].field  = Degree[i].field;
               if (!Degree[curr].school) Degree[curr].school = Degree[i].school;
               if (!Degree[curr].date)   Degree[curr].date   = Degree[i].date;
               if (!Degree[curr].gpa)    Degree[curr].gpa    = Degree[i].gpa;
               if (!Degree[curr].due)    Degree[curr].due    = Degree[i].due;
               InitDegree(i);
            }
      }
} void CombineKeyField(curr)
int curr;
{
   int i;
   char message[500];
   i = curr-1;
   if (Degree[curr].field)
   {
      while (i >= 0)
         if (strcmp(Entity[Degree[curr].field].value,
            Entity[Degree[i].field].value))
               i--;
            else break;
Printout("AWHILE FLD");
         if ((i >= 0) && (!Degree[i].gpa || !Degree[curr].gpa) &&
            (!Degree[i].due    || !Degree[curr].due) &&
            (!Degree[i].school || !Degree[curr].school) &&
            (!Degree[i].degree || !Degree[curr].degree) &&
            (!Degree[i].date   || !Degree[curr].date))
            {
               if (!Degree[curr].degree) Degree[curr].degree = Degree[i].degree;
               if (!Degree[curr].school) Degree[curr].school = Degree[i].school;
               if (!Degree[curr].date)   Degree[curr].date   = Degree[i].date;
               if (!Degree[curr].gpa)    Degree[curr].gpa    = Degree[i].gpa;
               if (!Degree[curr].due)    Degree[curr].due    = Degree[i].due;
               InitDegree(i);
            }
   }
} void CombineKeySchool(curr)

int curr;
{
   int i;
   i = curr-1;
   if (Degree[curr].school)
   {
      while (i >= 0)
         if (strcmp(Entity[Degree[curr].school].value,
            Entity[Degree[i].school].value))
               i--;
            else break;
         if ((i >= 0) && (!Degree[i].gpa || !Degree[curr].gpa) &&
            (!Degree[i].due    || !Degree[curr].due) &&
            (!Degree[i].field  || !Degree[curr].field) &&
            (!Degree[i].degree || !Degree[curr].degree) &&
            (!Degree[i].date   || !Degree[curr].date))
```

```
            {
               if (!Degree[curr].degree) Degree[curr].degree = Degree[i].degree;
               if (!Degree[curr].field) Degree[curr].field = Degree[i].field;
               if (!Degree[curr].date) Degree[curr].date = Degree[i].date;
               if (!Degree[curr].gpa) Degree[curr].gpa = Degree[i].gpa;
               if (!Degree[curr].due) Degree[curr].due = Degree[i].due;
               InitDegree(i);
            }
      }
} static char message[500];
void Educate(class)
CLASS *class;
{
    int eol,gpa,due,date,field,school,degree,entity_type,sharecode;
    int num_phrase,j,first,phrase,entity,entities,repeat;
    current = 0;
    first = 0;
    sharecode = 0;
    InitDegrees();
    degree = PhrasePair[Phrase[class->first_phrase].first_pair].entity_type;

field = PhrasePair[Phrase[class->first_phrase+1].first_pair].entity_type;
    school = PhrasePair[Phrase[class->first_phrase+2].first_pair].entity_type;
    due = PhrasePair[Phrase[class->first_phrase+3].first_pair].entity_type;
    date = PhrasePair[Phrase[class->first_phrase+4].first_pair].entity_type;
    gpa = PhrasePair[Phrase[class->first_phrase+5].first_pair].entity_type;
    eol = PhrasePair[Phrase[class->first_phrase+6].first_pair].entity_type;

entities=EntityPtr[class->entity_type];
    EntityPtr[class->entity_type] = NO_ENTITY;
    for(entity = entities;entity != NO_ENTITY;
        entity = Entity[entity].next)
    {
        first = entity;
        while ((entity_type = PhrasePair[Entity[entity].phrase].entity_type)
            != eol)
        {
          if (entity_type == gpa)

{
             if (Degree[current].gpa)
             {
                if ((Degree[current].gpa == first) &&
                    PlaceLastGPA(first,current-1))
                    Degree[current].gpa = entity;
             }
             else Degree[current].gpa = entity;
          }
          else if (entity_type == degree)
          {
             if (!Degree[current].degree)
                Degree[current].degree = entity;
             else
             {
Printout("BEFOREDOUBLE Degree");
                if (Degree[current].share)
                    Degree[current+1].share = Degree[current].share;
                else
                {
                    Degree[current].share = ++sharecode;
                    Degree[current+1].share = sharecode;
                }
                current++;
                if (current >= MAX_DEGREES-2) break;
                Copy (current);
                Degree[current].degree = entity;
```

```
 Mess(ExtractRecover, "Sharing Degree DOUBLEDEGREE");
Printout("AFTERDOUBLE Degree");
           }
         }
         else if (entity_type == field)
         {
            if (!Degree[current].field)
               Degree[current].field = entity;
            else if (strcmp(Entity[Degree[current].field].value,
                           Entity[entity].value))
            {
Printout("BEFOREDOUBLE Field");
               if (Degree[current].share)
                  Degree[current+1].share = Degree[current].share;
               else
               {
                  Degree[current].share = ++sharecode;
                  Degree[current+1].share = sharecode;
               }
               current++;
               if (current >= MAX_DEGREES-2) break;
               Copy (current);
               Degree[current].field = entity;
 Mess(ExtractRecover, "Sharing Field DOUBLEMAJOR");
Printout("AFTERDOUBLE Field");
           }
         }
         else if (entity_type == school)
         { if ((Degree[current].school) &&
                (Degree[current].school == first))
                  PlaceLastSchool(first,current-1);
            Degree[current].school = entity;
         }
         else if (entity_type == due)
            Degree[current].due = entity;
         else if (entity_type == date)
         {
            if (Degree[current].date)
            {
               if (Degree[current].date == first)
               {
                  if (PlaceLastDate(first,current-1))
                     Degree[current].date = entity;
               }
            }
            else Degree[current].date = entity;
         }
 sprintf(message, "WORD is %s type is %d",
      Entity[entity].value,
      PhrasePair[Entity[entity].phrase].entity_type);
 Mess(ExtractRecover, message);
 Printout("AFTERWORD");
         entity = Entity[entity].next;
         if (entity == NO_ENTITY)
            break;
      }
/* check for intersection of university, date or degree   */
/* combine last date, first gpa                           */
      if (exists(&Degree[current]))
      {
sprintf(message,"agree is %d current is %d",
    Agree(current),current);
Mess(ExtractRecover, message);
Printout("BEFOREAGREE");
         if ((current > 0) && Agree(current))
            Combine(current);
         current++;
```

```
            if (current >= MAX_DEGREES-2) break;
Printout("AFTERAGREE");
        }
    }
/* try to combine frames */
Printout("BEFORE SHARE");
    j=1;
    while (j<=current)
    {
        if (sharing(j-1,j)) Share(j-1);
        j++;
    }
Printout("AFTER SHARE bDOUBLE");
/*  j=1;
    while (j<=current)
    {
        if (DoubleMajor(j-1,j))

ShareButMajor(j-1);
        j++;
    }
Printout("AFTER SHARE MAJOR"); */
    j=1;
    while (j<=current)
    {
        if (DoubleDegree(j-1,j))
            ShareButDegree(j-1);
        j++;
    }
Printout("DBL bComb deg");
    j=1;
    while (j <= current)
    {
            CombineKeySchool(j);
Printout("DBL BComb FLD");
            CombineKeyField(j);
Printout("DBL AFTER FLD");
            CombineKeyDegree(j);
            j++;
    }
Printout("DBL aComb deg");
    j=0;
    while (j <= current)
    {
        if (Degree[j].degree)
           AddDegree(class,&Degree[j]);
        j++;
    }
}

CheckJob( phrase_entity, entity, first_found)
int phrase_entity[], entity, first_found;
{
    /* Make sure they are approx. contiguous */
    /* Clear out company address if found */
    int i, j, k, m, last_end, num_found, proximity;
#define NUM_PHRASE 4
#define   DATE_RANGE 0
#define   JOB_TITLE  1
#define   COMPANY    2
#define   CO_ADDRESS 3
    static int SIZE[NUM_PHRASE]= { 8, 4, 4, 10};

num_found= 0;
    for( j=first_found; j!=entity; j= Entity[j].next)
        num_found++;
```

```
last_end= Entity[first_found].end;
for( j=Entity[first_found].next; j!=entity; j= Entity[j].next)
{
   for(i=0; i<NUM_PHRASE; i++)
       if (phrase_entity[i]==j) break;
   if (i<NUM_PHRASE)

{
         proximity= (i!=COMPANY && num_found==2) ? 14 : 4;
         if (last_end+proximity<Entity[j].start)
         {
            if (i!=DATE_RANGE)
            {
               phrase_entity[i]= NO_ENTITY;
               last_end+= SIZE[i];
            }
            else
            {
               for(k= first_found; k!=j; k= Entity[k].next)
               {
                  for(m=0; m<NUM_PHRASE; m++)
                     if (phrase_entity[m]==k) break;
                  if (m<NUM_PHRASE) phrase_entity[m]= NO_ENTITY;
               }
               last_end= Entity[j].end;
            }
         }
         else
            last_end= Entity[j].end;
         if (i==CO_ADDRESS) phrase_entity[i]= NO_ENTITY;
      }
   }
} int atoi(s)
char s[];
{
  int i, n;
  n=0;
  for (i=0;s[i]>= '0' && s[i] <= '9'; ++i)
    n=10*n+s[i] - '0';
  return(n);
}

/* Preserves all answers if there are at least two */
Threshhold(class)
CLASS *class;
{
   int entity, child, count;

count = 0;
/* for each occurence of any entity in this class */
   for(entity = EntityPtr[class->entity_type];
      entity != NO_ENTITY;
      entity = Entity[entity].next)
   {
     for (child = Entity[entity].children;
       EntityChild[child] != NO_ENTITY; child++)
     {
       count += atoi(Entity[EntityChild[child]].value);
     }
   }
   if (count < MIN_THRESH)

EntityPtr[class->entity_type] = NO_ENTITY;
   else
```

```
   {
      Entity[EntityPtr[class->entity_type]].next = NO_ENTITY;
   }
}

/* Preserves all answers if there are at least two */
Threshhold2(class)
CLASS *class;
{
   int entity, count;

count = 0;
/* for each occurence of any entity in this class */
   for(entity = EntityPtr[class->entity_type]; entity != NO_ENTITY;
                  entity = Entity[entity].next)
      count++;
   if (count < 2)
      EntityPtr[class->entity_type] = NO_ENTITY;
}

/* returns the entity type of the matched synonym given
   the entity type of the class containing the synonym */
int FindSyn(entity)
int entity;
{
 int fp;
 if (Entity[entity].entity_type < FIRST_CLASS)
 {
    fprintf(stderr, "Error in FindSyn: %s is a word, not a synonym\n",
        Entity[entity].value);
    return(0);
 }
 else
 {
  for(fp=ClassList[PhrasePair[Phrase[ClassList[Entity[entity].entity_type
        -FIRST_CLASS].first_phrase].first_pair].entity_type-FIRST_CLASS
        ].first_phrase;
      strcmp(
        ClassList[PhrasePair[Phrase[fp].first_pair
           ].entity_type-FIRST_CLASS].name,
        Entity[entity].value);
      fp++);
  return(PhrasePair[Phrase[fp].first_pair].entity_type);
 }
} static int used[MIN_THRESH+1];

int check_repeats(entity,i)
int entity,*i;
{
  int j;

for(j=0;j<*i && j < MIN_THRESH;j++)

if (used[j]==entity) return(1);
  used[j] = entity;
  (*i)++;
  return(0);
} void TotalSkillBuzz(class)
CLASS *class;
{
   int entity, count, repeats;
   WLIST *np,*Wlookup();

count = 0;
   repeats = 0;
```

```
/* for each occurence of any entity in this class */
   for(entity = EntityPtr[class->entity_type]; entity != NO_ENTITY;
                 entity = Entity[entity].next)
   {
      np = Wlookup(FindSyn(entity));
      if (!np)
      {
        fprintf(stderr,
          "Error in TotalSkillBuzz: %s not in buzzword structure\n\n",
          ClassList[FindSyn(entity)-FIRST_CLASS].name);
        count += STANDARD_VALUE;
      }
      else if (np->Value < STANDARD_VALUE)
      {
        if (!check_repeats(np->entity_type,&repeats))
          count += np->Value;
      }
      else count += np->Value;
   }
   Entity[EntityPtr[class->entity_type]].next = NO_ENTITY;
   Entity[EntityPtr[class->entity_type]].value=itoa(count);
}

SumMAX(class)
CLASS *class;
{
   int entity, count;

count = 0;
   for(entity = EntityPtr[class->entity_type]; entity != NO_ENTITY;
                 entity = Entity[entity].next)
     count += MIN_THRESH;
   if (count)
   {
     Entity[EntityPtr[class->entity_type]].end += 2;
     Entity[EntityPtr[class->entity_type]].next = NO_ENTITY;
     Entity[EntityPtr[class->entity_type]].value=itoa(count);
   }
   else EntityPtr[class->entity_type] = NO_ENTITY;
}

Sum(class)

CLASS *class;
{
   int entity, count;

count = 0;
   for(entity = EntityPtr[class->entity_type]; entity != NO_ENTITY;
                 entity = Entity[entity].next)
     count += STANDARD_VALUE;
   Entity[EntityPtr[class->entity_type]].next = NO_ENTITY;
   Entity[EntityPtr[class->entity_type]].value=itoa(count);
   Entity[EntityPtr[class->entity_type]].end++;
}

ThreshPointSum(class)
CLASS *class;
{
   int entity, count;
   WLIST *np,*Wlookup();

count = 0;
   for(entity = EntityPtr[class->entity_type]; entity != NO_ENTITY;
                 entity = Entity[entity].next)
   {
        count += atoi(Entity[entity].value);
```

```
   }
   if (count < MIN_THRESH)
      EntityPtr[class->entity_type] = NO_ENTITY;
   else
   {
     Entity[EntityPtr[class->entity_type]].next = NO_ENTITY;
     Entity[EntityPtr[class->entity_type]].value=itoa(count);
   }
}

PointSum(class)
CLASS *class;
{
   int entity, count;
   WLIST *np,*Wlookup();

count = 0;
   for(entity = EntityPtr[class->entity_type]; entity != NO_ENTITY;
                 entity = Entity[entity].next)
        count += atoi(Entity[entity].value);
   if (count)
   {
     Entity[EntityPtr[class->entity_type]].next = NO_ENTITY;
     Entity[EntityPtr[class->entity_type]].value=itoa(count);
   }
   else EntityPtr[class->entity_type] = NO_ENTITY;
}

Zero (class)
CLASS *class;
{
  EntityPtr[class->entity_type] = NO_ENTITY;

}

AtLeastSTANDARD(class)
CLASS *class;
{
   int entity, count;
   WLIST *np,*Wlookup();

count = 0;
   for(entity = EntityPtr[class->entity_type]; entity != NO_ENTITY;
                 entity = Entity[entity].next)
   {
       np = Wlookup(FindSyn(entity));
       if (!np)
       {
         fprintf(stderr,
            "Error in AtLeastSTANDARD: %s not in buzzword structure\n\n",
            ClassList[FindSyn(entity)-FIRST_CLASS].name);
         count += 2;
       }
       else
          count += np->Value;
   }
   if (count < STANDARD_VALUE)
       EntityPtr[class->entity_type] = NO_ENTITY;
   else Entity[EntityPtr[class->entity_type]].next = NO_ENTITY;
}

AtLeast2(class)
CLASS *class;
{
   int entity, count;

count = 0;
/* for each occurence of any entity in this class */
   for(entity = EntityPtr[class->entity_type]; entity != NO_ENTITY;
                 entity = Entity[entity].next)
```

```
            count++;
       if (count < 2)
           EntityPtr[class->entity_type] = NO_ENTITY;
       else Entity[EntityPtr[class->entity_type]].next = NO_ENTITY;
}

AtLeast4(class)
CLASS *class;
{
    int entity, count;

count = 0;
/* for each occurence of any entity in this class */
    for(entity = EntityPtr[class->entity_type]; entity != NO_ENTITY;
                    entity = Entity[entity].next)
            count++;
       if (count < 4)
           EntityPtr[class->entity_type] = NO_ENTITY;
       else Entity[EntityPtr[class->entity_type]].next = NO_ENTITY;

} int Different(entity,count,types)
int entity,count,*types;
{
        int i;
        for (i = 0; i<count;i++)
           if (types[i] == Entity[entity].phrase)
                  return(0);
        return(1);
}

AtLeast3Diff(class)
CLASS *class;
{
    int entity, count;
    int types[4];
    count = 0;

/* for each occurence of a unique in this class */
    for(entity = EntityPtr[class->entity_type]; entity != NO_ENTITY;
                    entity = Entity[entity].next)
    {
       if (!count)
       {
         types[count] = Entity[entity].phrase;
         count++;
       }
       else if (count == 3) break;
       else if (Different(entity,count,types))
       {
         types[count] = Entity[entity].phrase;
         count++;
       }
    }
    if (count < 3)
        EntityPtr[class->entity_type] = NO_ENTITY;
    else Entity[EntityPtr[class->entity_type]].next = NO_ENTITY;
}

Days(class)
CLASS *class;
{
    int entity, day;
    unsigned short *previous;

/* for each occurence of any entity in this class */
    for(previous = &EntityPtr[class->entity_type], entity = EntityPtr[class->entity_
         entity != NO_ENTITY; entity = Entity[entity].next)
```

```
    {
        sscanf( Entity[entity].value, "%d", &day);
/* if it is not within the range of a day, get rid of it */
        if ((day < 1) || (day > 31))
            *previous = Entity[entity].next;
        else
            previous = &Entity[entity].next;

}
}

Years(class)
CLASS *class;
{
    int last, entity, year;
    static int Year= -1, Year2= 88;
define GOOD_YEAR_SPAN 40 if (Year==-1) {
        long c;
        struct tm *date;

c= time((time_t *) NULL);
        date= localtime(&c);
        Year= 1900+date->tm_year+2;
        Year2= date->tm_year+2;
    }
/* for each occurence of any entity in this class */
    for(last=NO_ENTITY, entity = EntityPtr[class->entity_type];
        entity != NO_ENTITY; entity = Entity[entity].next)
    {
        sscanf( Entity[entity].value, "%d", &year);
        if (year<100 &&
            ( (year<=Year2) ? (year+GOOD_YEAR_SPAN>=Year2) :
                (year>=Year2+(100-GOOD_YEAR_SPAN)) ))
        {
            last= entity;
        }
        else if (year>=100 && year<=Year && Year<=year+GOOD_YEAR_SPAN)
        {
            Entity[entity].value+= 2;
            last= entity;
        }
        else
        {
            if (last==NO_ENTITY)
            {
                EntityPtr[ class->entity_type] = Entity[entity].next;
            }
            else
            {
                Entity[last].next= Entity[entity].next;
            }
        }
    }
}

AddNewBest(class, num_phrase, phrase_entity, warning)
CLASS *class;
int num_phrase;
int phrase_entity[];
BOOLEAN warning;
{
    int j, first_child;

unsigned short first, last;
```

```
/* create an occurence of this class containing all of the found info */
   Value[0] = '\0';
   first_child = -1;
   for(j = 0; j < num_phrase; j++)
   {
      if (j!=0)
      {
        strcat(Value, ", ");
      }
      if (phrase_entity[j] != NO_ENTITY)
      {
         strcat(Value, Entity[phrase_entity[j]].value);
         if (first_child == -1)
         {
            first_child = NumEntityChild;
            first = Entity[phrase_entity[j]].start;
            last = Entity[phrase_entity[j]].end;
         }
         else
         {
            first = MAX( first, Entity[phrase_entity[j]].start);
            last = MAX( last, Entity[phrase_entity[j]].end);
         }
         if (NumEntityChild>=MAX_ENTITY_CHILD - 1)
         {
            if (FirstNumChildErr)
            {
              ExtractWarning("Exceeded maximum number of entity children");
              FirstNumChildErr = FALSE;
            }
            break;
         }
         EntityChild[NumEntityChild++] = phrase_entity[j];
      }
   }
   if (NumEntityChild>=MAX_ENTITY_CHILD)
   {
     if (FirstNumChildErr)
     {
       ExtractWarning("Exceeded maximum number of entity children");
       FirstNumChildErr = FALSE;
     }
     return;
   }
   EntityChild[NumEntityChild++] = NO_ENTITY;
   AddEntity(class->entity_type, NO_PHRASE, StrSave(Value),
       first, last, first_child, warning);
}

FirstFit(class)
CLASS *class;
{
   int entity, last;
   unsigned short phrase;

/* find the first phrase (pair) which has an instance */
   phrase= Phrase[class->first_phrase+class->num_phrases- 1].first_pair;
   for(entity = EntityPtr[class->entity_type]; entity != NO_ENTITY;
            entity = Entity[entity].next)
   {
      if (Entity[entity].phrase<phrase)
      {
         phrase= Entity[entity].phrase;
      }
   }

/* delete each instance of later phrases in this class */
   last= NO_ENTITY;
```

```
    for(entity = EntityPtr[class->entity_type]; entity != NO_ENTITY;
            entity = Entity[entity].next)
    {
       if (Entity[entity].phrase>phrase)
       {
          if (last!= NO_ENTITY)
             Entity[last].next= Entity[entity].next;
          else
             EntityPtr[class->entity_type]= Entity[entity].next;
       }
       else
          last= entity;
    }
}

FirstOccurrence(class)
CLASS *class;
{
    int entity, good;
    int start, end;

good = NO_ENTITY;
    start = INFINITY;
    end = INFINITY;
    for(entity = EntityPtr[class->entity_type]; entity != NO_ENTITY;
            entity = Entity[entity].next)
    {
       if ((Entity[entity].start < start) ||
           ((Entity[entity].start == start) && (Entity[entity].end < end)))
       {
          good = entity;
          start = Entity[entity].start;
          end = Entity[entity].end;
       }
    }

EntityPtr[class->entity_type] = good;
    Entity[good].next = NO_ENTITY;
}

/*--------------------------------------------------------------------
 * template.h
 *------------------------------------------------------------------*/ define MAX_TEMPLATE 20
define MAX_SLOTS 5
define MAX_INSTANCES 100 define MAX_DATA_FIELDS 500 define STRING_TYPE 3
define INTEGER_TYPE 2
define DATE_TYPE 1 typedef struct _slot_instance
{
    unsigned short entity[MAX_SLOTS];
}SLOT_INSTANCE;

typedef struct _slot
{
    char *name;
    ENTITY_TYPE entity_type;
    ENTITY_TYPE parent_type;
}SLOT;

typedef struct _template
{
    char *name;
```

```
    ENTITY_TYPE entity_type;
    int num_slots;
    int current_slot;
    int num_instances;
    int current_instance;
    SLOT slot[MAX_SLOTS];
    SLOT_INSTANCE instance[MAX_INSTANCES];
}TEMPLATE;

typedef struct _data_field
{
    char title[16];
    char value[64];
    BOOLEAN warning;
}DATA_FIELD;

extern DATA_FIELD *Person;
extern int NumPerson;

extern int NumTemplate;
extern FillTemplates();
extern ReadTemplates();
extern PutEntityInTemplate();
extern TEMPLATE *Template;

/*-----------------------------------------------------------------
 * prescan.h
 *-----------------------------------------------------------------*/ define DOCUMENT_END     MAX_ENTITY_TYPE-1
define DOCUMENT_BEGIN   MAX_ENTITY_TYPE-2
#define NUMBER_ENTITY    MAX_ENTITY_TYPE-3
#define NUMBER1_ENTITY   MAX_ENTITY_TYPE-4
#define NUMBER2_ENTITY   MAX_ENTITY_TYPE-5
#define NUMBER3_ENTITY   MAX_ENTITY_TYPE-6
#define NUMBER4_ENTITY   MAX_ENTITY_TYPE-7
#define NUMBER5_ENTITY   MAX_ENTITY_TYPE-8
#define LINE_END         '\n'
define FIRST_SPECIAL_CLASS NUMBER5_ENTITY define NO_MORE    0xffff
define NO_ENTITY  0       /* this value MUST be 0 */
#define NULL_ENTITY -1
define NO_PHRASE  0xffff typedef struct _entity
{
    char            *value;
    unsigned short  children;
    ENTITY_TYPE     entity_type;
    unsigned short  next;
    unsigned short  start, end;
    unsigned short  phrase;
    BOOLEAN         warning;
}ENTITY;

typedef struct _location
{
    unsigned short  start, end;
}LOCATION;

extern LOCATION *WordLoc;
extern int NumLoc;
extern char *DocPoint;
extern ENTITY *Entity;
extern ENTITY_TYPE *EntityPtr;
extern int NumEntity;
extern unsigned short *EntityChild;
extern int NumEntityChild;
```

```c
extern unsigned char PhraseMap[];
extern unsigned char DocumentMap[];
extern unsigned char NumMap[];
extern unsigned char AlphaMap[];
extern unsigned char UpperMap[];
extern unsigned char LowerMap[];
extern unsigned char OutsideMap[];
extern unsigned char InsideMap[];
extern char *Ascii[];
```

Mar 30 20:23 1989  EXTRACT/includes.h Page 1

```c
#include "../defines.h"
#include "defines.h"
#include "utils.h"
#include "extract.h"
#include "class.h"
#include "prescan.h"
#include "dict.h"
#include "maps.h"
#include "template.h"

/*------------------------------------------------------------------
 * extract.h
 *----------------------------------------------------------------*/
include <setjmp.h> extern unsigned char *Message;
extern PHRASE *Phrase;
extern int NumPhrase;
extern PHRASE_PAIR *PhrasePair;
extern int NumPair;
extern jmp_buf ExtractRecover;

#define MAX_MATCHES 4

/*------------------------------------------------------------------
 * dict.h
 *----------------------------------------------------------------*/ define END_TYPE 0 define NO_WORD -1
define INFINITY 0x7fffffff
#define SHORT_INFINITY 0x7fff
define ENTITY_HOLDER_SIZE 32 typedef struct _word_index
{
   int word;
   ENTITY_TYPE entity_type;
   BOOLEAN star;
   char error_count;
   short next_word;
}WORD_INDEX;

typedef struct _searcher
{
   unsigned short entity;
   unsigned short next;
   unsigned short previous;
}SEARCHER;
```

```c
extern int PutInDictionary();
extern InitDictionary();

extern long WordHashTable[];
extern char *WordList;
extern WORD_INDEX *WordIndex;
extern unsigned short *StarWord;
extern unsigned short *SpellWord;
extern int NumWords;
extern int NumWordChars;
extern int NumStarWords;
extern int NumSpellWords;
extern char Value[];

#define MIN_THRESH 12
#define STANDARD_VALUE 2
#define MAX_CATEGORIES 5
#define MAX_SUBCAT 10
#define SUBCAT_FACTOR 1
define CAT_FACTOR 1 typedef struct wlist {
  int entity_type;
  unsigned short number;
  unsigned short categories[MAX_CATEGORIES];
  int Value;
  struct wlist *next;
} WLIST;

int ObjectiveEntity,CategoryEntity,PointsEntity;

/*-----------------------------------------------------------------
 * defines.h
 *-----------------------------------------------------------------*/ typedef unsigned short ENTITY_TYPE;

/* resume related sizes */
#define MAX_MESSAGE         25000
#define MAX_ENTITY          20000
#define MAX_ENTITY_CHILD    50000
/* Need to fix memory allocation failures (in StrSave)
   xxxxxxxxxxxxxxxxxxxxx XXXXXXXXXXXXXXXXXXXXXXXxxx */
#define MAX_MEMORY          100000
#define MAX_RES_WORDS       5000

/* class definition related sizes */
#define MAX_CLASS           5000
#define MAX_CLASS_MEMORY    45000
#define MAX_PHRASE          10000
#define MAX_PHRASE_PAIR     19000
#define MAX_WORDS           3500
#define MAX_WORD_CHARS      35000
#define MAX_STAR_WORDS      300
#define MAX_SPELL_WORDS     300
#define FIRST_WORD          128
#define FIRST_CLASS         (FIRST_WORD + MAX_WORDS)
#define MAX_ENTITY_TYPE     (FIRST_CLASS + MAX_CLASS)

typedef struct _phrase_pair
{
   ENTITY_TYPE entity_type;
   unsigned short operator;
}PHRASE_PAIR;
```

```c
typedef struct _phrase
{
   unsigned short num_pairs;
   unsigned short first_pair;
}PHRASE;

typedef struct _class
{
   char *name;
   unsigned short num_phrases;
   unsigned short first_phrase;
   ENTITY_TYPE entity_type;
   int (*action)();
   char *action_name;
   unsigned short class_syn;
}CLASS;
```

```
/*------------------------------------------------------------------
 * class.h
 *----------------------------------------------------------------*/
```

```c
#define NO_TYPE        0
define NO_CLASS       MAX_ENTITY_TYPE+1 define CLASS_CHAR      '/'
define SYNONYM_CHAR    '='
#define OPERATOR_CHAR   '['
#define LITERAL_CHAR    '"'
#define ESCAPE_CHAR     '^'
#define ERROR_CHAR      '!'
define STAR_CHAR       '~' define NUMBER_MASK         0x3f
define SIGN_BIT            0x20
#define NO_OPERATOR         1
#define MERGE_OPERATOR      0x40
#define CONTAINS_OPERATOR   0x80
#define STOP_OPERATOR       0x100
#define FIRST_OPERATOR      0x200
#define WITHIN_OPERATOR     0x400
#define BEFORE_OPERATOR     0x800
#define REMEMBER_OPERATOR   0x1000
#define OPTIONAL_OPERATOR   0x2000
#define IGNORE_OPERATOR     0x4000
define NOT_OPERATOR        0x8000 define UNKNOWN         0
define DEF_CLASS       1
#define DEF_SYNONYM     2
#define PHRASE_LINE     3
#define INCLUDE_LINE    4
#define COMMENT         5
#define USES_LINE       6
#define DEF_TEMPLATE    7
#define TEMPLATE_LINE   8
define DEF_ACTION      9 define TYPE_CLASS 0x01
define TYPE_SYNONYM 0x02 define END_TYPE 0 define SYMTAB_SIZE         50
define LOCAL_SYMTAB_SIZE   40
define DEF_FILE_NAME_SIZE  50 typedef struct {
   char def_file_name[DEF_FILE_NAME_SIZE];
   int  first_symbol, num_symbols;
} Symbol;
```

```c
extern Symbol GlobalSymbolTable[SYMTAB_SIZE];
extern int LocalSymbolTable[LOCAL_SYMTAB_SIZE];

extern CLASS *ClassList;
extern int NumClass;

typedef struct {
    char *name;
    int (*func)();
} ActionRecord;
extern ActionRecord ActionRoutines[];

long
FindWord(word_hash, word)
long word_hash;
char *word;
{
    register long list;

for(list = WordHash[word_hash];
        (list != NO_WORD) && (!StrEqu(word, &WordList[WordIndex[list].word]);
        list = WordIndex[list].next);
    return(list);
} long
GetRoot(word)
char *word;
{
    char *word_end;
    register char *sptr, *wptr;
    long list;
    char original[250];
    long rule;
    char wild_card;

if ((list = FindWord(HashWord(word), word)) != NO_WORD) return(list);

strcpy(original, word);
    word_end = word + (strlen(word) - 1);

for(rule = 0; rule < NumRules; rule++)
    {
        wild_card = 0;
        wptr = word_end;
        sptr = &RuleTable[Suffix[rule].minus];
        while(*sptr != '\0')
        {
            if (*sptr == '*')
            {
                if (wild_card == 0)
                    wild_card = *wptr;
                else
                    if (*wptr != wild_card) break;
            }
            else
                if (*wptr != *sptr) break;
            wptr--;
            sptr++;
        }
        if (*sptr == '\0')
        {
            for(wptr++, sptr = &RuleTable[Suffix[rule].plus];
                *sptr != '\0'; wptr++, sptr++)
```

```
{
    if (*sptr == '*')
        *wptr = wild_card;
    else
                *wptr = *sptr;
        }
        *wptr = '\0';
        if ((list = FindWord(HashWord(word), word)) != NO_WORD) return(list);
        strcpy(word, original);
    }
  }
  return(NO_WORD);
}
```

APPENDIX 2

Code (Sample) for the Knowledge Base

```
#uses states.def
#uses dates.def
#uses sections.def
#uses header.def
#uses experience.def
#uses category.def
#uses years.def
uses educate.def TEMPLATE        APPLICANT_NAME
SLOT  Applicant        APPLICANT TEMPLATE        APP_ADDRESS
SLOT  Address_type     ADDRESS_TYPE
SLOT  Address          ADDRESS
SLOT  City             CITY
SLOT  State            STATE
SLOT  Zip              ZIP_CODE TEMPLATE        HOME_PHONE
SLOT  Home_Phone       PHONE_NUMBER TEMPLATE        BUSINESS_PHONE
SLOT  Work_Phone       PHONE_NUMBER TEMPLATE        MESSAGE_PHONE
SLOT  Message_Phone    PHONE_NUMBER TEMPLATE        EDUCATION
SLOT  Degree           DEGREE_YEAR TEMPLATE        YEARS
SLOT  Dates            POS_TITLE TEMPLATE        ROOT2
SLOT  Exp_Category     Category TEMPLATE        ROOT
SLOT  Experience       Experience ; category.def
; Copyright 1989, Resumix, Inc.
;
#uses sections.def
#uses objective.def
#uses experience.def
#uses titles.def
uses S_Legal.def SYN     Legal
ACTION  Threshhold
        /(Titles_Legal)
        /(Skills_Legal)
        /(Other_Legal)

CLASS   Points_Legal
ACTION  ThreshPointSum
        /(Titles_Legal)
        /(Skills_Legal)
        /(Other_Legal)
```

```
CLASS    Points_C_Administ
         /(Points_Legal)

CLASS    Administrative
ACTION   CheckSubcat
         =(Legal)

CLASS    Points
         /(Points_C_Administ)

CLASS    Category
ACTION   CheckCategory
         /(Administrative)

CLASS    Objective
         /(Object_C_Administ)

CLASS    ROOT
         /Experience [N W I] =OBJECTIVE_SECTION

CLASS    ROOT2
         /Category uses sections.def
uses dates.def
#uses header.def
#uses states.def
#uses guess.def
#uses titles.def
uses system.def SYN      EXP_FULL_LINE
         [I] =STOPPER [* B F I] /EOL [W I] =EXPERIENCE_SECTION SYN      BLANK_EXP_LINE
         =LINE [W I] =EXPERIENCE_SECTION [N C I] =EXP_FULL_LINE CLASS    POS_EXP_DATES
         [I] =STOPPER [1] /DATE [N W I] /DATE_RANGE $
   [W I] =EXPERIENCE_SECTION
         =Present [N W I] /DATE_RANGE [W I] =EXPERIENCE_SECTION CLASS    EXP_DATES
         /DATE_RANGE [W I] =EXPERIENCE_SECTION
         /SEASON_YEAR [N W I] /DATE_RANGE [W I] =EXPERIENCE_SECTION
   ;     [I] /BLOCK_MARK [1] /POS_EXP_DATES [W I] =EXPERIENCE_SECTION CLASS    GROUP
         group
         section
         department CLASS    LEADER
         leader
         head
         manager SYN      DB
         data base
         database
         db SYN      DATE_BLOCK
         /EXP_DATES [* B F I] /EXP_DATES
         /EXP_DATES [N B] /EXP_DATES [* B F I] =ANY_HEADER SYN      NONBLANK_LINE
         [I] /EOL [* B F I] /EOL [W I] =EXPERIENCE_SECTION
```

```
SYN     BLANK_LINE
        =LINE [N C I] =NONBLANK_LINE [W I] =EXPERIENCE_SECTION

CLASS   POS_TITLE
ACTION  ExtractJob
        /POS_EXP_DATES [N W I] /EXP_DATES
        /EXP_DATES
        /Any_Company [W I] =EXPERIENCE_SECTION
        /All_Titles [W I] =EXPERIENCE_SECTION
        =STOPPER [N W I] =BLANK_LINE [W I] =EXPERIENCE_SECTION =BLANK_LINE [W I] =EXPERIENCE_SECTION
        /BLOCK_MARK [W I] =EXPERIENCE_SECTION

CLASS   YEARS
        /POS_TITLE uses system.def
uses sections.def
uses dates.def
#uses degrees.def

SYN     Engineering_field
        Engineering!2
        Eng
        engg

SYN     Electrical
        electrical
        electronic
        electronics
        Elect SYN     EE
        MSEE
        BSEE
        BSEET
        EE
        E.E
        =Electrical =Engineering_field SYN     Compu Eng
        computer [N 1] science =Engineering_field SYN     Aero
        aero
        aeronautical
        aerospace
        astronautical SYN     Aero Eng
        AE
        A.E
        =Aero =Engineering_field SYN     Info&Comp_Science
        Information [2] computer [1] science
        Computer [1] Information SYN     ICS
        ics
        i [1] c [1] s
```

```
SYN     Computer_Science
        computer [1] science [N W I] =Info&Comp_Science

SYN     CS2
        MSCS
        BSCS
        CS
        C.S

SYN     CS
        =CS2 [N W I] =ICS
        =ICS
        =Computer_Science
        =Info&Comp_Science SYN     Mech Eng
        ME
        M.E
        mechanical!2 =Engineering_field SYN     Business
        Business
        Commerce SYN     Math
        math
        mathematics SYN     Ind Eng
        industrial!2 =Engineering_field
        industrial technology SYN     Sys Eng
        systems =Engineering_field SYN     Chemistry
        chemistry SYN     Chem Eng
        chemical =Engineering_field SYN     Civil Eng
        civil =Engineering_field CLASS   ENG_FIELD
        =EE
        =(Mech Eng)
        =(Aero Eng)
        =(Civil Eng)
        =(Ind Eng)
        =(Compu Eng)
        =(Sys Eng)
        =(Chem Eng)

SYN     Engineer
        [N] =CS [0] =Engineering_field [N W I] /ENG_FIELD $
   [N 1] drafting SYN     Mgmt
        management
        mgmt SYN     Psych
        Psychology
```

```
SYN     S.S.Phy
        solid state physics

SYN     Physics
        physics [N W I] =(S.S.Phy)

SYN     Bioeng
        bioengineering

SYN     Cybernet
        cybernetic
        cybernetics

SYN     AI
        AI
        artificial intelligence

SYN     Data Pro
        data processing

SYN     Avionics
        avionics

SYN     MIS
        MIS
        management information systems

SYN     Oper Res
        Operations Research

SYN     Astrophys
        astrophysics

SYN     Drafting
        drafting

SYN     Ind Relations
        industrial relations

SYN     HR
        HR
        human resources
        =(Ind Relations)

SYN     Psychology
        psychology

SYN     Education
        education [N W I] =EDUCATION_HEADER

SYN     sciences
        science
        sciences

SYN     Social Sc
        social =sciences

SYN     Anthro
        anthropology

SYN     Behav Sc
        behavioral =sciences
```

SYN     Phys Edu
        physical education

SYN     Political Science
        political =sciences

SYN     Linguist
        linguistics
        neurolinguistics

SYN     Philo
        philosophy

SYN     Music
        music

SYN     Pub Admin
        =MPA
        public administration [N W I] =MPA

SYN     Acct
        accounting

SYN     Stats
        statistics

SYN     Economics
        economics

SYN     Banking
        banking

SYN     Finance
        finance

SYN     Law
        law
        =BSL

SYN     Journal
        journalism

SYN     Comm
        communications

SYN     Sociology
        sociology

SYN     Lib Arts
        liberal arts
        liberal studies

SYN     English
        english

SYN     Ind Arts
        industrial arts

SYN     History
        history

SYN     Marketing
        marketing

SYN     Architect
        architecture

SYN     Biology
        biology biological =sciences

SYN    Elec Tech
       electronics technology
       electronic technology

SYN    Mat Sci
       material science

CLASS  Other_Majors
       =(Aero Eng)
       =AI
       =Anthro
       =Architect
       =Astrophys
       =Avionics
       =Banking
       =(Behav Sc)
       =Bioeng
       =Biology
       =(Civil Eng)
       =Comm
       =(Cybernet)
       =Drafting
       =(Data Pro)
       =Economics
       =Education
       =Engineer
       =History
       =(Ind Arts)
       =Law
       =(Lib Arts)
       =Linguist
       =Marketing
       =MIS =Music
       =(Oper Res)
       =Philo
       =(Phys Edu)
       =Psych
       =(Pub Admin)
       =(Social Sc)
       =Sociology
       =Stats
       =(Sys Eng)

CLASS  Major
       =Acct
       =Business
       =(Chem Eng)
       =Chemistry
       =(Compu Eng)
       =CS
       =EE
       =(Elec Tech)
       =English
       =HR
       =(Finance )
       =(Ind Eng)
       =Journal
       =(Mat Sci)
       =Math
       =(Mech Eng)
       =Mgmt
       =Physics
       =(S.S.Phy)
       /Other_Majors

```
SYN     due
        due
        expected
        completion
        completed
        candidate
        current
        to [1] be CLASS   GPA
        /NUMBER1 [0 M] . [0 M] /NUMBER
        /NUMBER1 [0 M] - [0 M] /NUMBER SYN     gpa
        gpa
        g [1] p [1] a
        gp [1] a
        g [1] pa SYN     present
        present
        current [N 2 I] =gpa SYN     credit
        credit
        credits

CLASS   E_DATE
        /YEAR [W I] =EDUCATION_SECTION

CLASS   E_PRESENT
        =present [W I] =EDUCATION_SECTION

CLASS   SECOND_DATE
        [I] /E_DATE [5 F] /E_DATE [W I] /DATE_RANGE
        [I] /E_DATE [5 F] /E_PRESENT [W I] /DATE_RANGE

CLASS   D_DATE
        /E_DATE [N W I] /GPA [N W I] /DATE_RANGE [N 1 I] =credit
        /SECOND_DATE
        /E_PRESENT [N W I] /DATE_RANGE SYN     DEGREE_STOPPER
        | [W I] =EDUCATION_SECTION
        \ [W I] =EDUCATION_SECTION uses schools.def

SYN     UNKNOWN_SCHOOL
        =univ [N W I] /School
        =College [N W I] /School CLASS   ANY_SCHOOL
        /School [W I] =EDUCATION_SECTION
;           =UNKNOWN_SCHOOL [W I] =EDUCATION_SECTION ; If the order of the patterns is changed in DEGREE_YEAR,
; the system will not work. Educate in action.c must be modified.

CLASS   PossMajor
        /Major [C I] /Degree
        [I] /Degree [15] /Major [W I] =EDUCATION_SECTION
        [I] major [O I] : /Major CLASS   DEGREE_YEAR
ACTION  Educate
        /Degree [W I] =EDUCATION_SECTION
        /PossMajor [W I] =EDUCATION_SECTION
```

```
        /ANY_SCHOOL [W I] =EDUCATION_SECTION
        =due    [W I] =EDUCATION_SECTION
        /D_DATE [W I] =EDUCATION_SECTION
        /GPA    [W I] =EDUCATION_SECTION
        =STOPPER [W I] =EDUCATION_SECTION

CLASS   EDUCATION
        /DEGREE_YEAR [W I] =EDUCATION_SECTION

CLASS   College_Degrees
        /Bachelors

/Masters
        =Phd

Mar 30 20:58 1989  objective.def Page 1

; objective.def
; Copyright 1989, Resumix, Inc.
;
#uses sections.def
uses titles.def CLASS   Object_C_Administ
        /(Buzz_Legal_Title) [W I] =OBJECTIVE_SECTION ; experience.def
; Copyright 1989, Resumix, Inc.
;
uses S_Legal.def CLASS   Experience
        /(Legal_Experience)

#uses system.def
uses dates.def
#uses sections.def
#uses states.def
#uses titles.def

CLASS   ZIP_CODE
        /NUMBER5A [O I] - [O] /NUMBER4A

CLASS   PHONE
        /NUMBER3A [N O] , [O I] - /NUMBER4A

SYN     NAME_LOCATION
ACTION  FirstOccurrence
        /BOD [B F] /STATE [N W I] =FIRST_TWO_LINES
        /BOD [B F] /ZIP_CODE [N W I] =FIRST_TWO_LINES
        /BOD [B F] /PHONE [N W I] =FIRST_TWO_LINES
        /BOD [B F] =TENTH_LINE [N W I] =FIRST_TWO_LINES
        =END_HEADER [N W I] =FIRST_TWO_LINES SYN     RES_OF
        [O] , /NonName_Titles [O O] : [W I] =LINE $
   [W I] =FIRST_TEN_LINES
```

```
CLASS    POSSAPP
         [I] =RES_OF [* B F I] =STOPPER
         [I] =STOPPER [* B F I] =RES_OF
         [I] =RES_OF [* B F I] =RES_OF [W I] =LINE
         [I] =STOPPER [* B F I] =STOPPER [W I] =FIRST_TEN_LINES

CLASS    POSS_APPLICANT_LINE
ACTION   PruneName
         /POSSAPP [N C I] =RES_OF [W I] =NAME_LOCATION CLASS    APPLICANT
ACTION   FirstOccurrence
         /POSS_APPLICANT_LINE [N C I] /NUMBER [W I] =LINE SYN      START_HEADER
ACTION   FirstFit
         /BOD [B F] /APPLICANT [C I] /NUMBER
         /APPLICANT
         /BOD SYN      POSS_HEADER_SEC
ACTION   FirstFit
         =START_HEADER [B F] /ZIP_CODE [* B F I] =END_HEADER
         =START_HEADER [* B F I] =END_HEADER SYN      POSS2_HEADER_SEC
ACTION   FirstOccurrence
         =POSS_HEADER_SEC [C I] /STATE SYN      HEADER_SECTION
ACTION   FirstFit
         =POSS2_HEADER_SEC

=POSS_HEADER_SEC

CLASS    FULL_LINE
         [I] =STOPPER [* B F I] /EOL [W I] =HEADER_SECTION

SYN      PHONE_LINE
         /PHONE [W] =LINE

CLASS    AREA_PHONE
         /NUMBER3A [2] /PHONE

CLASS    NOT_AREA_PHONE
         /PHONE [N W I] /AREA_PHONE

SYN      ext
         x
         ext [0] .
         extension

CLASS    EXT
         =ext [0] /NUMBER

SYN      BUSINESS
         business
         bus
         office
         work
         w
         wk SYN      MESSAGE
         message

CLASS    PHONE_NUMBER
         /AREA_PHONE [2 0] /EXT
```

```
        /NOT_AREA_PHONE [2 O] /EXT

CLASS   WORK_PHONE
        =BUSINESS [4] /PHONE_NUMBER
        /PHONE_NUMBER [2] =BUSINESS

CLASS   MESSAGE_PHONE
        =MESSAGE [4] /PHONE_NUMBER [W I] /FULL_LINE
        /PHONE_NUMBER [2] =MESSAGE [W I] /FULL_LINE

CLASS   BUSINESS_PHONE
        /WORK_PHONE [W I] /FULL_LINE [W I] =HEADER_SECTION

CLASS   HOME_PHONE
        /PHONE_NUMBER [N W I] /BUSINESS_PHONE [N W I] /MESSAGE_PHONE $
 [W I] =HEADER_SECTION

SYN     CITY_STARTER
        =STOPPER [W I] =HEADER_SECTION
        , [W I] =HEADER_SECTION

SYN     CITY_STOPPER
        [O] =CITY_STARTER /STATE [W I] =HEADER_SECTION

CLASS   POSSIBLE_CITY
        [I] =CITY_STARTER [* 5 I] =CITY_STOPPER [W I] =LINE

CLASS   CITY
        /POSSIBLE_CITY [N C I] =CITY_STARTER

SYN     Street
        street
        st [O] .

SYN     Way
        way

SYN     Avenue
        Avenue
        Ave [O] .

SYN     Road
        Road
        Rd [O] .

SYN     Drive
        Drive
        Dr [O] .

SYN     Boulevard
        Boulevard
        Blvd [O] .

SYN     Route
        Route
        Rte [O] .

SYN     OtherStreet
        Court
        Ct [O] .
        Place
        Pl [O] .
        Circle SYN     STREET_INDICATOR
        =Street
        =Road
        =Avenue
```

```
            =Drive
            =Boulevard
            =Route
            =OtherStreet
            =Way SYN     ADDRESS_INDICATOR
            /NUMBER [W I] =HEADER_SECTION
            =STREET_INDICATOR box SYN     STATE_LINE
            /STATE [W] =LINE [W I] =HEADER_SECTION
            /STATE [W] =LINE [W I] =PERSONAL_SECTION CLASS   CITY_LINE
            [I] =CITY_STARTER [* B F I] /CITY [W I] =LINE [W I] =HEADER_SECTION
            [I] =CITY_STARTER [* B F I] /CITY [W I] =LINE [W I] =PERSONAL_SECTION CLASS   ADDRESS2
            [I] =STOPPER /NUMBER [* B F] /FULL_LINE [I] =STATE_LINE $
     [N C I] /PHONE CLASS   ADDRESS
            /ADDRESS2
            [I] =ADDRESS_INDICATOR [W] /FULL_LINE [N C I] /PHONE [N W I] /ADDRESS2
            /CITY_LINE [N C I] /PHONE SYN     Permanent
            permanent!1
            home SYN     School
            school
            campus SYN     Current
            current
            present
            local SYN     Office
            office CLASS   ADDR_TYPE
            =Permanent
            =School
            =Current
            =Office

CLASS   ADDR_HEADER
            [I] /BOD [B] /ADDR_TYPE

SYN     address
            address
            residence

CLASS   ADDRESS_TYPE
            /ADDR_HEADER [4 I] =address [B F] /EOL [W I] =LINE [W I] =HEADER_SECTION

SYN     TWO_ADD
            /ADDR_HEADER [B F] /ADDR_HEADER

CLASS   ADDRESS_LINE
            /ADDRESS [I O] =PHONE_LINE [2] /CITY [1] /STATE $
```

```
Mar 30 20:57 1989  header.def Page 5

[1 0]  /ZIP_CODE

CLASS   POS_APP_W_TYPE
        /ADDRESS_TYPE [B F] /ADDRESS_LINE [N C I] =TWO_ADD

CLASS   POS_APP_WO_TYPE
        [I] /APPLICANT [B] /ADDRESS_LINE
        [I] /BOD [B F] /ADDRESS_LINE [N C I] /APPLICANT

CLASS   POS_APP_ADDRESS
        /POS_APP_W_TYPE
        /POS_APP_WO_TYPE [N W I] /POS_APP_W_TYPE

CLASS   APP_ADDRESS
        /POS_APP_ADDRESS [W I] =HEADER_SECTION
        /POS_APP_ADDRESS [W I] =PERSONAL_SECTION

CLASS   APPLICANT_NAME
        /APPLICANT uses system.def
uses sections.def
uses titles.def
#uses company.def
uses dates.def SYN     Co
        co [I 0] .

SYN     Ltd
        ltd

SYN     Bros
        bros

SYN     Dept
        dept

SYN     Labs
        labs
        lab

SYN     Incorporated
        incorporated!2

SYN     Corporation
        corporation!2

CLASS   Abbrev
        =Dept

SYN     Brothers
        brothers!1

SYN     Corp
        corp

SYN     Inc
        inc

CLASS   EndCo
        =(Corp )
        =Co
        =(Inc )
        =Ltd
```

```
               =Corporation
               =Incorporated
               Limited
               =Labs
               =Bros
               Brothers
               Company CLASS    corp
               Bell
               Systems Technologies
               Technology
               Semiconductor
               Associates
               Computers
               College
               University
               Department
               Research Center
               Store
               Laboratories
               Companies
               Fort
               Army
               Navy
               Air Force
               Marines
               Coast Guard
               Division
               Group
               Site
               Motel
               Hotel
               Center
               Consultants
               Subsidiary
               Bank of
               Savings [2] Loan
               Institute
               Unlimited
               Agency
               Services
               Service
               National Guard
               of America
               US
               U.S.
               Clinic
               Microsystems
               &
               /Abbrev SYN      ABBR
               /Abbrev .

SYN      StartDel
               /Titles_General [W I] =EXPERIENCE_SECTION
               /NUMBER2A [W I] =EXPERIENCE_SECTION
               /NUMBER3A [W I] =EXPERIENCE_SECTION
               /NUMBER4A [W I] =EXPERIENCE_SECTION
               /NUMBER5A [W I] =EXPERIENCE_SECTION
               /MONTH [W I] =EXPERIENCE_SECTION
               /SEASON_YEAR [W I] =EXPERIENCE_SECTION
               present [W I] =EXPERIENCE_SECTION
               ] [W I] =EXPERIENCE_SECTION
               ) [W I] =EXPERIENCE_SECTION
```

```
        /All_Titles [W I] =EXPERIENCE_SECTION
        /EOL [W I] =EXPERIENCE_SECTION
        | [W I] =EXPERIENCE_SECTION
        \ [W I] =EXPERIENCE_SECTION
        - [W I] =EXPERIENCE_SECTION
        : [W I] =EXPERIENCE_SECTION
        ; [W I] =EXPERIENCE_SECTION
        . [N W I] =ABBR [W I] =EXPERIENCE_SECTION
        at [W I] =EXPERIENCE_SECTION
        for [W I] =EXPERIENCE_SECTION
        with [W I] =EXPERIENCE_SECTION SYN     EndDel
        /Titles_General [W I] =EXPERIENCE_SECTION
        /NUMBER2A [W I] =EXPERIENCE_SECTION
        /NUMBER3A [W I] =EXPERIENCE_SECTION
        /NUMBER4A [W I] =EXPERIENCE_SECTION
        /NUMBER5A [W I] =EXPERIENCE_SECTION
        /MONTH [W I] =EXPERIENCE_SECTION
        /SEASON_YEAR [W I] =EXPERIENCE_SECTION
        present [W I] =EXPERIENCE_SECTION
        [ [W I] =EXPERIENCE_SECTION
        ( [W I] =EXPERIENCE_SECTION
        /All_Titles [W I] =EXPERIENCE_SECTION
        /EOL [W I] =EXPERIENCE_SECTION
        | [W I] =EXPERIENCE_SECTION
        \ [W I] =EXPERIENCE_SECTION
        - [W I] =EXPERIENCE_SECTION
        : [W I] =EXPERIENCE_SECTION
        ; [W I] =EXPERIENCE_SECTION
        . [N W I] =ABBR [W I] =EXPERIENCE_SECTION SYN     StartPair
        =StartDel [B F] =StartDel SYN     FirstPoss
        =StartDel [B F] /EndCo [N C I] =StartPair $
   [W I] =EXPERIENCE_SECTION CLASS   FirstPossCo
        [I] =StartDel [* B F] /EndCo [W I] =FirstPoss SYN     ThirdPoss
        =StartDel [B F] /corp [0] , [N C I] =StartPair $
   [W I] =EXPERIENCE_SECTION CLASS   ThirdPossCo
        [I] =StartDel [* B F] /corp [0 I] , [W I] =ThirdPoss CLASS   SecondPossCo
        [I] =StartDel [* B F I] =EndDel [C I] /corp CLASS   PossCo
        /FirstPossCo [N C I] =EndDel
        /ThirdPossCo [N C I] =EndDel
        /SecondPossCo [N C I] /ThirdPossCo CLASS   DummyPossCo
ACTION  GetProperNouns
        /PossCo [N C I] =StartDel CLASS   UnknownCo
        /DummyPossCo [C I] /corp [N C I] /Company
        /DummyPossCo [C I] /EndCo [N C I] /Company
```

CLASS    Any_Company
         /Company
         /UnknownCo uses    states.def

SYN      College
         college
         coll [0] .

SYN      univ
         university
         univ [0] .
         u [0] .

SYN      inst
         institute
         inst [0] .

SYN      tech
         technology
         tech [0] .

SYN      poly
         polytechnic
         poly [0] .

SYN      Cal Poly S.L.O.
         =CA =poly [3] san

SYN      south
         southern
         south
         s .

SYN      Stanford
         stanford

SYN      UC
         uc
         =univ [1] =CA

SYN      UC Berkeley
         ucb
         =UC [1] berkeley!1

SYN      U of Ill Urbana
         =univ [1] =IL

SYN      U of Ill Chicago
         =univ [1] =IL

SYN      Carnegie Mellon
         CMU
         carnegie mellon

SYN      MIT
         MIT
         M [1] I [1] T
         =MA =inst [1] =tech

SYN      Cornell
         cornell

```
CLASS    EE_SCHOOLS
         =Stanford
         =(UC Berkeley)
         =(U of Ill Urbana)
         =(Carnegie Mellon)
         =MIT
         =Cornell CLASS    CS_SCHOOLS
         =Stanford
         =(UC Berkeley)
         =(U of Ill Urbana)
         =(Carnegie Mellon)
         =MIT
         =Cornell SYN      Harvard
         harvard SYN      Wharton
         wharton SYN      Sloan
         sloan CLASS    MBA_SCHOOLS
         =Harvard
         =Stanford
         =Wharton
         =Sloan SYN      Los Angeles
         los angeles
         LA SYN      UCLA
         ucla
         =UC [1] =(Los Angeles)

SYN      U of Washington
         =univ [1] =WA

SYN      Georgia Tech
         =GA =tech

SYN      UC Davis
         =UC [1] davis

SYN      Southern Illinois
         =univ [1] =south =IL

SYN      Chico State
         =CA [4] chico

SYN      U of Arizona
         =univ [4] =AZ

SYN      UC Santa Barbara
         =UC [1] santa barbara

SYN      UC San Diego
         =UC [1] san diego

SYN      U of Cincinnati
         =univ [1] cincinnati
```

| | | |
|---|---|---|
| SYN | U of Michigan<br>=univ [1] =MI | |
| SYN | Oregon State<br>=OR state | |
| SYN | U of Pennsylvania<br>=univ [1] =PA | |
| SYN | Princeton<br>princeton | |
| SYN | Purdue<br>purdue | |
| SYN | RPI<br>rpi<br>rensallaer | |
| SYN | SJSU<br>sjsu<br>san jose state | |
| SYN | Santa Clara Univ<br>=univ [1] santa clara<br>santa clara =univ | |
| SYN | U of Santa Clara<br>=univ [1] santa clara | |
| SYN | USC<br>usc<br>=univ [1] =south =CA | |
| SYN | ut<br>ut<br>=univ [1] =TX | |
| SYN | UT Austin<br>=ut [1] austin | |
| SYN | Texas A & M<br>=TX a & m | |
| SYN | UT San Antonio<br>=ut [1] san antonio | |
| SYN | R.I.T.<br>rochester institute<br>RIT<br>R [1] I [1] T | |
| SYN | Louisiana State<br>=LA state | |
| SYN | N Carolina State<br>=NC state | |
| SYN | Howard<br>howard | |
| SYN | U of New Mexico<br>=univ [1] =NM | |
| SYN | U of Chicago<br>=univ [1] chicago | |

```
CLASS   OP_SCHOOLS
        =UCLA
        =(U of Washington)
        =(Georgia Tech)
        =(UC Davis)
        =(Southern Illinois)
        =(Chico State)

CLASS   MFG_SCHOOLS
        =UCLA
        =(U of Washington)
        =(Georgia Tech)
        =(UC Davis)
        =(Southern Illinois)
        =(Chico State)

CLASS   SERV_SCHOOLS
        =UCLA
        =(U of Washington)
        =(Georgia Tech)
        =(UC Davis)
        =(Southern Illinois)
        =(Chico State)

SYN     Heald Business
        heald business [0] =College

SYN     Total Technical
        total technical [0] =College

SYN     De Vry Institute de vry [0] =inst

SYN     Cogswell
        cogswell [0] =College

SYN     S.M.U.
        SMU
        S [1] M [1] U
        southern methodist =univ SYN     Baylor
        baylor SYN     Hayward State
        hayward SYN     U of Florida Gaines
        =univ =FL [3] gaines SYN     Rice
        Rice SYN     Texas Tech
        =TX tech CLASS   School
        =(Texas Tech)
        =Rice
        =(Hayward State)
        =(S.M.U.)
        =(U of Chicago)
        =Baylor
        =(Heald Business)
        =Cogswell
        =UCLA
        =(U of Washington)
```

```
=(Georgia Tech)
=(UC Davis)
=(Southern Illinois)
=(Chico State)
=Stanford
=(Carnegie Mellon)
=(UC Berkeley)
=(U of Ill Urbana)
=(U of Ill Chicago)
=MIT
=Cornell
=Harvard
=Wharton
=Sloan
=(U of Arizona)
=(UC Santa Barbara)
=(UC San Diego)
=(U of Florida Gaines)
=(U of Cincinnati)
=(U of Michigan)

=(Oregon State)
=(U of Pennsylvania)
=Princeton
=Purdue
=RPI
=SJSU
=(U of Santa Clara)
=USC
=(UT Austin)
=(Cal Poly S.L.O.)
=Howard
=(Texas A & M)
=(UT San Antonio)
=(R.I.T.)
=(Louisiana State)
=(N Carolina State)
=(De Vry Institute)
=(Total Technical)
=(U of New Mexico)

uses legal.def uses applic.def
uses management.def
#uses product.def

CLASS    Legal_Experience
;        /Buzz_Admin_Terms
         /Buzz_Legal_Terms
         /Buzz_Management
;        /Buzz_Product
         /Buzz_WordPro CLASS    Other_Legal
ACTION   Sum
;        /Skill_Admin_Terms
         /Skill_Legal_Terms
         /Skill_Management
;        /Skill_Product
         /Skill_WordPro CLASS    Skills_Legal
ACTION   PointSum
;        /(Admin Terms)
```

```
/(Legal Terms)
/Management
/Products
/(Word Processors)

#uses system.def
uses sections.def
uses common.def
#uses buzz.def
#uses dates.def
#uses company.def
uses management.def SYN     Mechanical Engineer
        mechanical =engineer
        ME CLASS   Buzz_Mechanic_Title
        =(Mechanical Engineer)

SYN     CAD Applications
        cad applications

SYN     CAD Development
        cad development

SYN     CAD Engineer
        cad =engineer

SYN     lead
        lead
        leader

SYN     CAD Eng Manager
        cad =engineer [B F] manager [W I] =SENTENCE
        manager [B F] cad =engineer [W I] =SENTENCE SYN     CAD Eng Projct Lead
        cad =engineer [B F] project =lead [W I] =SENTENCE
        project =lead [B F] cad =engineer [W I] =SENTENCE SYN     CAD Eng Sect Head
        cad =engineer [B F] section head [W I] =SENTENCE
        section head [B F] cad =engineer [W I] =SENTENCE SYN     senior
        senior
        sr [O] .

SYN     Senior CAD Eng
        =senior cad engineer

SYN     CAE Engineer
        cae engineer

SYN     Elec Desgn Auto Eng
        EDA
        electronic design automation =engineer SYN     Mechanical CAD-CAM
        mechanical cad mechanical cam SYN     Member Tech Staff
```

```
        MTS
        member [2] technical staff

SYN     Place & Route Eng
        =place =& route =engineer

SYN     CAD Operator
        cad operator

SYN     CAD Technician
        cad technician

SYN     Layout Designer
        layout designer

SYN     Product Technician
        product technician

SYN     Product Engineer
        product =engineer

CLASS   Buzz_Product _Title
        =(Product Technician)
        =(Product Engineer)

CLASS   Titles_Product
ACTION  SumMAX
        /(Buzz_Product _Title) [N W I] =OBJECTIVE_SECTION SYN     technician
        tech
        technician SYN     comm
        comm
        communications
        communication SYN     Computer Operator
        computer operator SYN     Data Proc Supp Op
        data proc supp operator SYN     Datacomm Tech
        datacomm =technician
        datacommunications =technician
        datacommunication =technician
        data =comm =technician SYN     Communications Tech
        =comm =technician [N W I] =(Datacomm Tech)

SYN     Tape Librarian
        tape librarian

SYN     Analog Designer
        analog designer

SYN     Circuit Designer
        circuit =design

SYN     Component Designer
        component =design

SYN     Designer
        designer
```

```
SYN        Digital Designer
           digital designer

SYN        IC Designer
           ic designer

SYN        Library Development
           library development engineer

SYN        Logic Design Eng
           logic design engineer

SYN        VLSI Design Eng
           vlsi design engineer

SYN        Industrial Engineer
           IE
           industrial =engineer

CLASS      Buzz_Indust._Title
           =(Human Factors Eng)
           =(Industrial Engineer)

CLASS      Titles_Indust.
ACTION     SumMAX
           /(Buzz_Indust._Title) [N W I] =OBJECTIVE_SECTION SYN        Data Analyst
           data analyst SYN        Data Planner
           data planner
           data planning SYN        Database Analyst
           database analyst SYN        Systems Programmer
           =systems programmer SYN        Assoc Programmer
           associate programmer SYN        Programmer Analyst
           programmer [2] analyst SYN        Test Programmer
           test programmer SYN        Programmer
           programmer [N W I] =(Systems Programmer) $
     [N W I] =(Programmer Analyst) [N W I] =(Assoc Programmer) $
     [N W I] =(Test Programmer)

SYN        leader
           lead
           leader

SYN        Project Leader
           project -leader

SYN        Systems Analyst
           =systems -analyst

SYN        Telecomm Analyst
           telecommunications analyst
```

```
SYN      Print Operator
         print operator

CLASS    Buzz_Informat_Title
         =(Assoc Programmer)
         =(Data Analyst)
         =(Data Planner)
         =(Database Analyst)
         =(Data Proc Supp Op)
         =(Communications Tech)
         =(Computer Operator)
         =(Datacomm Tech)
         =(Tape Librarian)
         =(Print Operator)
         =(Programmer Analyst)
  ;         =(Project Leader)
         =(Systems Analyst)
         =(System Admin)
         =(Systems Programmer)
         =(Telecomm Analyst)

CLASS    Titles_Informat
ACTION   SumMAX
         /(Buzz_Informat_Title) [N W I] =OBJECTIVE_SECTION SYN      Assembly Supervisor
         assembly supervisor SYN      Fab Supervisor
         =fab supervisor SYN      GF
         GF
         general foreman SYN      Line Supervisor
         line supervisor SYN      Product Line Mgr
         product line manager SYN      Production Manager
         production manager SYN      Production Super
         production supervisor SYN      Shift Supervisor
         shift supervisor SYN      Test Supervisor
         test supervisor SYN      vp
         V.P
         VP
         vice [2] president SYN      Fab Manager
         =fab manager
         =fab director
         =fab =vp SYN      Electro-Mech Assem
         electro-mech assembler SYN      Electro-Mech Tech
         electro-mech technician
```

```
SYN     electronic
        electronic
        electrical

SYN     Elect Mtce Tech
        =electronic maintenance technician

SYN     Electronic Tech
        electronic [N] maintenance technician

CLASS   Buzz_Ops_Title
        =(Assembly Supervisor)
        =(Fab Supervisor)
        =(GF)
        =(Line Supervisor)
        =(Product Line Mgr)
        =(Production Manager)

=(Production Super)
        =(Shift Supervisor)
        =(Test Supervisor)
        =(Fab Manager)
        =(Electro-Mech Assem)
        =(Electro-Mech Tech)
        =(Elect Mtce Tech))
        =(Electronic Tech)

CLASS   Titles_Ops
ACTION  SumMAX
        /Buzz_Ops_Title [N W I] =OBJECTIVE_SECTION SYN     Failure Analyst
        failure analyst SYN     Fracture Mechanic
        fracture mechanic SYN     material
        material
        materials SYN     Material Scientist
        =material scientist
        science engineer SYN     Pack Eng Sect Head
        packaging =engineer section head SYN     Pack Eng Sect Mgr
        packaging =engineer section manager SYN     Sr. Packaging Eng
        senior packaging engineer SYN     Packaging Engineer
        packaging =engineer SYN     Physicist
        physicist SYN     Process Automat Eng
        process automation =engineer SYN     Statistical Analyst
        statistical analyst SYN     Stress Analyst
        stress analyst
```

SYN     Yield Enhance Eng
        yield enhancement =engineer

SYN     Assembly Engineer
        assembly engineer

CLASS   Buzz_Packagin_Title
        =(Assembly Engineer)
        =(Failure Analyst)
        =(Fracture Mechanic)
        =(Material Scientist)
        =(Mechanical Engineer)
        =(Packaging Engineer)
        =(Packaging Engineer)
        =(Pack Eng Sect Head)
        =(Pack Eng Sect Mgr)
        =(Sr. Packaging Eng)
        =(Physicist)
        =(Process Automat Eng)
        =(Statistical Analyst)
        =(Stress Analyst)
        =(Yield Enhance Eng)

CLASS   Titles_Packagin
ACTION  SumMAX
        /Buzz_Packagin_Title [N W I] =OBJECTIVE_SECTION SYN     Chemical Handler
        chemical handler SYN     Chemical Technician
        chemical technician SYN     Equip Mtnc Tech
        equip maintenance technician SYN     Fab Operator
        fab operator SYN     Line Mtnc Tech
        line maintenance technician SYN     Manufacturing Tech
        manufacturing technician SYN     Process Technician
        process [2] technician SYN     Production Tech
        production technician SYN     Development Eng
        development engineer SYN     Device Engineer
        device =engineer SYN     Diffusion Engineer
        diffusion =engineer SYN     epitaxial epitaxy
        epitaxial

| | |
|---|---|
| SYN | Epitaxial Engineer<br>=epitaxial =engineer |
| SYN | Etch Engineer<br>etch =engineer |
| SYN | E-Beam Engineer<br>e-beam =engineer<br>electron beam =engineer |
| SYN | Ion Implant Eng<br>ion implant =engineer |
| SYN | Masking Engineer<br>masking =engineer |
| SYN | Photo Engineer<br>photo =engineer |
| SYN | Photo Etch Engineer<br>photo etch =engineer |
| SYN | Photomask Engineer<br>photomask =engineer |
| SYN | photolithography<br>photolith<br>photolitho<br>photolithgraphy |
| SYN | Photolith Engineer<br>=photolithography =engineer |
| SYN | Process Control Eng<br>process control =engineer |
| SYN | Process Engineer<br>process =engineer |
| SYN | Thin Films Engineer<br>thin films =engineer |
| SYN | Yield Improve Eng<br>yield improvement =engineer |
| CLASS | Buzz_Process_Title<br>=(Development Eng)<br>=(Device Engineer)<br>=(Diffusion Engineer)<br>=(Epitaxial Engineer)<br>=(Etch Engineer)<br>=(E-Beam Engineer)<br>=(Ion Implant Eng) |
| | =(Masking Engineer)<br>=(Photo Engineer)<br>=(Photo Etch Engineer)<br>=(Photomask Engineer)<br>=(Photolith Engineer)<br>=(Process Control Eng)<br>=(Process Engineer)<br>=(Thin Films Engineer)<br>=(Yield Improve Eng)<br>=(Chemical Handler)<br>=(Chemical Technician)<br>=(Equip Mtnc Tech)<br>=(Fab Operator)<br>=(Line Mtnc Tech) |

```
          =(Manufacturing Tech)
          =(Process Technician)
          =(Production Tech)

CLASS    Titles_Process
ACTION   SumMAX
         /Buzz_Process_Title [N W I] =OBJECTIVE_SECTION SYN      Burn-In Operator
         burn-in operator SYN      Electr Maint Tech
         electronic maintenance technician SYN      Final Test Tech
         final test technician SYN      M/P Operator
         M ^/ P operator
         mark =& pack operator SYN      Metal Finish Operat
         metal finish operator SYN      Test Equip Supp Eng
         test equipment support =engineer SYN      Test Maint Engineer
         test maintenance =engineer SYN      Test Operator
         test operator SYN      Test Maint Tech
         test maintenance technician CLASS    Buzz_Test Eng_Title
         =(Burn-In Operator)
         =(Electr Maint Tech)
         =(Final Test Tech)
         =(M/P Operator)
         =(Metal Finish Operat)

=(Release Engineering)
         =(Test Engineering)
         =(Test Equip Supp Eng)
         =(Test Maint Engineer)
         =(Test Operator)
         =(Test Programmer)
         =(Test Maint Tech)

CLASS    Titles_Test Eng
ACTION   SumMAX
         /(Buzz_Test Eng_Title) [N W I] =OBJECTIVE_SECTION SYN      HR Assistant
         HR assistant SYN      Word Processor
         word processor CLASS    Buzz_Clerical_Title
         =(Admin Asssistant)
         =(Clerk)
         =(Executive Secretary)
         =(Office Assistant)
         =(Office Manager)
         =(Personnel Assistant)
```

```
              =(Print Operator)
              =(Receptionist)
              =(Secretary) [W I] =EXPERIENCE_SECTION
              =(Telex Operator)
              =(Typist)
              =(Word Processor)

CLASS     Titles_Clerical
    ACTION    SumMAX
              /Buzz_Clerical_Title [N W I] =OBJECTIVE_SECTION SYN       illustrator
              illustrator
              illustrators SYN       Tech Illustrator
              technical =illustrator SYN       writer
              writer
              writers SYN       reviewer
              reviewer
              reviewers SYN       Spec Reviewer
              =Specifications =reviewer SYN       Spec Writer
              =Specifications =writer SYN       Technical Writer
              technical =writer SYN       Advertising Exec
              advertising executive SYN       specialist
              specialist
              specialists SYN       Document Specialist
              documentation =specialist SYN       Technical Editor
              technical editor SYN       Graphic Artist
              graphic artist SYN       Graphics Coordinatr
              graphics coordinator SYN       Instructional Dsgnr
              instructional designer SYN       Librarian
              librarian
              librarians SYN       Newsletter Editor
              newsletter editor SYN       Promo Coordinator
              =promotion coordinator
```

```
SYN      PR Analyst
         =PR =analyst

SYN      PR Specialist
         =PR =specialist

SYN      Speech Writer
         speech =writer

SYN      Video Specialist
         video =specialist

CLASS    Buzz_Advertis_Title
         =(Advertising Exec)
         =(Document Specialist)
         =(Graphic Artist)
         =(Graphics Coordinatr)
         =(Instructional Dsgnr)
         =Librarian
         =(Newsletter Editor)

=(Promo Coordinator)
         =(PR Analyst)
         =(PR Specialist)
         =(Spec Reviewer)
         =(Spec Writer)
         =(Speech Writer)
         =(Technical Editor)
         =(Tech Illustrator)
         =(Video Specialist)

CLASS    Titles_Advertis
ACTION   SumMAX
         /(Buzz_Advertis_Title) [N W I] =OBJECTIVE_SECTION SYN      Architect
         Architect [W I] =EXPERIENCE_SECTION
         ural designer SYN      Construction Eng
         construction [2] =engineer SYN      Electrical Engineer
         electrical =engineer SYN      Facilities Manager
         facilities manager SYN      Plant Engineer
         plant =engineer SYN      Project Engineer
         project engineer SYN      Electrician
         electrician SYN      Plumber
         plumber SYN      Drafter
         drafter SYN      Facilities Mechanic
         facilities mechanic SYN      Facilities Eng
         facilities =engineer
```

| | | |
|---|---|---|
| SYN | Facilities Planner | |
| | facilities planner | |
| SYN | HVAC Engineer | |
| | hvac engineer | |
| SYN | Plant Maint Engin | |
| | plant maintenance engineer | |
| SYN | Plant Maint Mech | |
| | plant maintenance mechanic | |
| SYN | Facilities Maint | |
| | facilities maintenance | |
| SYN | Environm Engineer | |
| | environmental =engineer | |
| CLASS | Buzz_Faciliti_Title | |
| | =(Architect) | |
| | =(Construction Eng) | |
| | =(Environm Engineer) | |
| | =(Facilities Manager) | |
| | =(Facilities Eng) | |
| | =(HVAC Engineer) | |
| | =(Facilities Maint) | |
| | =(Facilities Planner) | |
| | =(Plant Maint Engin) | |
| | =(Plant Maint Mech) | |
| | =Electrician | |
| | =(Mechanical Engineer) | |
| | =Plumber | |
| | =Drafter | |
| | =(Facilities Mechanic) | |
| | =(Plant Engineer) | |
| CLASS | Titles_Faciliti | |
| ACTION | SumMAX | |
| | /Buzz_Faciliti_Title [N W I] =OBJECTIVE_SECTION | |
| SYN | FC | |
| | FC | |
| | full charge | |
| SYN | Payroll Specialist | |
| | payroll specialist | |
| SYN | Assist Controller | |
| | assistant controller | |
| SYN | Auditor | |
| | auditor | |
| | auditors | |
| SYN | Acct Services Chief | |
| | chief [2] accounting services | |
| | accounting services chief | |
| SYN | General Acct Chief | |
| | general accounting chief | |
| | chief [2] general accounting | |
| SYN | Cost Accountant | |
| | cost accountant | |

| | |
|---|---|
| SYN | CPA<br>CPA<br>certified public accountant |
| SYN | Credit Analyst<br>credit analyst |
| SYN | Financial Analyst<br>financial =analyst |
| SYN | General Accountant<br>general accountant |
| SYN | Internal Auditor<br>internal =Auditor |
| SYN | Market Plan Analyst<br>marketing plan analyst |
| SYN | Product Line Anlyst<br>product line analyst |
| SYN | Risk Manager<br>risk manager |
| SYN | Strategic Planner<br>strategic planner |
| SYN | Tax Accountant<br>tax accountant |
| SYN | Tax Analyst<br>tax analyst |
| SYN | Treasurer<br>treasurer |
| SYN | Treasury Specialist<br>treasury specialist |
| SYN | assistant<br>assistant<br>associate<br>junior<br>jr [O O] . |
| SYN | Assoc Accountant<br>=assistant accountant |
| SYN | Accountant<br>accountant [N W I] =(Assoc Accountant) $<br>[N W I] =(Cost Accountant) [N W I] =(General Accountant) $<br>[N W I] =(Tax Accountant) [N W I] =CPA |
| CLASS | Buzz_Finance_Title |

```
        =(Accts Payable Clerk)
        =(Accts Receiv Clerk)
        =(Accounting Clerk)
        =(Accountant)
        =(Assoc Accountant)
        =(Assist Controller)
        =(Auditor)
        =(Acct Services Chief)
```

```
            =CPA
            =(General Acct Chief)
            =(Cost Accountant)
            =(Credit Analyst)
            =(FC)
            =(Financial Analyst)
            =(General Accountant)
            =(Internal Auditor)
            =(Market Plan Analyst)
            =(Payroll Specialist)
            =(Product Line Anlyst)
            =(Risk Manager)
            =(Strategic Planner)
            =(Tax Accountant)
            =(Tax Analyst)
            =(Treasurer) [W I] =EXPERIENCE_SECTION
            =(Treasury Specialist)

CLASS       Titles_Finance
ACTION      SumMAX
            /Buzz_Finance_Title [N W I] =OBJECTIVE_SECTION SYN         Classif Analyst
            classification analyst
            classification represenative SYN         ER Analyst
            employee relations analyst
            employee relations representative SYN         Employment Rep
            employment representative SYN         EEO/AA Rep
            =(EEO) Representative
            =(AA ) Representative SYN         HR Analyst
            =HR analyst
            =HR represenative
            =HR manager SYN         Recruiter
            recruiter SYN         Benefits Analyst
            benefits analyst SYN         Compensation Rep
            compensation analyst
            compensation representative SYN         Trainer
            trainer CLASS       Buzz_Human Re_Title
            =(Classif Analyst)
            =(ER Analyst)
            =(Employment Rep)
            =(HR Analyst)
            =(Recruiter)
            =(Benefits Analyst)
            =(Compensation Rep)
            =(HR Assistant)

CLASS       Titles_Human Re
ACTION      SumMAX
            /(Buzz_Human Re_Title) [N W I] =OBJECTIVE_SECTION
```

```
SYN     Chief Counsel
        chief counsel

SYN     Corporate Counsel
        corporate counsel

SYN     Legal Advisor
        legal advisor

SYN     Patent Attorney
        patent attorney

SYN     Legal Aide
        legal aide
        legal assistant

SYN     Paralegal
        paralegal

CLASS   Buzz_Legal_Title
        =(Attorney)
        =(Chief Counsel)
        =(Corporate Counsel)
        =(Legal Advisor)
        =(Legal Advisor)
        =(Patent Attorney)
        =(Legal Aide)
        =(Paralegal)

CLASS   Titles_Legal
ACTION  SumMAX
        /Buzz_Legal_Title [N W I] =OBJECTIVE_SECTION SYN     Applications Eng
        applications engineer SYN     Div Marketing Mgr
        division marketing manager
        DMM SYN     Industry Analyst
        industry analyst SYN     Marketing Manager
        marketing manager
        marketing director SYN     Mrkt Research Analy
        market research analyst SYN     Product Manager
        product manager SYN     Product Market Mgr
        product marketing manager SYN     Product Market Eng
        product marketing -engineer SYN     Prod Mrkt Specialst
        product marketing specialist SYN     Product Planner
        product planning engineer
        product planning manager SYN     Systems Applic Eng
        systems -application -engineer
```

| | |
|---|---|
| SYN | Systems Applic Mgr<br>systems =application manager |
| SYN | Strategic Devel Eng<br>strategic development =engineer |
| SYN | Strategic Marketer<br>strategic marketing engineer<br>strategic marketing manager |
| SYN | Major Account Mgr<br>MAM'S<br>major account managers |
| CLASS | Buzz_Marketin_Title<br>=(Applications Eng)<br>=(Div Marketing Mgr)<br>=(Industry Analyst)<br>=(Major Account Mgr)<br>=(Marketing Manager)<br>=(Mrkt Research Analy)<br>=(Product Manager)<br>=(Product Market Eng)<br>=(Product Market Mgr)<br>=(Prod Mrkt Specialst)<br>=(Product Planner)<br>=(Systems Applic Eng)<br>=(Systems Applic Mgr)<br>=(Strategic Devel Eng)<br>=(Strategic Marketer) |
| CLASS<br>ACTION | Titles_Marketin<br>SumMAX<br>/Buzz_Marketin_Title [N W I] =OBJECTIVE_SECTION |
| SYN | Buyer<br>[O] =assistant buyer |
| SYN | Material Handler<br>material handler |
| SYN | Scheduler<br>Scheduler |
| SYN | reclaim<br>reclaim<br>reclamation |
| SYN | Asset Reclaim Analy<br>asset =reclaim analyst |
| SYN | Intl Capacity Plan<br>international capacity planner<br>international capacity analyst |
| SYN | Material Planner<br>material planner |
| SYN | PC Expediter<br>pc expediter |
| SYN | PC Planner<br>pc planner |
| SYN | PC Scheduler<br>pc scheduler |

| | |
|---|---|
| SYN | Planner<br>planner<br>planners |
| SYN | Prod'n Ctrl Special<br>production control specialist |
| SYN | Purchasing Agent<br>purchasing agent |
| SYN | Remarketing Analyst<br><br>remarketing analyst |
| CLASS | Buzz_Purchasi_Title<br>=(Buyer)<br>=(Inventry Ctrl Clerk)<br>=(Material Handler)<br>=(Samples Clerk)<br>=(Scheduler)<br>=(Ship & Receiv Clerk)<br>=(Asset Reclaim Analy)<br>=(Contract Admin)<br>=(Intl Capacity Plan)<br>=(Material Planner)<br>=(PC Expediter)<br>=(PC Planner)<br>=(PC Scheduler)<br>=(Planner)<br>=(Prod'n Ctrl Special)<br>=(Purchasing Agent)<br>=(Remarketing Analyst) |
| CLASS<br>ACTION | Titles_Purchasi<br>SumMAX<br>/Buzz_Purchasi_Title [N W I] =OBJECTIVE_SECTION |
| SYN | IH<br>IH<br>industrial hygienist |
| SYN | Nurse<br>nurse<br>nurses |
| SYN | Safety Engineer<br>safety =engineer |
| CLASS | Buzz_Safety_Title<br>=(IH)<br>=(Nurse)<br>=(Safety Engineer) |
| CLASS<br>ACTION | Titles_Safety<br>SumMAX<br>/Buzz_Safety_Title [N W I] =OBJECTIVE_SECTION |
| SYN | Account Admin<br>account =admin |
| SYN | Area Sales Manager<br>area sales manager |
| SYN | Distrib Sales Mgr<br>distribution sales mgr |
| SYN | District Sales Mgr<br>district sales manager |

```
SYN     Regional Sales Mgr
        regional sales manager

SYN     Sales Engineers
        sales engineer

SYN     Sales Coordinator
        sales coordinator

SYN     Customr Service Rep
        customer service rep

SYN     Inside Sales Rep
        ISR
        inside sales rep

SYN     Salesman
        salesman
        salesperson

CLASS   Buzz_Sales_Title
        =(Account Admin)
        =(Area Sales Manager)
        =(Customr Service Rep)
        =(Distrib Sales Mgr)
        =(District Sales Mgr)
        =(Inside Sales Rep)
        =(Major Account Mgr)
        =(Regional Sales Mgr)
        =(Sales Engineers)
        =(Sales Coordinator)
        =(Salesman)
        =(Field Sales Eng)
        =(Field Applic Eng)

CLASS   Titles_Sales
ACTION  SumMAX
        /Buzz_Sales_Title [N W I] =OBJECTIVE_SECTION SYN     Board Designer
        board designer SYN     Hardware Eng
        hardware designer SYN     Software Eng
        software engineer CLASS   Buzz_Software_Title
        =(Software Eng)

CLASS   Titles_Software
ACTION  SumMAX
        /Buzz_Software_Title [N W I] =OBJECTIVE_SECTION SYN     Mask Designer
        Mask designer SYN     Systems Designer
        =systems designer CLASS   Buzz_Hardware_Title
        =(CAD Applications)
        =(CAD Development)
```

```
            =(CAD Engineer)
            =(CAD Eng Manager)
            =(CAD Eng Projct Lead)
            =(CAD Eng Sect Head)
            =(CAD Operator)
            =(CAD Technician)
            =(CAE Engineer)
            =(Elec Desgn Auto Eng)
            =(Electrical Engineer)
            =(Layout Designer)
            =(Mask Designer)
            =(Mechanical CAD-CAM)
            =(Place & Route Eng)
            =(Senior CAD Eng)
            =(Analog Designer)
            =(Circuit Designer)
            =(Component Designer)
            =(Digital Designer)
            =(IC Designer)
            =(Library Development)
            =(Logic Design Eng)
            =(VLSI Design Eng)
            =(Applications Eng)
            =(Board Designer)
            =(Electronic Tech)
            =(Hardware Eng)
            =(Systems Designer)

CLASS     Titles_Hardware
  ACTION    SumMAX
            /Buzz_Hardware_Title [N W I] =OBJECTIVE_SECTION ; SYN       Above, + Project Lead, Section Hd Or Mgr
;           above, + project lead, section hd or mgr SYN       Failure Analy Eng
            failure analysis engineer SYN       qa
            qa
            quality assurance SYN       QA Engineer
            =qa =engineer SYN       qc
            qc quality control SYN       QC Engineer
            =qc =engineer SYN       Statistician
            statistician SYN       Quality Inspector
            quality [2] inspector SYN       Quality Operator
            quality [2] operator SYN       Quality Technician
            quality [2] technician CLASS     Buzz_Quality _Title
            =(Failure Analy Eng)
            =(QA Engineer)
```

```
              =(QC Engineer)
              =(Quality Inspector)
              =(Quality Operator)
              =(Quality Technician)
              =(Reliability Eng)
              =(Statistician)

CLASS      Titles_Quality
   ACTION     SumMAX
              /(Buzz_Quality _Title) [N W I] =OBJECTIVE_SECTION SYN        Assembly Technician
              assembly technician SYN        Elec-Mech Assembler
              electro [O] - =mech assembler SYN        Other_Assembler
              macro [2] Assembler
              machine language [40] Assembler
              Assembler [40] machine language
              Assembler [40] compiler
              compiler [40] assembler
              computer science [B] Assembler
              CS [B] Assembler SYN        Assembler
              Assembler [N W I] =(Assembly Language) $
        [N W I] =(Elec-Mech Assembler) [N W I] =(Other_Assembler)

SYN        equip
              equip
              equipment

SYN        Equip Mtce Tech
              =equip maintinence tech

SYN        Mark&Pack Operator
              mark =& pack operator

SYN        Mtl Finish Operator
              metal finish operator

SYN        Semi-Assembler
              semi-assembler

CLASS      Buzz_Assembly_Title
              =Assembler
              =(Assembly Technician)
              =(Elec-Mech Assembler)
              =(Equip Mtce Tech)
              =(Mark&Pack Operator)
              =(Mtl Finish Operator)
              =(Semi-Assembler)

CLASS      Titles_Assembly
   ACTION     SumMAX
              /Buzz_Assembly_Title [N W I] =OBJECTIVE_SECTION CLASS      ZERO
              xxxyyyzzzppp CLASS      Titles
              /Titles_Assembly
              /(Titles_Indust. )
              /Titles_Informat
              /Titles_Ops
```

```
            /Titles_Packagin
            /Titles_Process
            /(Titles_Product )
            /(Titles_Quality )
;           /ZERO                    do we need this ???xxxx
            /(Titles_Test Eng)
            /Titles_Clerical
            /(Titles_Advertis)
            /Titles_Faciliti
            /Titles_Finance
            /(Titles_Human Re)
            /Titles_Legal
            /Titles_Marketin
            /Titles_Purchasi
            /Titles_Safety
            /Titles_Sales
            /Titles_Hardware
            /Titles_Software CLASS       Buzz_Other
            =(Member Tech Staff)

CLASS       Known_Titles
            /Buzz_Assembly_Title
            /(Buzz_Indust. _Title)

/Buzz_Informat_Title
            /Buzz_Ops_Title
            /Buzz_Packagin_Title
            /Buzz_Process_Title
            /(Buzz_Product _Title)
            /(Buzz_Quality _Title)
            /Buzz_Software_Title
            /Buzz_Hardware_Title
            /(Buzz_Test Eng_Title)
            /Buzz_Clerical_Title
            /(Buzz_Advertis_Title)
            /Buzz_Faciliti_Title
            /Buzz_Finance_Title
            /(Buzz_Human Re_Title)
            /Buzz_Legal_Title
            /Buzz_Marketin_Title
            /Buzz_Purchasi_Title
            /Buzz_Safety_Title
            /Buzz_Sales_Title
            /Buzz_Other ; ************************************
; *              General              *
; ************************************

SYN         Leader
            leader

SYN         Supervisor
            supervisor!1

CLASS       Titles_General
            =Auditor
            =Manager
            =Leader
            =Supervisor
            director!1
            president!1
            secretary!2
            clerk
            receptionist!1
            Intern
```

```
        hire
        processor
        counselor
        head
        engineer
        designer
        administrator!1
        executive!1
        programmer
        technician!2
        researcher
        analyst!1
        =Accountant
        buyer purchaser
        salesman
        marketeer
        scientist
        aide
        operator
        planner
        assistant
        salesperson
        teacher
        consultant
        professor
        instructor
        controller
        comptroller
        coordinator
        specialist
        Tester
        scheduler
        assembler
        drafter
        representative
        trainer CLASS   Name_Header
        resume!2
        personal!1
        data
        profile!1
        record!1
        name
        summary
        r e s u m e
        information
        of CLASS   BEG_DELIMITER
        /Company [W I] =EXPERIENCE_SECTION
        /NUMBER2A [W I] =EXPERIENCE_SECTION
        /NUMBER3A [W I] =EXPERIENCE_SECTION
        /NUMBER4A [W I] =EXPERIENCE_SECTION
        /NUMBER5A [W I] =EXPERIENCE_SECTION
        /MONTH [W I] =EXPERIENCE_SECTION
        /SEASON_YEAR [W I] =EXPERIENCE_SECTION
        /EOL [W I] =EXPERIENCE_SECTION
        present [W I] =EXPERIENCE_SECTION
        \ [W I] =EXPERIENCE_SECTION
        | [W I] =EXPERIENCE_SECTION
        , [W I] =EXPERIENCE_SECTION
        . [W I] =EXPERIENCE_SECTION
        ; [W I] =EXPERIENCE_SECTION
        : [W I] =EXPERIENCE_SECTION
        ] [W I] =EXPERIENCE_SECTION
```

```
        ) [W I] =EXPERIENCE_SECTION
        - [W I] =EXPERIENCE_SECTION
        a [W I] =EXPERIENCE_SECTION in [W I] =EXPERIENCE_SECTION
        an [W I] =EXPERIENCE_SECTION
        title [W I] =EXPERIENCE_SECTION CLASS   END_DELIMITER
        /Company [W I] =EXPERIENCE_SECTION
        /NUMBER2A [W I] =EXPERIENCE_SECTION
        /NUMBER3A [W I] =EXPERIENCE_SECTION
        /NUMBER4A [W I] =EXPERIENCE_SECTION
        /NUMBER5A [W I] =EXPERIENCE_SECTION
        /MONTH [W I] =EXPERIENCE_SECTION
        /SEASON_YEAR [W I] =EXPERIENCE_SECTION
        present [W I] =EXPERIENCE_SECTION
        /EOL [W I] =EXPERIENCE_SECTION
        \ [W I] =EXPERIENCE_SECTION
        | [W I] =EXPERIENCE_SECTION
        , [W I] =EXPERIENCE_SECTION
        . [W I] =EXPERIENCE_SECTION
        ; [W I] =EXPERIENCE_SECTION
        : [W I] =EXPERIENCE_SECTION
        ( [W I] =EXPERIENCE_SECTION
        [ [W I] =EXPERIENCE_SECTION
        - [W I] =EXPERIENCE_SECTION
        at [W I] =EXPERIENCE_SECTION
        with [W I] =EXPERIENCE_SECTION
        for [W I] =EXPERIENCE_SECTION
        position [W I] =EXPERIENCE_SECTION CLASS   Phrase
ACTION  GetProperNoun
        [I] /BEG_DELIMITER [* B F I] /END_DELIMITER $
  [C I] /Titles_General CLASS   DummyPhrase
        /Phrase [N C I] /BEG_DELIMITER CLASS   TestBeforePhrase
        [I] /BEG_DELIMITER [* B F I] /END_DELIMITER $
  [C I] /Titles_General CLASS   TestPhrase
        /Phrase SYN     StartPr
        /BEG_DELIMITER [B F] /BEG_DELIMITER SYN     PossPh
        /BEG_DELIMITER [B F] position [N C I] =StartPr $
  [W I] =EXPERIENCE_SECTION CLASS   Phrase2
ACTION  GetProperNoun
        [I] /BEG_DELIMITER [* B F I] position [W I] =PossPh CLASS   DummyPhrase2
        /Phrase2 [N C I] /BEG_DELIMITER Mar 30 20:52 1989  titles.def Page 27

CLASS   Other_Titles
        /DummyPhrase [C I] /Titles_General [N C I] /Titles
```

```
           /DummyPhrase2 [N C I] /Titles
 ;         /DummyPhrase2 [C I] /Titles_General [N C I] /Titles
  CLASS    All_Titles
           /Known_Titles
           /Other_Titles CLASS    NonName_Titles
           /Known_Titles
           /Titles_General
           /Name_Header
           =END_HEADER [W] =LINE uses    system.def
  SYN      AL
           Al
           alabama!2

SYN      AK
           ak
           alaska!2

SYN      AZ
           az
           arizona!2

SYN      AR
           ar
           arkansas!2

SYN      CA
           ca
           california!2
           calif

SYN      CO
           Co
           Colorado!2

SYN      CT
           ct
           connecticut!2

SYN      DE
           De
           delaware!2

SYN      DC
           dc
           district of columbia!2

SYN      FL
           fl
           florida!2

SYN      GA
           ga
           georgia!2

SYN      HI
           hi
           hawaii!2

SYN      ID
           id
           idaho!1

SYN      IL
           il
```

```
              illinois!2

SYN   IN
          In
          indiana!2

SYN   IA
          ia
          iowa!1

SYN   KS
          ks
          kansas!1

SYN   KY
          ky
          kentucky!2

SYN   LA
          La
          louisiana!2

SYN   ME
          Me
          Maine!1

SYN   MD
          md
          maryland!2

SYN   MA
          ma
          mass
          massachusetts!3

Syn   MI
          mi
          mich
          michigan!2

SYN   MN
          mn
          minn
          minnesota!2

SYN   MS
          ms
          miss
          mississippi!3

Syn   MO
          mo
          missouri!2

SYN   MT
          mt montana!2

SYN   NE
          ne
          nebraska!2

SYN   NV
          nv
          nevada!2
```

| | | |
|---|---|---|
| SYN | NH | |
| | nh | |
| | new!1 Hampshire!2 | |

| | | |
|---|---|---|
| SYN | NJ | |
| | nj | |
| | new!1 jersey!1 | |

| | | |
|---|---|---|
| SYN | NM | |
| | nm | |
| | new!1 mexico!1 | |

| | | |
|---|---|---|
| SYN | NY | |
| | ny | |
| | new!1 york!1 | |

| | | |
|---|---|---|
| SYN | NC | |
| | nc | |
| | north!1 carolina!2 | |
| | n [1] carolina!2 | |

| | | |
|---|---|---|
| SYN | ND | |
| | nd | |
| | north!1 dakota!2 | |
| | n [1] dakota!2 | |

| | | |
|---|---|---|
| SYN | OH | |
| | oh | |
| | ohio!1 | |

| | | |
|---|---|---|
| SYN | OK | |
| | ok | |
| | oklahoma!2 | |

| | | |
|---|---|---|
| SYN | OR | |
| | Or | |
| | oregon!1 | |

| | | |
|---|---|---|
| SYN | PA | |
| | pa | |
| | penn | |
| | pennsylvania!2 | |

| | | |
|---|---|---|
| SYN | RI | |
| | ri | |
| | rhode!1 island!1 | |

| | | |
|---|---|---|
| SYN | SC | |
| | sc | |
| | south!1 carolina!2 | |
| | s [1] carolina!2 | |

| | | |
|---|---|---|
| SYN | SD | |
| | sd | |
| | south!1 dakota!2 | |
| | s [1] dakota!2 | |

| | | |
|---|---|---|
| SYN | TN | |
| | tn | |
| | tenn | |
| | tennessee!2 | |

| | | |
|---|---|---|
| SYN | TX | |
| | tx | |
| | texas!1 | |

| | | |
|---|---|---|
| SYN | UT | |

```
            ut
            utah!1

SYN         VT
            vt
            vermont!2

SYN         VA
            va
            virginia!2

SYN         WA
            wa
            washington!2

SYN         WV
            wv
            west!1 virginia!2

SYN         WI
            wi
            wisconsin!2

SYN         WY
            wy
            wyoming!2

CLASS       STATE
            =AL
            =AK
            =AZ
            =AR
            =CA
            =CO
            =CT

=DE
            =DC
            =FL
            =GA
            =HI
            =ID
            =IL
            =IN
            =IA
            =KS
            =KY
            =LA
            =ME
            =MD
            =MA
            =MI
            =MN
            =MS
            =MO
            =MT
            =NE
            =NV
            =NH
            =NJ
            =NM
            =NY
            =NC
            =ND
            =OH
            =OK
            =OR
            =PA
```

```
=RI
=SC
=SD
=TN
=TX
=UT
=VT
=VA
=WA
=WV
=WI
=WY uses sections.def
uses common.def
#uses buzz.def

SYN     Adjudicate
        adjudicate

SYN     Advise
        advise

SYN     Conflict Interest
        conflict of interest

SYN     Copyright
        copyright
        copyrights

SYN     Counsel
        counsel

SYN     Court
        court

SYN     Defend
        defend

SYN     Intellectual Prop
        intellectual property

SYN     JD Degree
        jd degree

SYN     Lawsuit
        lawsuit
        lawsuits

SYN     License Agreement
        license =agreement

SYN     Litigation
        litigate
        litigation

SYN     Patent Application
        patent =application

SYN     license
        license
        licenses

SYN     Patent License
        patent =license

SYN     Patent
        patent
        patents
```

```
SYN     Prosecute
        prosecute

SYN     Settlement
        settlement

SYN     Tech Acquisition
        technology acquisition

SYN     Tort
        tort
        torts

SYN     secret
        secret
        secrets

SYN     Trade Secret
        trade -secret

SYN     Trademark
        trademark

; begin sun
SYN     Gov't Compliance
        government compliance

SYN     Regulatory Complian
        regulatory compliance

SYN     venture
        venture
        ventures

SYN     Joint Ventures
        joint -venture

SYN     exchange
        exchange
        exchanges

SYN     Technology Exchange
        technology -exchange

SYN     assist
        assist
        assisted

SYN     Legal Assistance
        legal assistance
        legal assistant
        -assist [B F] legal [W I] -SENTENCE SYN     Legal Significance
        legal significance SYN     Legal Risk
        legal risk SYN     Standard Contract
        standard -contract SYN     Corporate Law
        corporate law
```

| | |
|---|---|
| SYN | Legal Applications<br>legal -application |
| SYN | research<br>research<br>researched<br>researching<br>researcher |
| SYN | Legal Research<br>legal -research<br>-research [B F] legal [W I] -SENTENCE |
| SYN | Contractual Terms<br>contractual terms |
| SYN | Risk Assessment<br>risk assessment |
| SYN | RFP<br>RFP<br>RFPs |
| SYN | contracting<br>contract<br>contracts<br>contracting |
| SYN | Government Contract<br>government -contracting |
| SYN | Fed Aquisition Reg<br>federal aquisition -regulation |
| SYN | Public Law<br>public -law |
| SYN | Legal<br>legal |
| SYN | Labor<br>labor |
| CLASS | Buzz_Legal_Terms<br>-(Adjudicate)<br>-(Advise) |

-(Arbitration)
-(Attorney)
-(Conflict Interest)
-(Copyright)
-(Counsel)
-(Court)
-(Defend)
-(Intellectual Prop)
-(JD Degree)
-(Labor)
-(Lawsuit)
-(Legal)
-(License Agreement)
-(Licensing)
-(Litigation)
-(Negotiations)
-(Patent Application)
-(Patent License)
-(Patent)
-(Prosecute)
-(Settlement)

```
                =(Tech Acquisition)
                =(Tort)
                =(Trade Secret)
                =(Trademark)
                =(Contract Negotia'on)
                =(Corporate Law)
                =(Contractual Terms)
                =(Gov't Compliance)
                =(Government Contract)
                =(Fed Aquisition Reg)
                =(Joint Ventures)
                =(Legal Applications)
                =(Legal Assistance)
                =(Legal Research)
                =(Legal Risk)
                =(Legal Significance)
                =(Public Law)
                =(Regulatory Complian)
                =RFP
                =(Risk Assessment)
                =(Standard Contract)
                =(Technology Exchange)

CLASS     Skill_Legal_Terms
ACTION    AtLeastSTANDARD
          /Buzz_Legal_Terms [N W I] =OBJECTIVE_SECTION CLASS     Legal Terms
ACTION    TotalSkillBuzz
          /Buzz_Legal_Terms [N W I] =OBJECTIVE_SECTION uses sections.def
uses buzz.def
#uses common.def

SYN       DODGE
          Dodge

SYN       DDA
          DDA

SYN       Automenu
          automenu

SYN       Excel
          excel

SYN       Fast Back
          fast back

SYN       Fastpak Mail
          fastpak mail

SYN       First Choice
          first choice

SYN       Framework
          framework

SYN       Harvard Graphics
          harvard graphics

SYN       Hypercard
          hypercard

SYN       Hypertext
          hypertext
```

| | |
|---|---|
| SYN | Lotus 123<br>lotus 123<br>lotus 1 |
| SYN | Macdraw<br>macdraw |
| SYN | Macpaint<br>macpaint |
| SYN | Macproject<br>macproject |
| SYN | Microsoft Works<br>microsoft works |
| SYN | Norton Utilities<br>norton utilities |
| SYN | Procomm<br>procomm |
| SYN | Quattro<br>quattro |
| SYN | Q&A<br>q&a |
| SYN | Sidekick<br>sidekick |
| SYN | Smartcom<br>smartcom |
| SYN | Supercalc<br>supercalc |
| SYN | Symphony<br>symphony |
| CLASS | Buzz_Applic<br>=Automenu<br>=DDA<br>=DODGE<br>=(Excel)<br>=(Fast Back)<br>=(Fastpak Mail)<br>=(First Choice)<br>=(Framework)<br>=(Hypercard)<br>=(Hypertext)<br>=(Lotus 123)<br>=(Macdraw)<br>=(Macpaint)<br>=(Macproject)<br>=(Microsoft Works)<br>=(Norton Utilities)<br>=(Procomm)<br>=(Quattro)<br>=(Q&A)<br>=(Sidekick)<br>=(Smartcom)<br>=(Spreadsheet)<br>=(Supercalc)<br>=(Symphony) |
| CLASS | Skill_Applic |
| ACTION | Zero<br>/Buzz_Applic [N W I] =OBJECTIVE_SECTION |

```
CLASS    SW Applications
ACTION   Zero
         /Buzz_Applic [N W I] =OBJECTIVE_SECTION SYN      Adobe Illustrator adobe illustrator SYN      Aldus Pagemaker
         aldus pagemaker SYN      Framemaker
         framemaker
         FRAME SYN      Interleaf
         interleaf SYN      Ventura
         ventura

SYN      PFS
         PFS

SYN      MacWrite
         mac write
         macwrite

SYN      Wysiwyg
         wysiwyg
         what [2] you [2] see [2] is [2] what [2] you [2] get SYN      Desktop Publisher
         desktop publisher
         desktop publishing CLASS    Buzz_Desktop
         =(Adobe Illustrator)
         =(Aldus Pagemaker)
         =(Desktop Publisher)
         =(Framemaker)
         =(Harvard Graphics)
         =(Interleaf)
         =(MacWrite)
         =(PFS)
         =(Ventura)
         =(Wysiwyg)

CLASS    Skill_Desktop
ACTION   Zero
         /Buzz_Desktop [N W I] =OBJECTIVE_SECTION CLASS    Desktop Publishers
ACTION   Zero
         /Buzz_Desktop [N W I] =OBJECTIVE_SECTION SYN      ASCII
         ASCII
         american standard code for information

SYN      API
         API

SYN      Applications
         applications
```

```
SYN     Encryption
        encryption

SYN     EBCDIC
        EBCDIC
        extended binary coded decimal interchange

SYN     Object Code
        object code

SYN     Optimization
        optimization

SYN     Source Code
        source code

SYN     User Friendly
        user friendly

SYN     Software Architect
        software architecture

SYN     Software Develop
        software [B F] =develop [W I] =SENTENCE
        =develop [B F] software [W I] =SENTENCE SYN     Software Design
        software [B F] =design [W I] =SENTENCE
        =design [B F] software [W I] =SENTENCE SYN     Software Library
        software library CLASS   Buzz_SW_Terms
        =(ASCII)
        =(API)
        =(Applications)
        =(Debugging)
        =(Documentation)
        =(Encryption)
        =(EBCDIC)
        =(Fault Tolerant)
        =(Object Code)
        =(Realtime)
        =(Simulation)
        =(Software Architect)
        =(Software Design)
        =(Software Develop)
        =(Software Library)
        =(Source Code)

CLASS   Skill_SW_Terms

ACTION  AtLeastSTANDARD
        /Buzz_SW_Terms [N W I] =OBJECTIVE_SECTION

CLASS   SW Terms
ACTION  TotalSkillBuzz
        /Buzz_SW_Terms [N W I] =OBJECTIVE_SECTION SYN     Displaywriter
        displaywriter SYN     Easywriter
        easywrite
        easywriter SYN     Full Write
        full write
```

| | | |
|---|---|---|
| SYN | Macwrite | |
| | macwrite | |
| SYN | Multimate | |
| | multimate | |
| SYN | PFS Write | |
| | pfs write | |
| SYN | Q&A Write | |
| | q&a write | |
| SYN | Samna | |
| | samna | |
| SYN | Sprint | |
| | sprint | |
| SYN | Unix Text Formatter | |
| | troff | |
| | nroff | |
| | ptroff | |
| SYN | Unix Editor | |
| | vi | |
| | ed | |
| SYN | Volkswriter | |
| | volkswriter | |
| SYN | Vydec | |
| | vydec | |
| SYN | Wang | |
| | wang | |
| SYN | Word Perfect | |
| | word perfect | |
| SYN | Wordstar | |
| | worsdstar | |
| SYN | Xerox | |
| | xerox star | |
| | xerox 850 | |
| SYN | X-Edit | |
| | x-edit | |
| SYN | [IBM] Displaywriter | |
| | displaywriter | |
| SYN | Microsoft Word | |
| | Microsoft Word | |
| | ms word | |
| | MSW | |
| SYN | troff | |
| | nroff | |
| | ptroff | |
| | troff | |
| SYN | Word Processor | |
| | word processor | |
| | word processors | |
| CLASS | Buzz_WordPro | |
| | =(Adobe Illustrator) | |

```
            =(Displaywriter)
            =(Easywriter)
            =(Full Write)
            =Macwrite
            =(Microsoft Word)
            =Multimate
            =(PFS Write)
            =(Q&A Write)
            =Samna
            =Sprint
            =troff
            =(Unix Text Formatter)
            =(Unix Editor)
            =Volkswriter
            =Vydec
            =Wang
            =(Word Perfect)
            =Wordstar
            =Xerox
            =(X-Edit)
            =([IBM] Displaywriter)
            =(Word Processor)

CLASS    Skill_WordPro
ACTION   AtLeastSTANDARD
         /Buzz_WordPro [N W I] =OBJECTIVE_SECTION Mar 30 20:49 1989  applic.def Page 7

CLASS    Word Processors
ACTION   TotalSkillBuzz
         /Buzz_WordPro [N W I] =OBJECTIVE_SECTION uses sections.def
uses common.def
#uses buzz.def

SYN      DMR
         DMR

SYN      B/I
         B ^/ I
         burn-in

SYN      Customer Samples
         customer samples

SYN      Disposition
         disposition

SYN      yield
         yields

SYN      Final Test Yield
         final test -yield

SYN      Monitoring
         monitoring

CLASS    Buzz_ProdEng_Terms
         =(ESD)
         =(DMR)
         =(CMR)
         =(Bench Test)
         =(B/I)
         =(Customer Samples)
```

```
            =(Design Verification)
            =(Device Character)
            =(Disposition)
            =(Failure Analysis)
            =(Final Test Yield)
            =(Monitoring)
            =(Yield Improvement)

CLASS    Skill_ProdEng_Terms
ACTION   AtLeastSTANDARD
         /Buzz_ProdEng_Terms [N W I] =OBJECTIVE_SECTION CLASS    Product Eng Terms
ACTION   TotalSkillBuzz
         /Buzz_ProdEng_Terms [N W I] =OBJECTIVE_SECTION uses dates.def
uses buzz.def

SYN      computer
         computer
         computers

SYN      GE Semiconductor
         ge semiconductor

SYN      INI
         ini
         industrial networking

SYN      AIDA
         aida

SYN      Terradyne
         terradyne

SYN      Analog Design Tools
         analog design tools

SYN      Apollo Computer
         apollo computer

SYN      CAD Solutions
         cad solutions

SYN      Cadence
         cadence

SYN      Cadmation
         cadmation

SYN      CAE Systems
         cae systems

SYN      Caeco
         caeco

SYN      Calay Systems
         calay systems

SYN      Calma
         calma

SYN      Case Technology
         case technology

SYN      Clarity Systems
         clarity systems

SYN      Computervision
         computervision
```

| | |
|---|---|
| SYN | Daisy Systems Corp<br>daisy systems corp |
| SYN | ECAD<br>ecad |
| SYN | EDA Systems<br>eda |
| SYN | Emerald Design Sys<br>emerald design systems |
| SYN | EZ CAD<br>ez cad |
| SYN | Factron<br>factron<br>applicon |
| SYN | Gateway Design Auto<br>gateway design automation |
| SYN | IKOS<br>ikos |
| SYN | Lattice Logic<br>lattice logic |
| SYN | Logic Automation<br>logic automation |
| SYN | Logic Modelling Sys<br>logic modelling systems |
| SYN | Matra Design Sys<br>matra design systems |
| SYN | Mentor Graphics<br>mentor graphics |
| SYN | Meta-Software<br>meta [2] software |
| SYN | Metheus-CV<br>metheus [2] cv |
| SYN | Personal CAD Sys<br>personal cad systems<br>pcad |
| SYN | Phoenix Data Sys<br>phoenix data systems |
| SYN | Procase<br>procase |
| SYN | Quadtree Corp<br>quadtree corp |
| SYN | Royal Digital Sys<br>royal digital systems |
| SYN | Rugged Digital Sys<br>rugged digital systems |
| SYN | SCSC<br>scsc<br>silicon compilers systems |
| SYN | Sda Systems<br>sda systems |

| | |
|---|---|
| SYN | Seattle Silicn Tech<br>seattle silicon technology |
| SYN | Shiva Multisystems<br>shiva multisystems |
| SYN | Silicon Graphics<br>silicon graphics |
| SYN | Silicon Solutions<br>silicon solutions<br>zycad |
| SYN | Silvaco<br>silvaco |
| SYN | Silvar Lisco<br>silvar lisco |
| SYN | Simucad<br>simucad |
| SYN | Simulog<br>simulog |
| SYN | Supercads<br>supercads |
| SYN | Synopsys<br>synopsys |
| SYN | Tangent Systems<br>tangent systems |
| SYN | Tektronix<br>tektronix |
| SYN | The CAD Group<br>the cad group |
| SYN | United Silicn Struc<br>united silicon structures |
| SYN | Valid Logic Systems<br>valid logic systems |
| SYN | Via Systems<br>via systems |
| SYN | Visionics<br>visionics |
| SYN | ZYCAD<br>zycad |
| CLASS | CAE<br>=(AIDA)<br>=(Terradyne)<br>=(Analog Design Tools)<br>=(Apollo Computer)<br>=(CAD Solutions)<br>=(Cadence)<br>=(Cadmation)<br>=(CAE Systems)<br>=(Caeco)<br>=(Calay Systems)<br>=(Calma)<br>=(Case Technology)<br>=(Clarity Systems)<br>=(Computervision)<br>=(Daisy Systems Corp) |

- (ECAD)
- (EDA Systems)
- (Emerald Design Sys)
- (EZ CAD)
- (Factron)
- (Gateway Design Auto)
- (IKOS)
- (Lattice Logic)
- (Logic Automation)
- (Logic Modelling Sys)
- (Matra Design Sys)
- (Mentor Graphics)
- (Meta-Software)
- (Metheus-CV)
- (Personal CAD Sys)
- (Phoenix Data Sys)
- (Procase)
- (Quadtree Corp)
- (Royal Digital Sys)
- (Rugged Digital Sys)
- (SCSC)
- (Sda Systems)
- (Seattle Silicn Tech)
- (Shiva Multisystems)
- (Silicon Graphics)
- (Silicon Solutions)
- (Silvaco)
- (Silvar Lisco)
- (Simucad)
- (Simulog)
- (Supercads)
- (Synopsys)
- (Tangent Systems)
- (Tektronix)
- (The CAD Group)
- (United Silicn Struc)
- (Valid Logic Systems)
- (Via Systems)
- (Visionics)
- (ZYCAD)

SYN    Camdesigns
        camdesigns

SYN    Consilium
        consilium

SYN    PROMIS
        promis

SYN    QRONOS
        qronos

CLASS  CIM
- (Camdesigns)
- (Consilium)
- (PROMIS)
- (QRONOS)

SYN    3COM
        3com

SYN    Banyan Systems
        banyan systems

SYN    Bridge Comm
        bridge communications

SYN    CE Network Systems
        ce network systems

| | |
|---|---|
| SYN | Corvus Systems<br>corvus systems |
| SYN | CXI<br>cxi |
| SYN | David Systems<br>david systems |
| SYN | DSC<br>dsc |
| SYN | Excelan<br>excelan |
| SYN | Nestar<br>nestar<br>dsc |
| SYN | NET<br>NET<br>Network Equipment |
| SYN | Network Gen'l Corp<br>network general |
| SYN | Novell<br>novell |
| SYN | Novellus<br>novellus |
| SYN | Synoptics<br>synoptics |
| SYN | Sytek<br>sytek |
| SYN | Sun<br>sun |
| SYN | Ungermann-Bass<br>ungermann [2] bass |
| CLASS | LAN<br>=(3COM)<br>=(Banyan Systems)<br>=(Bridge Comm)<br>=(CE Network Systems)<br>=(Corvus Systems)<br>=(CXI)<br>=(David Systems)<br>=(DSC)<br>=(Excelan)<br>=(INI)<br>=(Nestar)<br>=(NET)<br>=(Network Gen'l Corp)<br>=(Novell)<br>=(Novellus)<br>=(Synoptics)<br>=(Sytek)<br>=(Sun)<br>=(Ungermann-Bass) |
| SYN | Abb Hafo<br>abb hafo |
| SYN | Acrian<br>acrian |

SYN     Actel Corp
        actel corp

SYN     Adv Linear Devices
        advanced linear devices

SYN     Alliance Semi
        alliance semiconductor

SYN     Alphatron
        alphatron

SYN     Altera Semi
        altera semiconductor

SYN     AMCC
        amcc
        applied microcircuits

SYN     AMD
        amd
        advanced micro devices

SYN     AMI
        ami

SYN     Analog Devices
        analog devices

SYN     Anthem Electronics
        anthem electronics

SYN     Array Technology
        array technology

SYN     Arrow Electronics
        arrow electronics

SYN     Aspen Semi
        aspen semiconductor

SYN     AT&T
        at&t
        american telephone and telegraph

SYN     ATMEL
        atmel

SYN     Avantek
        avantek

SYN     Barvon Research
        barvon research

SYN     Bipolar Integ Tech
        bipolar integ tech

SYN     Brooktree Corp
        brooktree

SYN     Burr-Brown
        burr-brown

SYN     California Devices
        california devices

SYN     Calif Micro Devices
        california micro devices

SYN     Calogic Corp
        calogic corp

| | | |
|---|---|---|
| SYN | Catalyst Semi<br>catalyst semiconductor | |
| SYN | Cermetek Microelect<br>cermetek microelectronics | |
| SYN | Cherry Semi<br>cherry semiconductor | |
| SYN | &<br>&<br>and | |
| SYN | Chips & Tech<br>chips =& technologies | |
| SYN | Cirrus Logic<br>cirrus logic | |
| SYN | CITEL<br>citel | |
| SYN | Commodore<br>commodore | |
| SYN | Crystal Semi Corp<br>crystal semiconductor | |
| SYN | Custom Arrays Corp<br>custom arrays | |
| SYN | Custom Mos Arrays<br>custom mos arrays | |
| SYN | Custom Silicon<br>custom silicon | |
| SYN | Cypress<br>cypress | |
| SYN | Dallas Semi Corp<br>dallas semiconductor | |
| SYN | Data General<br>data general | |
| SYN | Data Linear Corp<br>data linear corp | |
| SYN | DEC<br>dec [N W I] /DATE<br>digital equipment | |
| SYN | ECI Semiconductor<br>eci semiconductor | |
| SYN | EG&G Reticon<br>eg&g reticon | |
| SYN | Elantec<br>elantec | |
| SYN | Electronic Designs<br>electronic designs | |
| SYN | European Silicon<br>european silicon | |
| SYN | EXAR<br>exar | |
| SYN | Exel Micro<br>exel micro | |

| | |
|---|---|
| SYN | Fairchild<br>fairchild |
| SYN | Faraday Electronics<br>faraday electronics |
| SYN | Focus Semi Systems<br>focus semi systems |
| SYN | Ford Microelectron<br>ford microelectron |
| SYN | Fujitsu Microelect<br>fujitsu microelectronics |
| SYN | G2<br>g2 |
| SYN | Gain Electronics<br>gain electronics |
| SYN | Gazelle Microcirc<br>gazelle microcircuits |
| SYN | GE Corporate R&D<br>ge corporate r&d |
| SYN | GE Microelectronics<br>ge microelectronics |
| SYN | General Instruments<br>general instruments |
| SYN | General Semi Ind<br>general semi ind |
| SYN | GESS<br>gess |
| SYN | Gigabit Logic<br>gigabit logic |
| SYN | Goldstar Tech<br>goldstar tech |
| SYN | Gould<br>gould |
| SYN | Hamilton/Avnet<br>hamilton [2] avnet |
| SYN | Harris Microwv Semi<br>harris microwave semiconductor |
| SYN | Harris Semi<br>harris [N] microwave semiconductor |
| SYN | Hilevel Technology<br>hilevel technology |
| SYN | Hitachi Semi<br>hitachi semiconductor |
| SYN | Holt ICs<br>holt integrated circuits |
| SYN | Honeywell GaAs Prod<br>honeywell gaas production |
| SYN | Honeywell<br>honeywell |

| | | |
|---|---|---|
| SYN | Hughes Aircraft | |
| | hughes aircraft | |
| SYN | Hytek Microsystems | |
| | hytek microsystems | |
| SYN | Hyundai | |
| | hyundai | |
| SYN | IBM | |
| | ibm | |
| SYN | IC Solutions | |
| | ic solutions | |
| SYN | ICI Array Tech | |
| | ici array tech | |
| SYN | ICI Integrated Ckt | |
| | ici integrated circuits | |
| SYN | IDT | |
| | idt | |
| | integrated device technology | |
| SYN | IMI | |
| | imi | |
| | international microcircuits | |
| SYN | IMP | |
| | imp | |
| | international microelectronics | |
| SYN | INMOS | |
| | inmos | |
| SYN | Inova Microelectron | |
| | inova microelectronics | |
| SYN | Integrated Cmos Sys | |
| | integrated cmos systems | |
| SYN | Integratd Logic Sys | |
| | integrated logic systems | |
| SYN | Integrted Pwr Semi | |
| | integrated power semiconductors | |
| SYN | Intel | |
| | intel | |
| SYN | Interact | |
| | interact | |
| SYN | Intercept Microelec | |
| | intercept microelectronics | |
| SYN | Interdesign | |
| | interdesign | |
| SYN | Int'l Cmos Tech | |
| | international cmos | |
| SYN | Int'l Rectifier | |
| | international rectifier | |
| SYN | Intersil | |
| | intersil | |
| SYN | Invest Mgmt Int'l | | investment management international
zytrex

SYN ITT Semiconductors
itt semiconductors

SYN IXYS Corp
ixys

SYN Krysalis Corp
krysalis

SYN Lansdale Semi
lansdale semiconductor

SYN Lattice Semi Corp
lattice semiconductor

SYN Linear Tech Corp
linear technology

SYN Litronix
litronix

SYN Logic Devices
logic devices

SYN LSI Logic
lsi logic

SYN Marconi Elec Dev
marconi elec devices

SYN MAXIM
maxim

SYN MCE
mce

SYN Micrel
micrel

SYN Micro Linear Corp
micro linear corp

SYN Micro Lsi Corp
micro lsi corp

SYN Micro Power Systems
micro power systems

SYN Micro-Rel
micro-rel

SYN Microchip Tech
microchip technology

SYN Micron Tech
micron technology

SYN Microwave Monolith
microwave monolithics

SYN Microwave Semi
microwave semiconductor

SYN Mitel
mitel

SYN Mitsubishi Elect
mitsubishi electronics

| | |
|---|---|
| SYN | Raytheon<br>raytheon |
| SYN | Rca Corp<br>rca |
| SYN | Ricoh Corp<br>ricoh corporation |
| SYN | Rockwell Int Corp<br>rockwell international |
| SYN | Rohm Corp<br>rohm corporation |
| SYN | Ross Technology<br>ross technology |
| SYN | S-MOS Systems<br>s [2] mos systems |
| SYN | Sahni Corp<br>sahni |
| SYN | Samsung Semi<br>samsung semiconductor |
| SYN | Saratoga Semi<br>saratoga semiconductor |
| SYN | SEEQ<br>seeq |
| SYN | Sematech<br>sematech |
| SYN | SGS Semi Corp<br>sgs semiconductor |
| SYN | SGS Tmomson<br>sgs tmomson |
| SYN | Siemens Components<br>siemens components |
| SYN | Sierra Semi<br>sierra semiconductor |
| SYN | Signetics<br>signetics |
| SYN | Silicon Macrosystem<br>silicon macrosystem |
| SYN | Silicon Systems<br>silicon systems |
| SYN | Siliconix<br>siliconix |
| SYN | Solid State Scien<br>solid state scientific |
| SYN | Solid State Tech<br>solid state technology |
| SYN | Sprague Solid State<br>sprague solid state |
| SYN | Standard Microsys<br>standard microsystems |
| SYN | Supertex |

SYN   Modular Semi
      modular semiconductor

SYN   Monolithic Memories
      monolithic memories

SYN   Morgan Semi
      morgan semiconductor

SYN   Mosel
      mosel

SYN   Mostek Corp
      mostek

SYN   Motorola
      motorola

SYN   Multichip Tech
      multichip technology

SYN   National Semi
      national semiconductor

SYN   NCR Microelectron
      ncr microelectronics

SYN   NEC
      nec

SYN   OKI Semiconductor
      oki semiconductor

SYN   Orbit Semiconductor
      orbit semiconductor

SYN   Pacific Monolithics
      pacific monolithic

SYN   Panasonic
      panasonic

SYN   Panatech Semi
      panatech semiconductor

SYN   Performnc Semi Corp
      performance semiconductor

SYN   Phillips Labs
      phillips labs

SYN   Plessey
      plessey

SYN   PLX Technology
      plx technology

SYN   Polycore Electronic
      polycore electronics

SYN   Power Integrations
      power integrations

SYN   Precision Monolith
      precision monolith

SYN   Prentice
      prentice

SYN   Quasel
      quasel supertex

SYN     Synertek
        synertek

SYN     Tachonics Corp
        tachonics corp

SYN     Taiwan Semi Mftg
        taiwan semiconductor manufacturing

SYN     Teledyne
        teledyne

SYN     Telmos
        telmos

SYN     Texas Instruments
        texas instruments

SYN     Thomson Components
        thomson components

SYN     Three Five Semi
        three five semiconductor

SYN     Toshiba America
        toshiba america

SYN     Trilogy
        trilogy

SYN     Triquint Semi
        triquint semiconductor

SYN     Tristar
        tristar

SYN     TRW
        trw

SYN     Unicorn Microelect
        unicorn microelectronics

SYN     UNISYS
        unisys

SYN     United Tech Micro
        united technologies microelectronics

SYN     Unitrode
        unitrode

SYN     Universal
        universal

SYN     Vadem
        vadem

SYN     Visic
        visic

SYN     Vitelic Corp
        vitelic

SYN     Vitesse Elect Corp
        vitesse electronics

SYN     VLSI Standards
        vlsi standards

SYN     VLSI Technology

|       |                                  |
|-------|----------------------------------|
|       | vlsi technology                  |
|       | vti                              |
| SYN   | VTC                              |
|       | vtc                              |
|       | vhsic technology                 |
| SYN   | Waferscale Integrat              |
|       | waferscale integration           |
| SYN   | Weitek                           |
|       | weitek                           |
| SYN   | Western Digital                  |
|       | western digital                  |
| SYN   | Western Microtech                |
|       | western microtechnology          |
| SYN   | White Technologies               |
|       | white technologies               |
| SYN   | Xicor                            |
|       | xicor                            |
| SYN   | Xilinx                           |
|       | xilinx                           |
| SYN   | Zilog                            |
|       | zilog                            |
| SYN   | Zoran                            |
|       | zoran                            |
| SYN   | Zymos                            |
|       | zymos                            |
| SYN   | Zytrex                           |
|       | zytrex                           |
| CLASS | Semiconductors                   |
|       | =(Abb Hafo)                      |
|       | =(Acrian)                        |
|       | =(Actel Corp)                    |
|       | =(Adv Linear Devices)            |
|       | =(Alliance Semi)                 |
|       | =(Alphatron)                     |
|       | =(Altera Semi)                   |
|       | =(AMCC)                          |
|       | =(AMD)                           |
|       | =(AMI)                           |
|       | =(Analog Devices)                |
|       | =(Anthem Electronics)            |
|       | =(Array Technology)              |
|       | =(Arrow Electronics)             |
|       | =(Aspen Semi)                    |
|       | =(AT&T)                          |
|       | =(ATMEL)                         |
|       | =(Avantek)                       |
|       | =(Barvon Research)               |
|       | =(Bipolar Integ Tech)            |
|       | =(Brooktree Corp)                |
|       | =(Burr-Brown)                    |
|       | =(California Devices)            |
|       | =(Calif Micro Devices)           |
|       | =(Calogic Corp)                  |
|       | =(Catalyst Semi)                 |
|       | =(Cermetek Microelect)           |
|       | =(Cherry Semi)                   |
|       | =(Semiconductor)                 |
|       | =(Chips & Tech)                  |
|       | =(Cirrus Logic)                  |

- (CITEL)
- (Commodore)
- (Crystal Semi Corp)
- (Custom Arrays Corp)
- (Custom Mos Arrays)
- (Custom Silicon)
- (Cypress)
- (Dallas Semi Corp)
- (Data General)
- (Data Linear Corp)
- (DEC)
- (ECI Semiconductor)
- (EG&G Reticon)
- (Elantec)
- (Electronic Designs)
- (European Silicon)
- (EXAR)
- (Exel Micro)
- (Fairchild)
- (Faraday Electronics)
- (Focus Semi Systems)
- (Ford Microelectron)
- (Fujitsu Microelect)
- (G2)
- (Gain Electronics)
- (Gazelle Microcirc)
- (GE Corporate R&D)
- (GE Microelectronics)
- (GE Semiconductor)
- (General Instruments)
- (General Semi Ind)
- (GESS)
- (Gigabit Logic)
- (Goldstar Tech)
- (Gould)
- (Hamilton/Avnet)
- (Harris Microwv Semi)
- (Harris Semi)
- (Hewlett Packard)
- (Hilevel Technology)
- (Hitachi Semi)
- (Holt ICs)
- (Honeywell GaAs Prod)
- (Honeywell)
- (Hughes Aircraft)
- (Hytek Microsystems)
- (Hyundai)
- (IBM)
- (IC Solutions)
- (ICI Array Tech)
- (ICI Integrated Ckt)
- (IDT)
- (IMI)
- (IMP)
- (INI)
- (INMOS)
- (Inova Microelectron)
- (Integrated Cmos Sys)
- (Integratd Logic Sys)
- (Integrted Pwr Semi)
- (Intel)
- (Interact)
- (Intercept Microelec)
- (Interdesign)
- (Interdesign)
- (Int'l Cmos Tech)
- (Int'l Rectifier)
- (Intersil)
- (Invest Mgmt Int'l)
- (ITT Semiconductors)
- (IXYS Corp)
- (Krysalis Corp)

=(Lansdale Semi)
=(Lattice Semi Corp)
=(Linear Tech Corp)
=(Litronix)
=(Logic Devices)
=(LSI Logic)
=(Marconi Elec Dev)
=(Matra Design Sys)
=(MAXIM)
=(MCE)
=(Micrel)
=(Micro Linear Corp)
=(Micro Lsi Corp)
=(Micro Power Systems)
=(Micro-Rel)
=(Microchip Tech)
=(Microchip Tech)
=(Micron Tech)
=(Microwave Monolith)
=(Microwave Semi)
=(Mitel)
=(Mitsubishi Elect)
=(Modular Semi)
=(Monolithic Memories)
=(Morgan Semi)
=(Mosel)
=(Mostek Corp)
=(Motorola)
=(Multichip Tech)
=(National Semi)
=(NCR Microelectron)
=(NEC)
=(OKI Semiconductor)
=(Orbit Semiconductor)
=(Pacific Monolithics)
=(Panasonic)
=(Panatech Semi)
=(Performnc Semi Corp)
=(Phillips Labs)
=(Plessey)
=(PLX Technology)
=(Polycore Electronic)
=(Power Integrations)
=(Precision Monolith)
=(Prentice)
=(Quasel)
=(Raytheon)
=(Rca Corp)
=(Ricoh Corp)
=(Rockwell Int Corp)
=(Rohm Corp)
=(Ross Technology)
=(S-MOS Systems)
=(Sahni Corp)
=(Samsung Semi)
=(Saratoga Semi)
=(SEEQ)
=(Sematech)
=(Semiconductor)
=(SGS Semi Corp)
=(SGS Tmomson)
=(Siemens Components)
=(Sierra Semi)
=(Signetics)
=(Silicon Macrosystem)
=(Silicon Systems)
=(Siliconix)
=(Solid State Scien)
=(Solid State Tech)
=(Sprague Solid State)
=(Standard Microsys)
=(Supertex)

=(Synertek)
=(Tachonics Corp)
=(Taiwan Semi Mftg)
=(Teledyne)
=(Telmos)
=(Texas Instruments)
=(Thomson Components)
=(Three Five Semi)
=(Toshiba America)
=(Trilogy)
=(Triquint Semi)
=(Tristar)
=(TRW)
=(Unicorn Microelect)
=(UNISYS)
=(United Tech Micro)
=(Unitrode)
=(Universal)
=(Vadem)
=(Visic)
=(Vitelic Corp)
=(Vitesse Elect Corp)
=(VLSI Standards)
=(VLSI Technology)
=(VTC)
=(Waferscale Integrat)
=(Weitek)
=(Western Digital)
=(Western Microtech)
=(White Technologies)
=(Xicor)
=(Xilinx)
=(Zilog)
=(Zoran)
=(Zymos)
=(Zytrex)

SYN    ACER Counterpoint
       acer counterpoint**

SYN    Adaptec
       adaptec

SYN    Altos Comp Systems
       altos comp systems

SYN    Amdahl
       amdahl

SYN    Apple
       apple

SYN    Ardent
       ardent
       dana computer

SYN    Arix
       arete systems
       arix

SYN    AST
       ast

SYN    Atari
       atari

SYN    Centigram Corp
       centigram

SYN    Compaq
       compaq

| | |
|---|---|
| SYN | Control Data Corp<br>control data corp<br>CDC |
| SYN | Convergent Tech<br>convergent technologies |
| SYN | Counterpnt Computer<br>counterpoint computer |
| SYN | Cray<br>cray |
| SYN | Elxsi<br>elxsi |
| SYN | Epson<br>epson |
| SYN | Everex<br>everex |
| SYN | Fortune<br>fortune |
| SYN | Grid<br>grid |
| SYN | Interactive Systems<br>interactive systems |
| SYN | MIPS<br>mips |
| SYN | Mountain Comp<br>mountain =computer |
| SYN | Olivetti<br>olivetti |
| SYN | Plexus Comp<br>plexus =computer |
| SYN | Pyramid<br>pyramid |
| SYN | Schlumberger<br>schlumberger |
| SYN | Storage Technology<br>storage technology |
| SYN | Sun Microsystems<br>sun microsystems |
| SYN | System Industries<br>system industries |
| SYN | Tandem Computers<br>tandem computers |
| SYN | Televideo Systems<br>televideo systems |
| SYN | Triad<br>triad |
| SYN | Unisys Corp<br>unisys corp |
| SYN | Wang Labs<br>wang labs |

SYN     Wyse Technology
        wyse technology

CLASS   Systems
        =(ACER Counterpoint)
        =(Adaptec)
        =(Altos Comp Systems)
        =(Amdahl)
        =(Apple)
        =(Ardent)
        =(Arix)
        =(AST)
        =(Atari)
        =(Centigram Corp)
        =(Commodore)
        =(Compaq)
        =(Control Data Corp)
        =(Convergent Tech)
        =(Counterpnt Computer)
        =(Cray)
        =(Elxsi)
        =(Epson)
        =(Everex)
        =(Fortune)
        =(Grid)
        =(Hewlett Packard)
        =(Interactive Systems)
        =(MIPS)
        =(Mountain Comp)
        =(Olivetti)
        =(Plexus Comp)
        =(Pyramid)
        =(Schlumberger)
        =(Storage Technology)
        =(Sun Microsystems)
        =(System Industries)
        =(Tandem Computers)
        =(Televideo Systems)
        =(Triad)
        =(Unisys Corp)
        =(Wang Labs)
        =(Wyse Technology)

SYN     Genrad
        genrad

SYN     Megatest
        megatest

CLASS   Systems/Ate
        =(Genrad)
        =(Megatest)

SYN     Equatorial
        equatorial

SYN     Mcdonnell Douglas
        mcdonnell douglas

SYN     Racal Vadic
        racal vadic

SYN     Rolm
        rolm

CLASS   Systems/Com
        =(Equatorial)
        =(Mcdonnell Douglas)
        =(Racal Vadic)
        =(Rolm)

| | |
|---|---|
| SYN | Connor Peripherals<br>connor peripherals |
| SYN | Maxtor<br>maxtor |
| SYN | Priam Corp<br>priam corp |
| SYN | Quantum<br>quantum |
| SYN | Seagate<br>seagate |
| CLASS | Systems/DD<br>=(Connor Peripherals)<br>=(Maxtor)<br>=(Priam Corp)<br>=(Quantum)<br>=(Seagate) |
| SYN | Boeing<br>boeing |
| SYN | FMC<br>fmc |
| SYN | GTE<br>gte |
| SYN | Kaiser Electronics<br>kaiser electronics |
| SYN | Lockheed<br>lockheed |
| SYN | Loral<br>loral |
| SYN | Singer Link<br>singer link |
| CLASS | Systems/Def<br>=(Boeing)<br>=(FMC)<br>=(GTE)<br>=(Kaiser Electronics)<br>=(Lockheed)<br>=(Loral)<br>=(Singer Link) |
| SYN | Wollongong<br>wollongong |
| CLASS | Systems/LAN<br>=(Wollongong) |
| SYN | Datacopy<br>datacopy |
| SYN | Dest Corp<br>dest |
| CLASS | Systems/OCR<br>=(Datacopy)<br>=(Dest Corp) |

| | |
|---|---|
| SYN | Applied Materials<br>applied materials |
| SYN | ASM Litho<br>asm litho |
| SYN | EATON<br>eaton |
| SYN | KLA<br>kla |
| SYN | Perkin Elmer<br>perkin elmer |
| SYN | Silicon Valley Grp<br>silicon valley group |
| SYN | Varian<br>varian |
| CLASS | Systems/Semiequi<br>=(Applied Materials)<br>=(ASM Litho)<br>=(EATON)<br>=(KLA)<br>=(Perkin Elmer)<br>=(Silicon Valley Grp)<br>=(Varian) |
| SYN | Adobe<br>adobe |
| SYN | Ashton/Tate<br>ashton [2] tate |
| SYN | Borland<br>borland |
| SYN | Computer Assoc<br>computer association |
| SYN | Lotus<br>lotus |
| SYN | Metaphor<br>metaphor |
| SYN | Microport Systems<br>microport systems |
| SYN | Micropro<br>micropro |
| SYN | Microsoft<br>microsoft |
| SYN | co<br>co<br>corp<br>inc<br>corporation |
| SYN | Software Publishing<br>software publishing =co |
| SYN | Symantec<br>symantec |
| SYN | SCO<br>the santa cruz operation |

```
SYN     Touch Communication
        touch communications

SYN     Unisoft
        unisoft

SYN     Word Perfect
        word perfect

CLASS   Systems/SW
        =(Adobe)
        =(Ashton/Tate)
        =(Borland)
        =(Computer Assoc)
        =(Lotus)
        =(Metaphor)
        =(Microport Systems)
        =(Micropro)
        =(Microsoft)
        =(Software Publishing)
        =(Symantec)
        =(SCO)
        =(Touch Communication)
        =(Unisoft)
        =(Word Perfect)

SYN     Britton Lee
        britton lee

SYN     Informix
        informix

SYN     Oracle
        oracle

SYN     RTI
        rti
        relational technology

SYN     Sybase
        sybase

SYN     Unify
        unify

CLASS   Systems/SW/RDBMS
        =(Britton Lee)
        =(Informix)
        =(Oracle)
        =(RTI)
        =(Sybase)
        =(Unify)

SYN     Boreland
        boreland

CLASS   Company
        =(Apollo Computer)
        =Cadence
        =(Daisy Systems Corp)
        =(Mentor Graphics)
        =(Silicon Graphics)
        =(Valid Logic Systems)
        =3COM
        =Novell
        =AMD
        =(Analog Devices)
        =(Chips & Tech)
        =Cypress
        =(Fujitsu Microelect)
        =(GE Semiconductor)
```

```
=(Harris Semi)
=(Hewlett Packard)
=(Hitachi Semi)
=IDT
=Intel
=(LSI Logic)
=(Microchip Tech)
=(Mitsubishi Elect)
=(Monolithic Memories)
=(Motorola)
=(National Semi)
=NEC
=(SGS Semi Corp)
=(Signetics)
=(Silicon Systems)
=(Texas Instruments)
=(Toshiba America)
=(VLSI Technology)
=Zilog
=Amdahl
=Apple
=MIPS
=(Sun Microsystems)
=(Tandem Computers)
=Seagate
=Boreland
=(Computer Assoc)
=Microsoft
=Oracle
/(Systems/SW/RDBMS)
/(Systems/SW)
/(Systems/Semiequi)
/(Systems/OCR)
/(Systems/LAN)
/(Systems/Def)
/(Systems/DD)
/(Systems/Com)
/(Systems/Ate)
/(Systems)
/(Semiconductors)
/(LAN)
/(CAE)
/(CIM)
uses sections.def SYN     division manager
        division manager SYN     NonManager
        database
        file
        systems
        system
        presentation
        data base SYN     Manager
        [N I] =NonManager [2] manager $
  [N W I] =(division manager)
        supervisor
        foreman
        section head
        department head
        project leader SYN     Executive
        director
        vice president [W I] =EXPERIENCE_SECTION
        V.P. [W I] =EXPERIENCE_SECTION
        chief executive officer
        CEO
```

```
                president [W I] =EXPERIENCE_SECTION
                chief operations officer
                chief financial officer
                CFO
                COO
                division head
                =(division manager)

CLASS     Buzz_Management
                =Manager
                =Executive

CLASS     Skill_Management
ACTION    AtLeastSTANDARD
                /Buzz_Management   [N W I] =OBJECTIVE_SECTION CLASS     Management
ACTION    TotalSkillBuzz
                /Buzz_Management [N W I] =OBJECTIVE_SECTION uses common.def
uses sections.def

; this file should contain all synonyms common to
; two or more files

SYN       OSHA
                OSHA
                occupational safety =& health =admin SYN       programming
                programming
                programmer SYN       Systems Programming
                =systems =programming SYN       Program/Analysis
                programmer [2] analyst SYN       Programming
                =programming [N W I] =(Systems Programming) $
     [N W I] =(Program/Analysis)

SYN       Circuit Simulation
                circuit simulation

SYN       Fault Simulation
                fault simulation

SYN       Logic Simulation
                logic simulation

SYN       Simulation
                simulation [N W I] =(Circuit Simulation) $
     [N W I] =(Fault Simulation) [N W I] =(Logic Simulation)

SYN       Cognos Powerhouse
                cognos powerhouse

SYN       Quiz/Quick
                quiz ^/ quick

SYN       SVID
                SVID
                system v interface definition SYN       Cross Compiler
                cross [3] =compiler SYN       Compiler Driver
                compiler =driver
```

| | |
|---|---|
| SYN | Fault Tolerant<br>fault tolerant |
| SYN | Firmware<br>firmware |
| SYN | Graphics Standards<br>=graphics =standard |
| SYN | Graphics Library<br>=graphics =library |
| SYN | Graphics<br>=graphics [N W I] =(Graphics Standards) [N W I] =(Graphics Library) |
| SYN | Human Factors<br>human factors |
| SYN | Realtime<br>realtime<br>real time |
| SYN | Spreadsheet<br>spreadsheet<br>spreadsheets |
| SYN | TSO<br>tso |
| SYN | Apollo<br>apollo |
| SYN | PC<br>PC<br>personal computer |
| SYN | IBM PC AT [80286]<br>IBMPC [2] at<br>=PC [2] at<br>80286<br>=PC [2] 286 |
| SYN | IBM PC 80386<br>80386<br>=PC [2] 386 |
| SYN | IBM PC<br>IBM =PC [N W I] =(IBM PC AT [80286])<br>IBMPC [N W I] =(IBM PC AT [80286]) |
| SYN | SUN<br>Sun |
| SYN | controller<br>controller<br>controllers |
| SYN | Disk Controller<br>Disk controller |
| SYN | Tape Controller<br>Tape controller |
| SYN | Graphic Controller<br>graphic controller |
| SYN | Micro Controller<br>micro [0] - =controller<br>microcontroller<br>microcontrollers |
| SYN | Embedded Controller<br>embedded controller |

| | | |
|---|---|---|
| SYN | Insurance<br>insurance | |
| SYN | Stock Option<br>stock =option | |
| SYN | Profit Sharing<br>profit sharing | |
| SYN | VAR<br>VAR<br>value added reseller | |
| SYN | Interview<br>interview<br>interviewed<br>interviewer<br>interviews<br>interviewing | |
| SYN | Artwork<br>artwork | |
| SYN | Facility Planning<br>=facility planning<br>=facility design | |
| SYN | Human Factors Eng<br>human factors =engineer | |
| SYN | NCP<br>NCP<br>network control program | |
| SYN | Shell Script<br>shell script<br>shell scripts | |
| SYN | Script<br>script [N W I] =(Shell Script) | |
| SYN | inter<br>inter<br>internal<br>internet | |
| SYN | TCP/IP<br>TCP<br>transaction control processor<br>=inter protocol | |
| SYN | VTAM<br>VTAM<br>virtual telecomm access method | |
| SYN | Labor Arbitration<br>labor [B F] =arbitration [W I] =SENTENCE<br>=arbitration [B F] labor [W I] =SENTENCE | |
| SYN | Arbitration<br>=arbitration [N W I] =(Labor Arbitration) | |
| SYN | GL<br>GL<br>generation =language | |
| SYN | 4-Gl<br>4 [2] =GL<br>4th =GL | |
| SYN | GPL<br>gpl | |

```
SYN     Union Negotia'on
        union [1] negotiations
        union [1] =contract SYN     Union
        union [N W I] =(Union Negotia'on)
        unions SYN     Contract Negotia'on
        =negotiate [1] =contract
        =contract [1] =negotiate SYN     Negotiations
        =negotiate [N W I] =(Union Negotia'on) $
 [N W I] =(Contract Negotia'on)

SYN     Business Plan
        business [B F] =plan [W I] =SENTENCE
        =plan [B F] business [W I] =SENTENCE SYN     Cash Forecasting
        cash forecasting SYN     Forecasting
        forecast
        forecasts
        forecasting [N W I] =(Cash Forecasting)

SYN     Licensing
        licensing

SYN     promotion
        promo
        promotion
        promotions
        promotional SYN     Marketing Promotion
        marketing [1] =promotion SYN     FCC
        FCC
        federal communications commission SYN     Manuals
        manual
        manuals
        manuscript SYN     Gate Width
        gate width
        gate oxide SYN     Mapping
        mapping SYN     Thin Film Categor
        thin film categorization SYN     Thin Films
        thin =film [N W I] =(Thin Film Categor)

SYN     ESD
        ESD
        electrical static discharge

SYN     Bench Test
        bench test

SYN     Design Verification
        design verification
```

| | | |
|---|---|---|
| SYN | Device Character<br>device characterization | |
| SYN | Failure Analysis<br>failure [1] analysis | |
| SYN | Yield Improvement<br>yield improvement<br>yield enhancement | |
| SYN | Invoice<br>invoice<br>invoices | |
| SYN | JIT<br>JIT<br>just in time | |
| SYN | Purchase Order<br>PO<br>purchase =order<br>purchase =agreement | |
| SYN | Calibration<br>calibrate<br>calibration | |
| SYN | CMR<br>CMR | |
| SYN | audit<br>audit<br>audited<br>audits | |
| SYN | Annual Audit<br>annual =audit | |
| SYN | Audit<br>=audit [N W I] =(Annual Audit) | |
| SYN | OEM<br>oem<br>original equipment manufacturer | |
| SYN | SPC<br>SPC<br>statistical process control | |
| SYN | 29000<br>29000 | |
| SYN | 3X0X0<br>3x0x0 | |
| SYN | 680X0<br>680x0<br>68010<br>68000<br>68020<br>68030<br>68040<br>68xxx<br>680xx | |
| SYN | 80960<br>80960 | |
| SYN | 80X86<br>8086<br>8088<br>80x86 | |

```
            80186
            80286
            80386
            80486

SYN         88000
            88000

SYN         NSC 320X0
            nsc 32000
            nsc 32010
            nsc 32020
            nsc 32030
            nsc 32040
            nsc 32050
            nsc 32060
            nsc 32070
            nsc 32080
            nsc 32090

SYN         R2/30X0
            r2 ^/ 30x0

SYN         SPARC
            SPARC
            scalable processor architecture

SYN         VLC86C010
            vlc86c010

SYN         Z80
            z80
            z8000

SYN         6502
            6502

SYN         AnyMicroproc
            =(29000)
            =(3X0X0)
            =(6502)
            =(680X0)
            =(80960)
            =(80X86)
            =(88000)
            =(NSC 320X0)
            =(R2/30X0)
            =(SPARC)
            =(VLC86C010)
            =(Z80)

SYN         C
            "C"
            c [2] language
            c programming
            wrote [2] c
            c [2] pascal
            pascal [2] c
            c [2] fortran
            fortran [2] c
            c [2] unix
            unix [2] c SYN         Pascal
            pascal SYN         UNIX
            unix
            xenix
            ultrix
            aix
            a ^/ ux
```

```
            hp ^/ ux
            Berkeley 4.2
            Berkeley 4.3
            4.2BSD
            4.3BSD
            System V
            System 5

SYN         Fortran
            fortran

SYN         Assembly Language
            =assembly [8] =(C)
            =assembly [12] =(Pascal)
            =assembly [12] =(Fortran)
            =assembly [8] =(UNIX)
            =(C) [8] =assembly
            =(Pascal) [12] =assembly
            =(Fortran) [12] =assembly
            =(UNIX) [8] =assembly
            =assembly language
            =AnyMicroproc =assembly SYN         Compiler
            =compiler [N W I] =(Cross Compiler) $
[N W I] =(Compiler Driver)

SYN         MVS
            MVS
            multiple virtual storage

SYN         VMS
            vms

SYN         VM/CMS
            VM ^/ CMS

SYN         I/O
            i ^/ o
            io
            input [2] output

SYN         Root Cause Diagnost
            root cause diagnostics

SYN         Diagnostics
            diagnostics [N W I] =(Root Cause Diagnost)

SYN         Parametric Test
            parametric =tester

SYN         Debugging
            debug
            debugging

SYN         Documentation Req
            documentation requirements

SYN         Documentation
            documentation [N W I] =(Documentation Req)

SYN         Packaging
            packaging

SYN         CIM
            CIM
            computer integrated manufacturing

SYN         IC
            IC
            integrated =circuit
```

```
SYN     vlsi
        very [1] large [1] scale [1] integrated [1] =circuit
        vlsi SYN     Architecture
        architecture
        architectures SYN     Image Processing
        image processing
        imageprocessing SYN     Cluster Controller
        cluster =controller SYN     Bad Controller
        disk Controller
        cartridge Controller
        tape Controller
        esdi Controller
        Controller [N W I] =(Micro Controller) $
   [N W I] =(Embedded Controller) [N W I] =(Graphic Controller) $
   [N W I] =(Cluster Controller)

SYN     Controller
        Controller [N W I] =(Bad Controller)

SYN     DASD
        DASD
        direct access storage device

SYN     PGA
        PGA
        pin grid array

SYN     Bipolar
        bipolar

SYN     Logic Analyzer
        logic =analyzer

SYN     FAX
        FAX
        facsimile

SYN     payable
        payable
        payables

SYN     Accounts Payable
        accounts =payable
        A ^/ P

SYN     receivable
        receivable
        receivables

SYN     Accounts Receivable
        accounts =receivable
        A ^/ R

SYN     Specifications
        spec
        specs
        spec's
        specification
        specifications SYN     PR
        public [1] relations
        pr
```

```
SYN     EEO
        EEO
        EEOC
        equal [1] employment [1] opportunity SYN     AA
        affirmative action SYN     resource
        resource
        resources
        relations SYN     hr
        HR
        human =resource SYN     HR Systems
        =hr =systems SYN     HR
        =hr [N W I] =(HR Systems)

SYN     Schematic Capture
        schematic capture

SYN     Schematic
        schematic [N W I] =(Schematic Capture)

SYN     Letter of Credit
        letter of credit

SYN     Accounting Systems
        accounting =systems

SYN     Payroll Systems
        payroll =systems

SYN     Purchasing Systems
        purchasing [1] =systems

SYN     Financial Analysis
        financial =analysis

SYN     Financial Systems
        finance =systems
        financial =systems

SYN     Financial
        financial [N W I] =(Financial Analysis) $
   [N W I] =(Financial Analysis)
        financials SYN     Sales Tax
        sales =tax
SYN     Stock Admin
        stock administration SYN     Admin Asssistant
        administrative asssistant SYN     Inventry Ctrl Clerk
        inventory control clerk SYN     Samples Clerk
        samples clerk SYN     Ship & Receiv Clerk
        shipping clerk
        receiving clerk
```

SYN     Accts Payable Clerk
        =(Accounts Payable) clerk

SYN     Accts Receiv Clerk
        =(Accounts Receivable) clerk

SYN     Accounting Clerk
        accounting clerk

SYN     Clerk
        clerk [N W I] =(Inventry Ctrl Clerk) [N W I] =(Samples Clerk) $
   [N W I] =(Ship & Receiv Clerk) [N W I] =(Accts Payable Clerk) $
   [N W I] =(Accts Receiv Clerk) [N W I] =(Accounting Clerk)

SYN     Executive Secretary
        executive secretary

SYN     Office Assistant
        office assistant

SYN     Office Manager
        office manager
        office management

SYN     Personnel Assistant
        personnel assistant

SYN     Receptionist
        receptionist

SYN     Secretary
        secretary [N W I] =(Executive Secretary)

SYN     twx
        twx
        telex

SYN     Telex Operator
        =twx operator

SYN     Typist
        typist

SYN     analyst
        analyst
        analysts

; Titles
SYN     Attorney
        attorney

SYN     Contract Admin
        =contract =admin

SYN     System Admin
        =systems administration
        =systems administrator SYN     Reliability Eng
        reliability =engineer SYN     Test Engineering
        test =engineer SYN     Release Engineering
        release =engineer SYN     Hewlett Packard
        hewlett packard
        HP SYN     Field Applic Eng

```
            field application =engineer
            field applications =engineer
            FAE SYN         Field Sales Eng
            field sales =engineer
            FSE ; this file should contain all synonyms/classes used by two
; or more definition files.

SYN         graphics
            graphic
            graphics

SYN         standard
            standard
            standards

SYN         library
            library
            libraries

SYN         design
            design
            designed
            designing
            designer SYN         process
            process
            processor
            processors
            processing SYN         contract
            contract
            contracts SYN         negotiate
            negotiate
            negotiates
            negotiation
            negotiations SYN         develop
            develop
            developer
            developed
            developing
            development SYN         program
            program
            programs SYN         systems
            system
            systems SYN         test
            test
            tester
            testing SYN         &
            &
            and SYN         layout
            layout
            layouts
```

| | |
|---|---|
| SYN | compiler<br>compilation<br>compiler |
| SYN | terminal<br>terminal<br>terminals |
| SYN | computer<br>computer<br>computers |
| SYN | rule<br>rule<br>rules |
| SYN | sales<br>sale<br>sales |
| SYN | facility<br>facility<br>facilities |
| SYN | document<br>document<br>documents |
| SYN | analyze<br>analyze<br>analyzed<br>analysis<br>analyzing |
| SYN | analysis<br>analysis<br>analyst |
| SYN | plan<br>plan<br>plans<br>planned<br>planning |
| SYN | negotiation<br>negotiation<br>negotiations |
| SYN | product<br>product<br>products |
| SYN | manage<br>manage<br>managed<br>managing<br>management<br>manager |
| SYN | line<br>lines<br>line |
| SYN | proposal<br>propose<br>proposing<br>proposal<br>proposed |
| SYN | developer<br>developer<br>developers |

| | |
|---|---|
| SYN | communication<br>communication<br>communications |
| SYN | package<br>package<br>packages |
| SYN | junction<br>junction<br>junctions |
| SYN | tester<br>tester |
| SYN | analyzer<br>analyzer<br>analyzers |
| SYN | language<br>language<br>languages |
| SYN | driver<br>driver<br>drivers |
| SYN | computing<br>computer<br>computing |
| SYN | automatic<br>automatic<br>automated |
| SYN | vector<br>vector<br>vectors |
| SYN | procedure<br>procedure<br>procedures |
| SYN | testing<br>test<br>tests<br>tested<br>testing<br>tester |
| SYN | administer<br>adminster<br>adminstered<br>adminstrate<br>administration |
| SYN | policy<br>policy<br>policies |
| SYN | statement<br>statement<br>statements |
| SYN | tool<br>tool<br>tools |
| SYN | report<br>reports |
| SYN | code |

```
            code
            codes

SYN         memo
            memo
            memos

SYN         environment
            environment
            environments

SYN         control
            control
            controls

SYN         regulation
            regulation
            regulations

SYN         law
            law
            laws

SYN         option
            option
            options

SYN         agreement
            agreement
            agreements

SYN         engineer
            engineer
            engineering

SYN         fab
            fab
            fabrication

SYN         mask
            mask
            masking
            masks

SYN         film
            film
            films

SYN         circuit
            circuit
            circuits
            circuitry SYN         vendor
            vendor
            vendors SYN         order
            order
            orders SYN         inspection
            inspection
            inspections SYN         admin
            administration
            administrative
            administrator SYN         signal
            signal
            signals
```

```
SYN     chip
        chip
        chips

SYN     place
        place
        placement

SYN     application
        application
        applications

SYN     mech
        mech
        mechanical

SYN     assembly
        assembly
        assembler

SYN     tax
        tax
        taxes

SYN     arbitration
        arbitrate
        arbitrator
        arbitration uses system.def
uses dates.def
#uses degrees.def

SYN     DESIRED
        desired
        sought

SYN     OBJECTIVE_HEADER
        /BLOCK_MARK [2] OBJective!3
        /BLOCK_MARK [1] Goal
        /BLOCK_MARK position =DESIRED
        [N] /BLOCK_MARK [2] OBJective!3 :
        [N] /BLOCK_MARK [1] Goal :
        [N] /BLOCK_MARK position =DESIRED :

CLASS   EXPERIENCE_TYPE
        work
        job
        professional
        employment!4 [N] resume

SYN     POSS_EDU_HEADER

SYN     EDUCATION_HEADER
ACTION  FirstFit
        /BLOCK_MARK [2] EDUcation!2
        [N] /BLOCK_MARK [2] EDUcation!2 :
        /EOL EDUCATION SYN     EXPERIENCE
        EXPerience!2
        HIStory!2
        EMPloyment!2 [N] resume SYN     FULL_EXP_HEADER
        /EXPERIENCE_TYPE [1] =EXPERIENCE [N C I] =EDUCATION_HEADER
        /EOL [1] EXPERIENCE
        /EOL [1] EMPLOYMENT
        /EOL [1] WORK HISTORY

SYN     EXPERIENCE_HEADER
        =FULL_EXP_HEADER
```

```
            /BLOCK_MARK [4] =EXPERIENCE [N C I] =EDUCATION_HEADER $
  [N C I] =FULL_EXP_HEADER
            [N] /BLOCK_MARK [4] =EXPERIENCE : [N C I] =EDUCATION_HEADER $
  [N C I] =FULL_EXP_HEADER

SYN     REFERENCE_HEADER
        /BLOCK_MARK References!2

SYN     SUMMARY_HEADER
        /BLOCK_MARK Summary
        /BLOCK_MARK Strengths
        /BLOCK_MARK CAPAbilities!3
        /BLOCK_MARK ACCOMplishments!4

SYN     AFFILIATIONS_HEADER
        /BLOCK_MARK Professional [N 1] =EXPERIENCE [N 1] record
        /BLOCK_MARK Affiliations
        /BLOCK_MARK Memberships SYN     PERSONAL_HEADER
        /BLOCK_MARK personal SYN     HONORS_HEADER
        /BLOCK_MARK Honor
        /BLOCK_MARK Honors
        /BLOCK_MARK Papers
        /BLOCK_MARK Publications
        /BLOCK_MARK Patent
        /BLOCK_MARK Awards CLASS   useless_header
        Miscellaneous
        Activities
        Languages
        Hobbies
        Certification
        Certifications
        Other
        Special
        Additional Information
        Areas [1] Expertise
        Operating Systems
        Coursework
        Courses
        Clearances
        Qualifications
        Interests
        Curriculum
        Strengths
        License
        Background
        Additional [N] experience SYN     OTHER_HEADER
        /BLOCK_MARK [1] /useless_header SYN     skills
        Skills
        Skill SYN     SKILLS_HEADER
        /BLOCK_MARK [3] =skills SYN     GOOD_HEADER
        =REFERENCE_HEADER
        =SUMMARY_HEADER
        =AFFILIATIONS_HEADER
        =EDUCATION_HEADER
        =OBJECTIVE_HEADER
        =EXPERIENCE_HEADER
        =PERSONAL_HEADER
        =OTHER_HEADER
```

```
            =HONORS_HEADER
            =SKILLS_HEADER

SYN     NONED_HEADER
            =GOOD_HEADER [N W I] =EDUCATION_HEADER $
      [N C I] =EDUCATION_HEADER

SYN     NONEXP_HEADER
            =GOOD_HEADER [N W I] =EXPERIENCE_HEADER $
      [N C I] =EXPERIENCE_HEADER

SYN     TENTH_LINE
              [I] /BOD [B F I] /EOL [B F I] /EOL [B F I] /EOL [B F I] /EOL $
      [B F I] /EOL [B F I] /EOL [B F I] /EOL [B F I] /EOL [B F I] /EOL $
      [B F I] /EOL [B F I] /EOL [B F I] /EOL [B F] /EOL

SYN     FIRST_TEN_LINES
              /BOD [B F] /EOL [B F] /EOL [B F] /EOL [B F] /EOL [B F] /EOL $
      [B F] /EOL [B F] /EOL [B F] /EOL [B F] /EOL [B F] /EOL [B F] /EOL $
      [B F] /EOL [B F] /EOL [B F] /EOL

SYN     FIRST_TWO_EOLS
              /BOD [B F] /EOL [B F] /EOL

SYN     END_HEADER
              references [B I] =TENTH_LINE
              summary [B I] =TENTH_LINE
              strengths [B I] =TENTH_LINE
              capabilities [B I] =TENTH_LINE
              accomplishments [B I] =TENTH_LINE
              professional [B I] =TENTH_LINE
              affiliations [B I] =TENTH_LINE
              memberships [B I] =TENTH_LINE
              experience [B I] =TENTH_LINE
              history [B I] =TENTH_LINE
              employment [B I] =TENTH_LINE
              education [B I] =TENTH_LINE
              objective [B I] =TENTH_LINE
              goal [B I] =TENTH_LINE
              position [B I] =TENTH_LINE
              honor [B I] =TENTH_LINE
              honors [B I] =TENTH_LINE
              papers [B I] =TENTH_LINE
              patents [B I] =TENTH_LINE
              publications [B I] =TENTH_LINE
              awards [B I] =TENTH_LINE
              useless_header [B I] =TENTH_LINE
              /DATE_RANGE [B I] =TENTH_LINE
              =TENTH_LINE SYN     UNK_HEADER
              /BLOCK_MARK [N 1] /DATE $
      [N W I] =GOOD_HEADER [N W I] =FIRST_TWO_EOLS

SYN     UNKNOWN_HEADER
              =UNK_HEADER [N C I] =GOOD_HEADER

SYN     ANY_HEADER
              =GOOD_HEADER
              =UNKNOWN_HEADER

SYN     BLOCK
              =ANY_HEADER [B F] =ANY_HEADER

SYN     OTHER_BLOCK
              =UNKNOWN_HEADER [B F] =GOOD_HEADER
              =UNKNOWN_HEADER [B] /EOD [N C I] =GOOD_HEADER

SYN     FIRST_DATE_HEADER
    ACTION  FirstOccurrence
              /BLOCK_MARK /DATE [N W I] =GOOD_HEADER [N W I] =FIRST_TWO_EOLS
```

```
SYN     POSS_EXP_SECT
        /EOL [1] EXPERIENCE!2 [* B F I] =NONEXP_HEADER
        /EOL [1] EXPERIENCE!2 [B] /EOD

SYN     EXPERIENCE_SECTION
ACTION  FirstFit
        =EXPERIENCE_HEADER [B F] =NONEXP_HEADER [C I] /DATE
        =EXPERIENCE_HEADER [B] /EOD [N C I] =NONEXP_HEADER [C I] /DATE
        =POSS_EXP_SECT [N C I] =NONEXP_HEADER [C I] /DATE
        =OTHER_BLOCK [N C I] =FIRST_TWO_EOLS [C I] /DATE_RANGE
        =OTHER_BLOCK [N C I] =FIRST_TWO_EOLS [C I] /DATE
        =FIRST_DATE_HEADER [B F] =GOOD_HEADER
        =FIRST_DATE_HEADER [B] /EOD [N C I] =GOOD_HEADER
        [I] /BOD [B F] /EOL [B F] =GOOD_HEADER
        [I] /BOD [B F] /EOL [B] /EOD [N C I] =GOOD_HEADER SYN     FinalExp
        =EXPERIENCE_SECTION

SYN     SKILLS_SECTION
        =SKILLS_HEADER [B F] =ANY_HEADER

SYN     PERSONAL_SECTION
        =PERSONAL_HEADER [B F] =ANY_HEADER

SYN     FIRST_THREE_LINES
        /BOD [B F] /EOL [B F] /EOL [B F] /EOL

SYN     FIRST_LINE
        /BOD [B F] /EOL

SYN     FIRST_TWO_LINES
        /BOD [B F] /EOL [B F] /EOL

SYN     PossEdSection
ACTION  FirstOccurrence
        =EDUCATION_HEADER [B F] =NONED_HEADER [C I] /Degree
        =EDUCATION_HEADER [B] /EOD [N C I] =NONED_HEADER $
    [C I] /Degree
        =EDUCATION_HEADER [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [C I] /Degree SYN     PossEdSection2
ACTION  FirstOccurrence
        /EOL [1] EDUcation!2 [B F I] =NONED_HEADER [N C I] =NONED_HEADER [C I] /Deg
        /EOL [1] EDUcation!2 [B] /EOD [N C I] =NONED_HEADER [C I] /Degree
        /EOL [1] EDUcation!2 [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [B F] /EOL [B F] /EOL [B F] /EOL [B F] /EOL [B F] /EOL $
    [C I] /Degree SYN     FirstDegree
ACTION  FirstOccurrence
        /Degree [W] =LINE SYN     EDUCATION_SECTION
ACTION  FirstFit
        =PossEdSection
        =PossEdSection2
        =FirstDegree [B F] =NONED_HEADER
        =FirstDegree [B] /EOD [N C I] =NONED_HEADER SYN     FinalEdSectTest
        =EDUCATION_SECTION
```

```
SYN     OBJECTIVE_SECTION
ACTION  FirstOccurrence
        =OBJECTIVE_HEADER [B F] /BLOCK_MARK
        =OBJECTIVE_HEADER [B F] /EOL [B F] /EOL [B F] /EOL $
  [B F] /EOL [B F] /EOL [B F] /EOL uses system.def
SYN     DATE_SEPARATOR
        -
        ^/

SYN     Jan
        january
        jan [O] .
        1 =DATE_SEPARATOR
        01 =DATE_SEPARATOR SYN     Feb
        february
        feb [O] .
        2 =DATE_SEPARATOR
        02 =DATE_SEPARATOR SYN     Mar
        march
        mar [O] .
        3 =DATE_SEPARATOR
        03 =DATE_SEPARATOR SYN     Apr
        april
        apr [O] .
        4 =DATE_SEPARATOR
        04 =DATE_SEPARATOR SYN     May
        may
        5 =DATE_SEPARATOR
        05 =DATE_SEPARATOR SYN     Jun
        june
        jun [O] .
        6 =DATE_SEPARATOR
        06 =DATE_SEPARATOR SYN     Jul
        july
        jul [O] .
        7 =DATE_SEPARATOR
        07 =DATE_SEPARATOR SYN     Aug
        august
        aug [O] .
        8 =DATE_SEPARATOR
        08 =DATE_SEPARATOR SYN     Sep
        september
        sept [O] .
        sep [O] .
        9 =DATE_SEPARATOR
        09 =DATE_SEPARATOR SYN     Oct
        october
        oct [O] .
        10 =DATE_SEPARATOR SYN     Nov
```

```
              november
              nov [0] .
              11 =DATE_SEPARATOR SYN           Dec
              december
              dec [0] .
              12 =DATE_SEPARATOR CLASS         MONTH
              =Jan
              =Feb
              =Mar
              =Apr
              =May
              =Jun
              =Jul
              =Aug
              =Sep
              =Oct
              =Nov
              =Dec CLASS         DAY
ACTION        Days
              /NUMBER1A
              /NUMBER2A CLASS         YEAR
ACTION        Years
              /NUMBER4A
              /NUMBER2A [N 0 I] %

CLASS         MONTH_DAY_YEAR
              /MONTH [1] /DAY [1] /YEAR

CLASS         MONTH_YEAR
              /MONTH [1 I] /DAY [1] /YEAR
              /MONTH [1] /YEAR [N W I] /MONTH_DAY_YEAR

SYN           Present
              present
              date
              current SYN           Summer
              summer SYN           Fall
              fall
              autumn SYN           Spring
              spring SYN           Winter
              winter CLASS         SEASON_YEAR
              =Summer [1] /YEAR
              =Fall [1] /YEAR
              =Winter [1] /YEAR
              =Spring [1] /YEAR CLASS         JUST_YEAR
              /YEAR [N W I] /MONTH_YEAR [N W I] /SEASON_YEAR CLASS         DATE
              /MONTH_YEAR
              /SEASON_YEAR
              /JUST_YEAR
```

```
SYN     to
        [0] /EOL [0] until [0 0] /EOL
        [0] /EOL [0] to [0 0] /EOL
        [0] /EOL [0] - [0 0] /EOL [N W I] /DATE CLASS   DATE_RANGE
        /DATE =to [2 F] /DATE [N C I] < [N C I] >
        /DATE =to [2 F] =Present
        /MONTH [0] =to [2 F] /DATE SYN     AA
        AA
        A [0] . [0] A
        associate [1] arts SYN     AS
        AS
        A [0] . [0] s
        associate [1] science SYN     MBA
        Mba
        m [0] . [0] b [0] . [0] a SYN     MPA
        MPA
        masters [2] public administration SYN     bachelor
        bachelor!2
        baccalaureate!3

SYN     BA
        BA
        b [0] . [0] a [N W I] =MBA
        =bachelor [N 2] science SYN     tech
        tech
        technology SYN     BS
        Bs
        Bse
        BSc
        b [0] . [0] s
        b . =tech
        b [0] . [0] sc
        [N] . s [0] . [0] b
        =bachelor [2] science
        BSEET
        BSEE
        BSCS
        BSME CLASS   MASS_CITY
        boston [2] MA
        cambridge [2] MA SYN     M.Eng.
ACTION  FirstFit
        M . Eng
        M [0] . Engineering
        master [1] of [1] engineering SYN     thesis
        thesis
        dissertation SYN     MS
        NLs
        ms
```

```
              m [0] . [0] s
              m [0] . [0] sc
              [N] . s [0] . [0] m
              master [2] science
              MSEE
              MSCS SYN       MA
              ma [N W I] /MASS_CITY
              m [0] . [0] a
              master of arts
              masters
              master [N 2] science
              =M.Eng.
              =MPA

SYN       BE
              [N 0] . B [0] . [0] E [0] .
              BE

SYN       BSL
              BSL

CLASS     Bachelors
              =BA
              =BS
              =BE
              =BSL SYN       Bachelors
              =BA
              =BS
              =BE
              =BSL CLASS     Masters
              =MA [N 1] =thesis
              =MBA
              =MS [N 1] =thesis SYN       Masters
              =MA [N 1] =thesis
              =MBA
              =MS [N 1] =thesis SYN       Associates
              =AA
              =AS CLASS     Associates
              =AA
              =AS SYN       Certificate
              certificate SYN       Doctorate
              Ph [1] d
              Phd
              doctorate SYN       Phd
              =Doctorate [N 1] =thesis SYN       High School
              [N] junior High School
              H.S CLASS     Degree
              =(High School)
              =Certificate
              /Associates
```

```
              /Bachelors
              /Masters
              =Phd

CLASS     MMI_Degrees
              =(High School)
              =Associates
              =Bachelors
              =Certificate
              =Masters
              =Phd

SYN       LINE
              /BOD [B F] /EOL
              /EOL [B F] /EOL

SYN       STOPPER
              /EOL
              |
              \
              /EOD
              /BOD

CLASS     BLOCK_MARK
              \
              |
              /EOD
              /BOD

SYN       DelimitSentence
              /BLOCK_MARK
              .
              /EOD ; This definition of sentence will fail if abbreviations are used
    SYN       SENTENCE
              =DelimitSentence [B F] =DelimitSentence SYN       0
              o SYN       1
              i
              l SYN       2
              z

SYN       4
              A

SYN       5
              s

SYN       8
              R

SYN       00
              oo

SYN       01
              oi
              ol

SYN       02
              oz

SYN       05
              os

SYN       10
              io
```

```
            lo
SYN     11
        ii
        il
        li
        ll

SYN     12
        iz
        lz

SYN     15
        ls

SYN     20
        zo

SYN     21
        zi
        zl

SYN     22
        zz

SYN     25
        zs

SYN     50
        so

SYN     51
        sl
        si

SYN     52
        sz

SYN     55
        ss

CLASS   NUMBER1A
        /NUMBER1
        =0
        =1
        =2
        =4
        =5
        =8

CLASS   NUMBER2A
        /NUMBER2
        /NUMBER1A [M] /NUMBER1A
        =00
        =01
        =02
        =05
        =10
        =11
        =12
        =15
        =20
        =21
        =22
        =25
        =50
        =51
        =52
        =55

CLASS   NUMBER3A
```

```
        /NUMBER3
        /NUMBER2A  [M]  /NUMBER1A
        /NUMBER1A  [M]  /NUMBER2A

CLASS   NUMBER4A
        /NUMBER4
        /NUMBER3A  [M]  /NUMBER1A
        /NUMBER1A  [M]  /NUMBER3A
        /NUMBER2A  [M]  /NUMBER2A

CLASS   NUMBER5A
        /NUMBER5
        /NUMBER4A  [M]  /NUMBER1A
        /NUMBER1A  [M]  /NUMBER4A
        /NUMBER2A  [M]  /NUMBER3A
        /NUMBER3A  [M]  /NUMBER2A
```

We claim:

1. A method for generating the job category or categories most appropriate for a job application from the applicant's printed resume using a programmed computer, the method comprising;

loading a digital representation of the printed resume into the computer;

extracting and storing predefined words and word groups from the digital representation, each work and word group being related to one or more job categories;

assigning a weight to each extracted and stored word or work group, the weights varying in relation to the strength of each word or word group as an indicator of applicant's ability to fulfill a position in the particular job category or categories;

summing the weights for each job category;

selecting the job category or categories with the highest weights; and delivering as output in either computer-readable or text form the job category or categories with the highest weights.

2. The method of claim 1, further comprising the steps of compiling and storing a datafile comprising indicator headings for a given job category, said datafile further comprising buzzwords where each buzzword is associated with one or more indicator headings;

assigning weights to each buzzword in said datafile, where a buzzword associated with more than one indicator heading is assigned a lesser weight than a buzzword associated with only one indicator heading; and wherein said extracting step comprises the step of identifying matched buzzwords as those buzzwords which match with said extracted word or word group; and wherein said step of assigning a weight comprises the step of using the weights of said matched buzzwords to assign a weight to said job category.

3. The method of claim 2, wherein said compiled datafile further comprises a plurality of job categories, where said indicators are associated with one or more job categories thereby forming an indirect association between buzzwords and job categories, said method further comprising the steps of determining whether said work or work group matches with a multiply occurring buzzword, where a multiply occurring buzzword is defined as a buzzwork which is indirectly associated with more than one job category; and computing a weight for a job category by using the weight of a matched buzzword indirectly associated with said job category, where the contribution to said job category's weight by a multiply occurring buzzword is less than the contribution by a non-multiply occurring buzzword.

4. The method of claim 1 wherein said loading step comprises the steps of:

scanning the resume to generate a digitized image of the resume; and translating the digitized image to generate a digital representation of the resume, said digital representation including codes representing text characters.

5. A method for generating a job category or categories for a job applicant from the applicant's printed resume using a programmed computer having a memory and a processor, the method comprising:

storing a set of buzzwords, values and job categories, and associating each buzzword with value and a job category;

loading a digital representation of the printed resume into the memory;

comparing the digital representation of the resume with the stored set of buzzwords to extract one or more words and word groups which match with one or more of the buzzwords:

assigning a weight to each job category, by deriving the weight from the value associated with the matched buzzwords;

summing the assigned weights for each job category using the processor;

selecting from the summed weights for each job category one or more job categories with the highest weights; and delivering as output the selected one or more job categories with the highest weights.

6. The method of claim 5, wherein said step of storing a set of buzzwords, values and job categories further comprises the steps of:

storing a set of indicators, and associating each indicator with one or more of said job categories, where each of said buzzwords is associated with one or more indicators; and adjusting said values associated with said buzzwords so that a buzzword associated with more than one indicator is assigned a lesser value than a buzzword associated with only one indicator.

7. The method of claim 6, wherein said method further comprises the steps of
- identifying headings in the digital representation of the resume; and
- identifying words or word groups associated with said headings;
- wherein said comparing step further comprises comparing said headings with said stored indicators; and
- wherein said assigning step further comprise assigning a higher weight to said job category if said heading matches said indicator.

8. The method of claim 6, further comprising the steps of
- computing an indicator weight for a given indicator based on the weights assigned to each matched buzzword associated with said given indicator; and
- using said indicator weight to compute the weight for a job category.

9. The method of claim 6, further comprising the steps of
- assigning a weight to a given indicator;
- identifying matched indicators as those indicators which match with said word or word group; and
- using said matched indicator to compute the weight of said job category.

10. The method of claim 6, wherein said datafile further comprises a plurality of job categories, where said indicators are associated with one or more job categories thereby forming an indirect association between buzzwords and job categories, said method further comprising the steps of
- determining whether said word or word group matches with a multiply occurring buzzword, where a multiply occurring buzzword is defined as a buzzword which is indirectly associated with more than one job category; and
- computing a weight for a job category by using the weight of a matched buzzword indirectly associated with said job category, where the contribution to said job category's weight by a multiply occurring buzzword is less than the contribution by a non-multiply occurring buzzword.

11. The method of claim 10, where the buzzword occurs more than once in the resume.

12. The method of claim 5 wherein said loading step comprises the steps of:
- scanning the resume to generate a digitized image of the resume; and
- translating the digitized image to generate a digital representation of the resume, said digital representation including codes representing text characters.

13. An apparatus for determining the job category or categories most appropriate for an applicant based on applicant's printed resume, where said apparatus comprises
- a computer system comprising a memory and processing means coupled to said memory;
- an optical character recognition unit coupled to said computer system for scanning the printed resume and entering information from the printed resume into said memory;
- said processing means comprising means for extracting predefined words and word groups from said resume information;
- said processing means further comprising means for assigning weights to each word or word group, where said weights vary in relation to the strength of each word or word group as an indicator of applicant's ability to fulfill a position in said job category or categories;
- said processing means further comprising means for calculating a weight for each job category based on said weights for each word or word group; and
- said processing means further comprising means for selecting and indicating the job category or categories with the highest weights.

14. The apparatus of claim 13 further comprising
- a datafile stored in said memory, where said datafile comprises indicator headings for a given job category, where said datafile further comprises one or more buzzwords, where each buzzword is associated with one or more indicator headings, where a buzzword associated with more than one indicator is assigned a lesser weight than a buzzword associated with only one indicator;
- said processing means further comprising means for identifying buzzwords which match said word or word group extracted from said resume information; and
- said processing means further comprising means for using the weights of said buzzwords which match to assign a weight to said job category.

15. The apparatus of claim 13, said optical character recognition unit comprising an optical scanner for scanning the printer resume to convert the printed resume into a digitized image of the resume and a character recognition unit coupled to the optical scanner for translating the digitized image into a digital representation of the resume, said digital representation including codes representing text characters.

* * * * *

UNITED STATES PATENT AND TRADEMARK OFFICE
CERTIFICATE OF CORRECTION

PATENT NO. : 5,197,004
DATED : 3-23-93
INVENTOR(S) : David Sobotka, et al.

It is certified that error appears in the above-identified patent and that said Letters Patent is hereby corrected as shown below:

In the Drawings:
The body of Fig. 4A should be switched with the body of Fig. 3.

In column 379, claim 1, line 31, delete "work" and insert --word--.

In column 380, claim 3, line 19, delete "buzzwork" and insert --buzzword--.

In column 381, claim 7, line 11, delete "comprise" and insert --comprises--.

In column 382, claim 15, line 45, delete "printer" and insert --printed--.

Signed and Sealed this

Twenty-second Day of February, 1994

Attest:

BRUCE LEHMAN

Attesting Officer

*Commissioner of Patents and Trademarks*